(12) United States Patent
Suzuki et al.

(10) Patent No.: US 7,777,774 B2
(45) Date of Patent: *Aug. 17, 2010

(54) IMAGE FORMING SYSTEM EMPLOYING EFFECTIVE OPTICAL SCAN-LINE CONTROL DEVICE

(75) Inventors: Mitsuo Suzuki, Kanagawa (JP); Naoki Miyatake, Kanagawa (JP); Taku Amada, Kanagawa (JP); Seizo Suzuki, Kanagawa (JP); Kazuyuki Shimada, Tokyo (JP); Satoru Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 173 days.

This patent is subject to a terminal disclaimer.

(21) Appl. No.: 11/438,296

(22) Filed: May 23, 2006

(65) Prior Publication Data

US 2006/0209166 A1 Sep. 21, 2006

Related U.S. Application Data

(63) Continuation of application No. 10/347,746, filed on Jan. 22, 2003, now Pat. No. 7,050,082.

(30) Foreign Application Priority Data

| Jan. 23, 2002 | (JP) | ............................. 2002-014255 |
| Jan. 24, 2002 | (JP) | ............................. 2002-015647 |
| Feb. 14, 2002 | (JP) | ............................. 2002-036825 |
| Apr. 30, 2002 | (JP) | ............................. 2002-128011 |
| Dec. 2, 2002 | (JP) | ............................. 2002-350285 |

(51) Int. Cl.
*B41J 2/435* (2006.01)
*B41J 2/47* (2006.01)
*B41J 15/14* (2006.01)
*B41J 27/00* (2006.01)

(52) U.S. Cl. .......................... 347/241; 347/234; 347/248

(58) Field of Classification Search ................. 347/116, 347/234, 241–242, 248, 256–257, 243, 229, 347/231, 259, 260; 250/205; 345/84; 349/17
See application file for complete search history.

(56) References Cited

U.S. PATENT DOCUMENTS

4,443,695 A * 4/1984 Kitamura .................... 250/205

(Continued)

FOREIGN PATENT DOCUMENTS

JP 63-240533 10/1988

(Continued)

OTHER PUBLICATIONS

U.S. Appl. No. 11/802,914, filed May 25, 2007, Suzuki, et al.

(Continued)

*Primary Examiner*—Hai C Pham
(74) *Attorney, Agent, or Firm*—Oblon, Spivak, McClelland, Maier & Neustadt, L.L.P.

(57) ABSTRACT

An optical scanning characteristic control method is applied to an optical scanning system in which a beam is deflected, and the deflected beam is converged and directed toward a scanning surface, so that optical scanning of the scanning surface is performed by an optical spot formed thereon by the deflected beam. The method comprising the steps of a) disposing a beam deflection control device on the light path of the beam before it is incident on the scanning surface; and b) controlling a beam deflection amount of the beam deflecting device provide to an incident beam so as to control a scanning characteristic of the optical scanning.

59 Claims, 21 Drawing Sheets

U.S. PATENT DOCUMENTS

| | | | |
|---|---|---|---|
| 4,564,853 A | | 1/1986 | Egan |
| 4,578,688 A | * | 3/1986 | Okuno ................. 347/118 |
| 4,958,914 A | * | 9/1990 | Owechko et al. ............. 349/17 |
| 5,461,412 A | * | 10/1995 | Paoli et al. ................ 347/243 |
| 5,493,326 A | | 2/1996 | Andrews et al. |
| 5,561,285 A | * | 10/1996 | Sakata et al. ............. 250/205 |
| 5,715,079 A | | 2/1998 | Ono |
| 6,115,012 A | * | 9/2000 | Eguchi et al. ............... 345/84 |
| 6,271,869 B1 | * | 8/2001 | Tada et al. ................ 347/116 |
| 6,342,963 B1 | | 1/2002 | Yoshino |
| 6,411,325 B1 | * | 6/2002 | Matsushita et al. .......... 347/257 |
| 6,493,011 B1 | * | 12/2002 | Shioya ..................... 347/116 |
| 7,050,082 B2 | * | 5/2006 | Suzuki et al. .............. 347/241 |
| 2002/0080428 A1 | | 6/2002 | Suzuki et al. |

FOREIGN PATENT DOCUMENTS

| | | |
|---|---|---|
| JP | 01-105905 | 4/1989 |
| JP | 01-232322 | 9/1989 |
| JP | 1-284871 | 11/1989 |
| JP | 3-42116 | 4/1991 |
| JP | 04-196869 | 7/1992 |
| JP | 7-128603 | 5/1995 |
| JP | 07-181441 | 7/1995 |
| JP | 7-218856 | 8/1995 |
| JP | 07-234612 | 9/1995 |
| JP | 07-261204 | 10/1995 |
| JP | 8-313941 | 11/1996 |
| JP | 9-033846 | 2/1997 |
| JP | 10-213940 | 8/1998 |
| JP | 10-268217 | 10/1998 |
| JP | 11-002766 | 1/1999 |
| JP | 2000-003110 A | 1/2000 |
| JP | 2001-030537 | 2/2001 |
| JP | 2001-91879 | 4/2001 |
| JP | 2001-133718 | 5/2001 |
| JP | 2001-183592 | 7/2001 |
| JP | 2001-194613 | 7/2001 |
| JP | 2001-328294 | 11/2001 |
| JP | 2001-356314 A | 12/2001 |
| JP | 3262490 | 3/2002 |

OTHER PUBLICATIONS

U.S. Appl. No. 12/051,404, filed Mar. 19, 2008, Amada, et al.

* cited by examiner

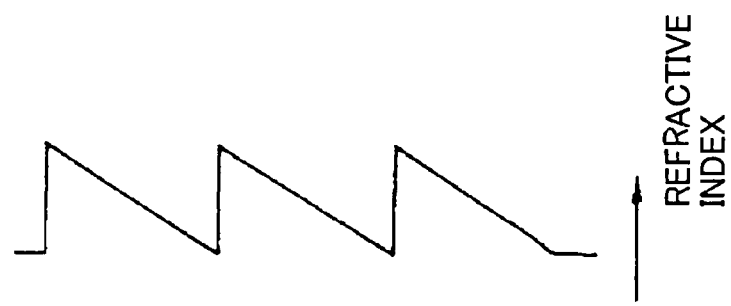
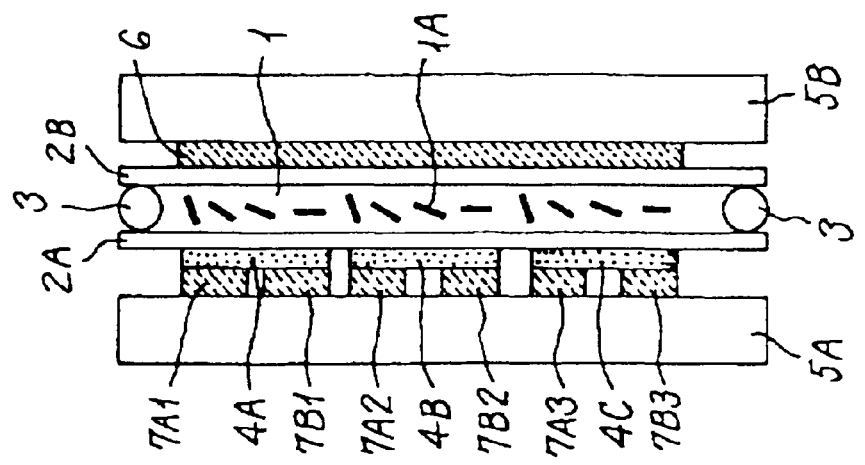
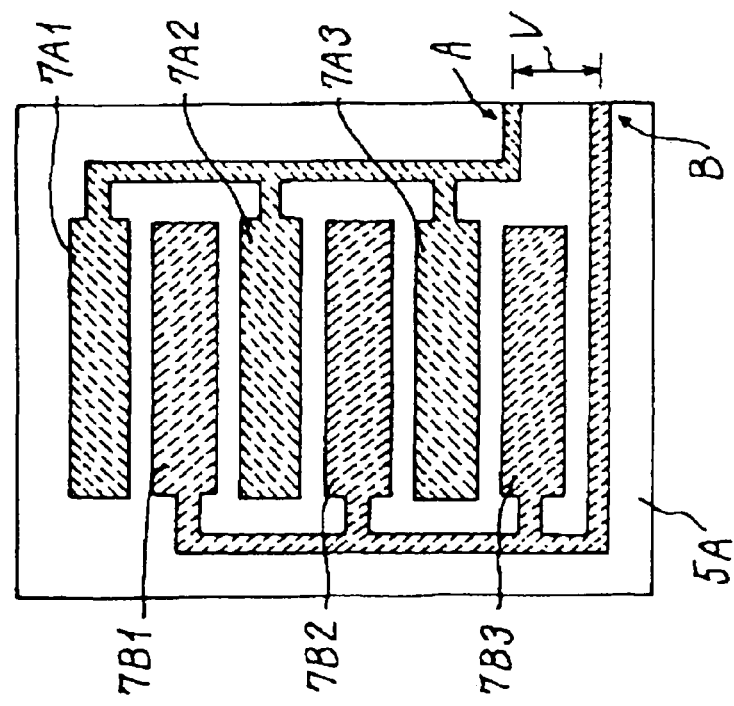

REFRACTIVE INDEX

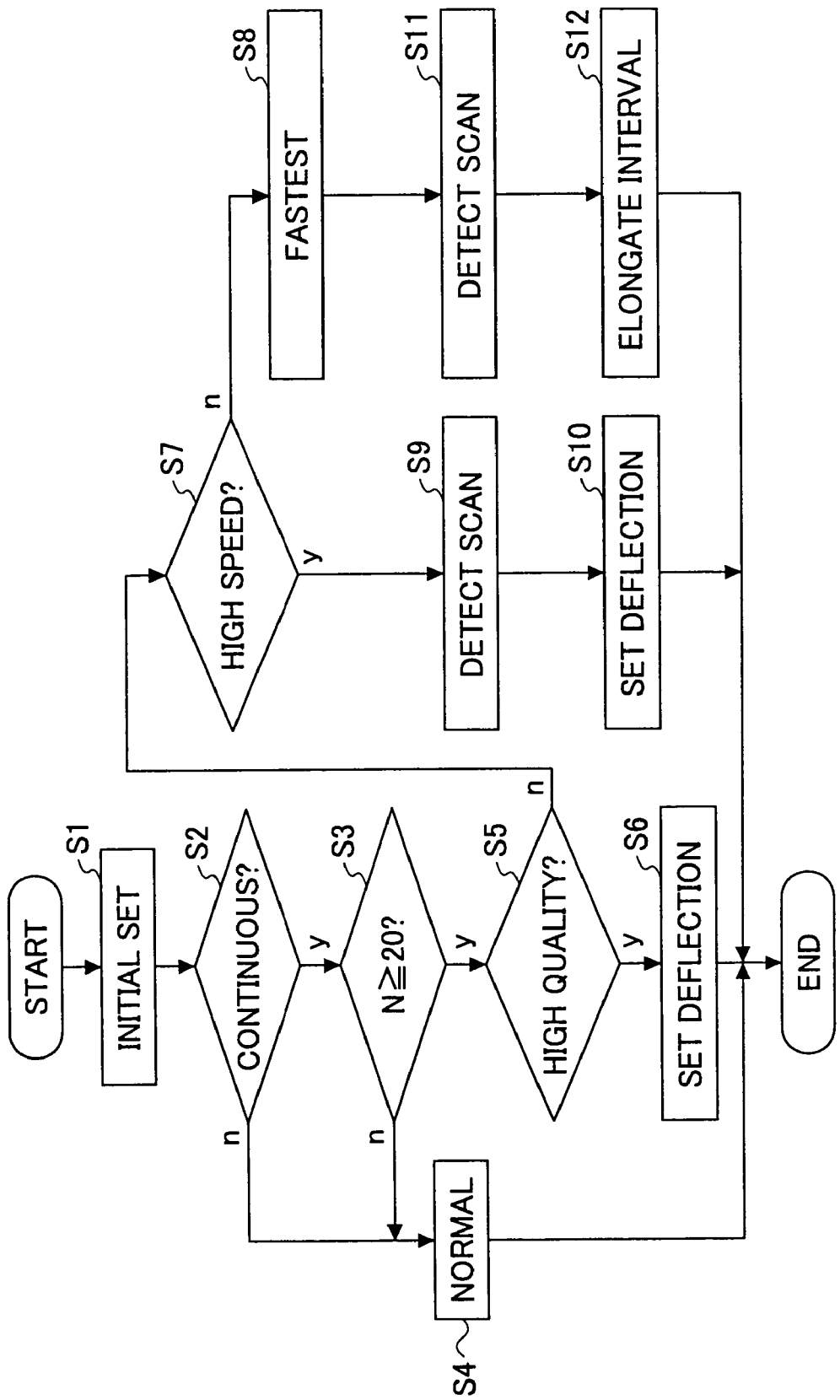

IMAGE FORMING SYSTEM EMPLOYING EFFECTIVE OPTICAL SCAN-LINE CONTROL DEVICE

BACKGROUND OF THE INVENTION

1. Field of the Invention

The present invention relates to an image forming system employing an effective optical scan-line control device, in particular, to an optical scanning control method, optical scanning device, or an image formation device, which employs an effective optical scan-line control device.

2. Description of the Related Art

In an image formation device, such as a laser printer, an optical plotter, a digital copier, or the like, an optical scanning device is employed. In the optical scanning device, a beam emitted from a light source is deflected by an optical deflection scanning device such as a rotation multiple mirror such as a polygon mirror or the like, is focused by a scanning image-formation optical system, such as an fθ lens into an optical spot, onto a scanning surface.

In the image formation device employing the optical scanning device, an image formation process is performed in which optical scanning is performed with the optical scanning device. There, the quality of the image formed depends on the quality in performance of the optical scanning. It depends on scanning characteristics on a main scanning direction and scanning characteristics on a subscanning direction of the optical scanning device. As one of the scanning characteristics on the main scanning direction, a uniform velocity performance is known.

In order to achieve the satisfactory uniform velocity performance in the optical scanning operation, the deflection of beam is performed in a uniform angular velocity in case of employing a rotation multiple mirrors for example. There, a scanning image-formation optical system having fθ characteristics is used. However, the perfect fθ characteristics may not be achieved there, and also, some other performances are also required from the scanning image-formation optical system.

A scan line bending phenomenon is known as one problem occurring in regard to the scanning characteristics on the subscanning direction. A scan line is drawn by an optical spot on the scanning surface, which should be a straight line ideally. However, due to a manufacture working error, an assembly error, etc., usually the scan line inevitably bends on the scanning surface. As one form of such a scan line bending phenomenon, inclination of scan line is known in which the scan line does not cross at a right angle with respect to the subscanning direction.

In case of providing an angle in the subscanning direction between a direction of a beam incidence onto an image-formation mirror and a direction of the same reflected thereby in the scanning image-formation optical system, the scan line bending phenomenon occurs inherently. In case the scanning image-formation optical system is formed by a lens system instead, occurrence of scan line bending is unavoidable in a multi-beam scanning form which carries out optical scanning with a plurality of optical spots separate along the subscanning direction.

Distortion along the main scanning direction arises in a resulting image formed when the above-mentioned uniform velocity performance of optical scanning is not perfect. When scan line bending occurs on the other hand, a distortion along the subscanning direction arises in the resulting image formed.

In case a monochrome image is formed by a single optical scanning device, imperfection in the uniform velocity performance may not cause a serious distortion in the resulting image in terms of visual performance of human eyes as long as the imperfection and scan line bending phenomenon are controlled to a certain degree. However, in case a color image is formed by a so-called tandem-type image formation device in which images of primary color components first formed are combined so as to provide a full-color image, serious problems may likely to occur as will now be described.

To form separate color component images of respective three colors of magenta, cyan and yellow or four colors which also includes black, and, after that, to produce a full-color image in combination thereof by piling up these color component images in a color copying machine, etc. is known. One example of a machine which performs such a color image forming process is the tandem-type image formation device mentioned above in which color component image of each color is formed onto a separate photoconductor with a separate optical scanning device. In such a configuration, some abnormality may occur in a resulting image, when a color deviation due to difference in a manner of scan line bending occurring on each color component image between the respective color components. Thereby, image quality in the finally obtained color image is degraded. The term of color deviation includes a phenomenon in which colors occurring in the finally obtained color image are not those which are desired originally.

Recently, as one trend in manufacture of the optical scanning device (a lens or so), such a special surface as an aspherical surface is employed as a surface of an optical system used there. In this regard, an image-forming optical system made of a resin or plastic material takes an attention as a method of enabling easy manufacture of such special surfaces at low costs and thus advantageous in a recent mass production environment.

As for the image-forming optical system of resin or plastic material, the optical characteristics tend to change in response to change in ambient temperature or humidity, which may result in change in the above-mentioned optical characteristics whereby the uniform velocity performance may be degraded or the scan line bending phenomena may likely to occur. As a result, when performing color image formation of dozens of sheets continuously for example, the temperature inside the machine rises by the continuation operation of image formation processing, and the optical characteristics of the image-forming optical system there may change. Thereby, the uniform velocity performance or scan line bending manner on the optical scanning device for each color component change gradually. As a result, the color tone may completely differ between a resulting color image obtained at the beginning of the above-mentioned continuous image forming process and a resulting color image obtained at the end of the same process.

The above-mentioned tandem-type image formation device will now be described in detail. There, four drums of photoconductors for respective color components are arranged in a recording paper conveyance direction. Each photoconductor drum is exposed by a corresponding optical scanning device, and a latent image is formed on the photoconductor. The thus-obtained latent images are visualized by toners of the respective color components, i.e., yellow, cyan, magenta and black. Then, these visualized images are transferred onto a recording paper one by one in a piling-up manner, and, thus, a full-color image is obtained on the recording paper. Such a configuration of image formation device is put in practical use as a digital color copying machine or a color laser printer.

Such an image formation device of a 4-drum tandem type is advantageous in comparison to another type of color image formation device in which a (electrostatic) latent image for each color component is formed on a single common photoconductor one by one using a single common optical scanning device. In this type of image formation device, the latent image thus formed is visualized one by one as a visible image of yellow, magenta, cyan, and black, and, then, the thus-formed visible image is transferred onto a recording paper, one by one. In comparison with this type of machine, the tandem-type machine is advantageous in that full-color image formation can be archived theoretically at the same rate as that in case of monochrome image formation. Thus, high-speed color image formation or printing is achieved by the tandem-type machine. However, in the tandem-type machine, since a separate scanning image-formation optical system is provided for each of photoconductor drums, the above-mentioned color deviation may likely to occur as mentioned above, when a visible image (toner image) is transferred on the same recording paper from each separate photoconductor drum in the piling-up manner.

As causes of the color deviation along the subscanning direction, the following ones are expected: Rotation speed variation in the drum-type photoconductors; positional deviation among scan lines drawn by the optical scanning devices for respective color components; deviation in manner of scan line bending among the respective color components; shift of scan lines or change in manner of scan line bending due to environmental transition or temperature rise according to progress of the above-mentioned continuous image formation process, and so forth. Especially, the temperature rise according to the progress of image formation process may cause serious optical performance transition in optical devices made of resin/plastic materials.

As a method of reducing the color deviation, various methods have been proposed. In one plan, disclosed by Japanese patent No. 3262409, when the temperature in a machine exceeds a threshold, the amount of toner image transfer registration deviation is detected, and, based thereon, an actuator is driven so as to correct the positional deviation. In another plan disclosed by Japanese laid-open patent application No. 2001-133718, positional adjustment of an optical scanning device provided for each photoconductor drum is performed together with a housing thereof with respect to the photoconductor drum. In another plan, a long lens included in the optical scanning device is deformed so as to correct the scan line bending as disclosed by Japanese laid-open patent application No. 10-268217.

According to the above-mentioned plan of Japanese patent No. 3262409, it may be difficult to carry out a high-speed drive of the actuator which drives a long heavy mirror, and, thus, when a temperature inside the machine changes rapidly at a time of continuation image formation, it may be difficult to achieve a timely response thereto.

In the method of Japanese laid-open patent application No. 2001-133718, the cost may increase as the mechanism for the adjustment tends to become complicated. Moreover, the scan line bending phenomena occurring gradually due to temperature change or the like may not be controlled well.

In the method of Japanese laid-open patent application No. 10-268217, it may be effective to well correct the scan line bending at a time of initial setting state. However, it may be difficult to deal with a problem occurring gradually due to a temperature change, or the like, occurring at a late stage.

SUMMARY OF THE INVENTION

The present invention has been devised for the purpose of solving the above-mentioned problems, and an object of the present invention is to provide an image forming system or an optical scanning system in which optical scanning characteristics can be well controlled along the main and subscanning directions.

Another object of the present invention is to provide an optical scanning system in which, in case the system is applied to a tandem-type image formation device for producing a full-color image, even when a positional deviation of scan lines among respective color component images, disagreement in manner of scan line bending thereamong, or the like, occurs due to a rapid temperature change in the machine, color deviation otherwise occurring can be well avoided.

An optical scanning characteristic control scheme according to the present invention is applied to an optical scanning system in which a beam is deflected, and the deflected beam is converged and directed toward a scanning surface, so that optical scanning of the scanning surface is performed by an optical spot formed thereon by the deflected beam. This scheme comprises the process of:

a) disposing a beam deflection control device on the light path of the beam before it is incident on the scanning surface; and b) controlling a beam deflection amount of the beam deflecting device provided to an incident beam so as to control a scanning characteristic of the optical scanning.

Thereby, when the beam deflection control device is formed of an array of liquid crystal deflection devices each of which has a function of deflecting an incident beam in a subscanning direction and/or a main scanning direction dynamically according to a control performed based on a detection result of a current optical scanning state (scan line bending, scan line inclination, scan line shift and/or uniform velocity performance), the current scanning characteristic can be positively corrected dynamically. Thereby, in particular in a case of full-color image formation system such as a tandem-type machine in which beams for respective predetermined color components, i.e., yellow, magenta, cyan and black, or so, are used for scanning respective photosensitive media (such as photoconductors) so as to form respective latent images thereon which are then combined in a predetermined manner such that a full-color image be thus obtained, and a possible deviation in scan line characteristics among the respective color components may degrade the finally obtained full-color image especially with respect to a color deviation, the above-mentioned scheme according to the present invention is advantageous in that the scanning characteristics can be dynamically corrected so that a high-quality full-color image can be obtained even in a situation in which a change in the state in the machine such as temperature rise due to continuous image formation process might otherwise cause a change in the scanning characteristic resulting in degradation of a color finally obtained from combination of the respective color components.

BRIEF DESCRIPTION OF THE DRAWINGS

Other objects and further features of the present invention will become more apparent from the following detailed description when read in conjunction with the accompanying drawings:

FIGS. 3A through 3C illustrate another example of a liquid crystal deflection device applicable to the present invention;

FIG. 16 illustrates an operation flow chart applicable to an operation of an image formation device according to the present invention;

DETAILED DESCRIPTION OF THE PREFERRED EMBODIMENTS

Preferred embodiments of the present invention will now be described.

Figure 1:
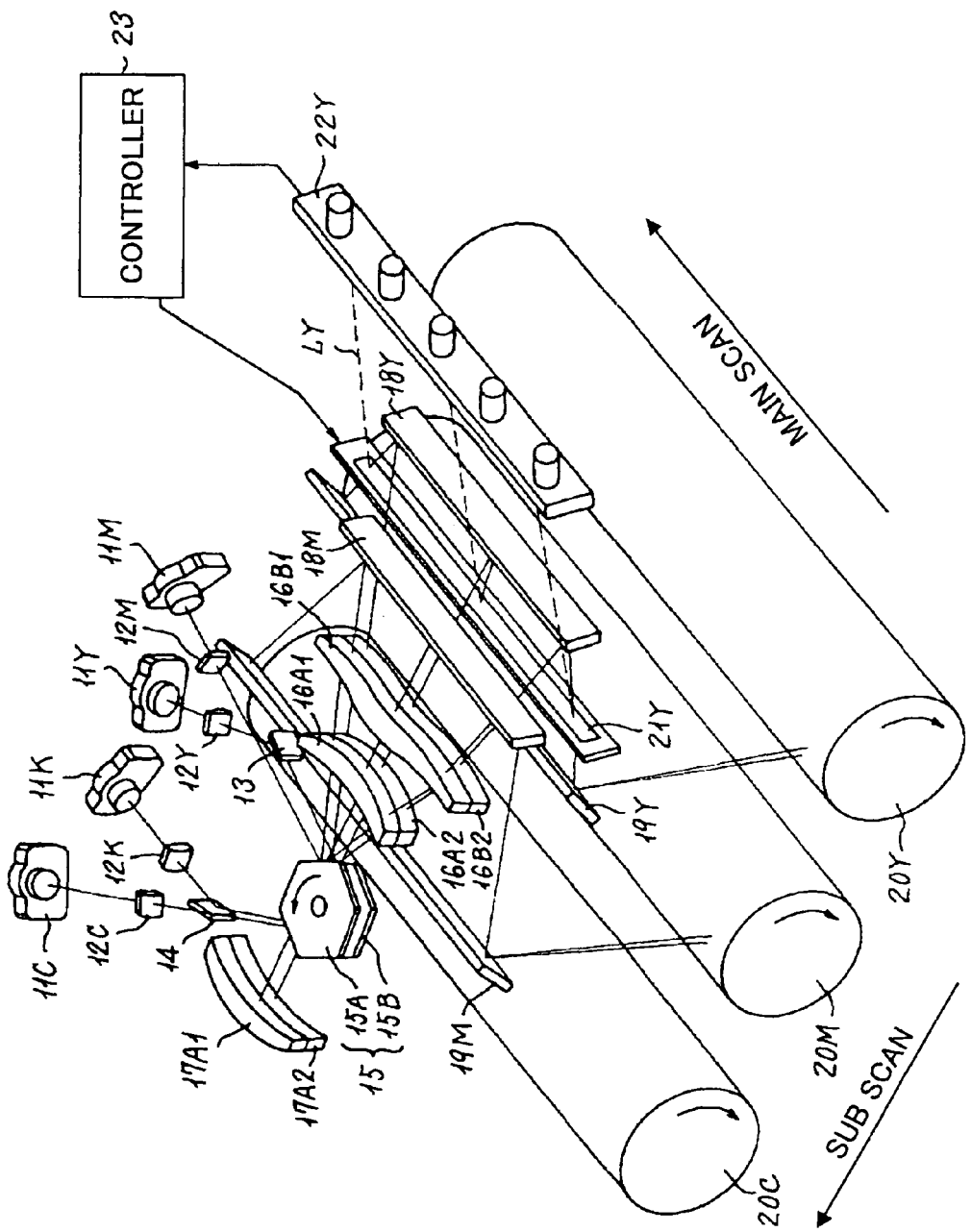
FIG. 1 shows a perspective view of an image formation device according to a first embodiment of the present invention.

FIG. 1 shows an image formation device in one embodiment of the present invention. The image formation device shown in FIG. 1 uses photoconductors having photoconductivity, and forms a full-color image. The full-color image is formed in combination of yellow, magenta, cyan, and black color component images which are formed in a piling-up manner on a common sheet-like recording medium, i.e., a recording paper, for example.

As a basic configuration of such a type of color image formation device is well-known, only parts/components essential to the present invention are shown in FIG. 1. Light source devices 11Y, 11M, 11C, and 11K employ semiconductor lasers as light sources and emit laser beams respectively in form of parallel beams, or the like. In this embodiment, the light source used in each light source device is a semiconductor laser array, and two semiconductor laser light-emission parts are arranged at a predetermined interval (in the subscanning direction) therein. Therefore, two parallel beams are emitted from each light source device.

The light source device 11Y is used for drawing a yellow component image. When each light-emission parts of the light source device 11Y is driven by image information signal on a yellow component image, two parallel beams modulated in intension by the yellow component image information is emitted. Then, the thus-produced beam is condensed only in the subscanning direction by a cylindrical lens 12Y, and is reflected by a reflector 13. Thereby, these beams form line images long along a main scanning direction respectively on a deflection reflective surface of a polygon mirror 15B.

The two beams reflected by the deflection reflective surface of the polygon mirror 15B thus becoming deflected beams pass through lenses 16A2 and 16B2 which act as an fθ lens which is a scanning image-formation optical system, and then are reflected by light path bending mirrors 18Y and 19Y, in sequence. Thereby, by the function of the fθ lens, they form two optical spots mutually separated in the subscanning direction on a photoconductor 20Y, respectively.

These light spots carry out a multi-beam scan (main scan) of the photoconductor 20Y (scanning surface) so as to draw simultaneously two scan lines according to a uniform rotation of the polygon mirror 15B. A running speed of each optical spot is made uniform by the function of the fθ lens.

The photoconductor 20Y has a shape of a cylinder, and in advance of the optical scan, uniform electrification thereof is carried out, and a uniform rotation of a circumferential surface (scanning surface) in a direction shown by an arrow in the figure is performed. A subscanning is thus performed by the above-mentioned uniform rotation of the photoconductor 20Y, and, thereby, a yellow latent image for a yellow component image is formed on the photoconductor 20Y in a form of electrostatic latent image.

The light source device 11M is used for drawing a magenta component image. When each light-emission parts of the light source device 11M is driven by image information signal on a magenta component image, two parallel beams modulated in intension by the magenta component image information is emitted. Then, the thus-produced beam is condensed only in the subscanning direction by a cylindrical lens 12M. Thereby, these beams form line images long along the main scanning direction respectively on a deflection reflective surface of a polygon mirror 15A which has the same configuration as the polygon mirror 15B, and is rotated integrally with the polygon mirror 15B by a common shaft of a drive motor (not shown).

The two beams reflected by the deflection reflective surface of the polygon mirror 15A thus becoming deflected beams pass through lenses 16A1 and 16B1 which also act as an fθ lens which is a scanning image-formation optical system, and then are reflected by light path bending mirrors 18M and 19M, in sequence. Thereby, by the function of the fθ lens, they form two optical spots mutually separated in the subscanning direction on a photoconductor 20M, respectively.

These light spots carry out a multi-beam scan (main scan) of the photoconductor 20M (scanning surface) so as to draw simultaneously two scan lines according to a uniform rotation of the polygon mirror 15A. A running speed of each optical spot is made uniform by the function of the fθ lens.

The photoconductor 20M has a shape of a cylinder, and in advance of the optical scan, uniform electrification thereof is carried out, and a uniform rotation of a circumferential surface in a direction shown by an arrow in the figure is performed. A subscanning is thus performed by the above-mentioned uniform rotation of the photoconductor 20M, and, thereby, a magenta latent image for a magenta component image is formed on the photoconductor 20M as an electrostatic latent image.

The light source device 11C is used for drawing a cyan component image. When each light-emission parts of the light source device 11C is driven by an image information signal on a cyan component image, two parallel beams modulated in intension by the cyan component image information is emitted. Then, the thus-produced beam is condensed only in the subscanning direction by a cylindrical lens 12C. Thereby, these beams form line images long along the main scanning direction respectively on a deflection reflective surface of a polygon mirror 15A.

The two beams reflected by the deflection reflective surface of the polygon mirror 15A thus becoming deflected beams pass through an optical system (not completely shown, including a lens 17A1 which acts as a part of an fθ lens) disposed approximately symmetrically with respect to the polygon mirror 15A to the optical system provided for the magenta component image drawing, which is a scanning image-formation optical system. Thus, the beams are directed toward a photoconductor 20C having photoconductivity. Thereby, by the function of the fθ lens, they form two optical spots mutually separated in the subscanning direction on the photoconductor 20C, respectively.

These light spots carry out a multi-beam scan (main scan) of the photoconductor 20C (scanning surface) so as to draw simultaneously two scan lines according to a uniform rotation of the polygon mirror 15A. A running speed of each optical spot is made uniform by the function of the fθ lens. The photoconductor 20C has a shape of a cylinder, and in advance of the optical scan, uniform electrification thereof is carried out, and a uniform rotation of a circumferential surface in a direction shown by an arrow in the figure is performed. A subscanning is thus performed by the above-mentioned uniform rotation of the photoconductor 20C, and, thereby, a cyan latent image for a cyan component image is formed on the photoconductor 20C as an electrostatic latent image.

The light source device 11K is used for drawing a black component image. When each light-emission parts of the light source device 11K is driven by an image information signal on a black component image, two parallel beams modulated in intension by the black component image information is emitted. Then, the thus-produced beam is condensed only in the subscanning direction by a cylindrical lens 12K, and reflected by a reflective mirror 14. Thereby, these beams form line images long along the main scanning direction respectively on a deflection reflective surface of the polygon mirror 15B.

The two beams reflected by the deflection reflective surface of the polygon mirror 15B thus becoming deflected beams pass through an optical system (not completely shown, including a lens 17A2 which acts as a part of an fθ lens) disposed approximately symmetrically with respect to the polygon mirror 15B to the optical system provided for the yellow component image drawing, which is a scanning image-formation optical system. Thus, the beams are directed toward a photoconductor having photoconductivity, not shown, which has the same configuration as that of the above-mentioned photoconductors 20Y, 20M and 20C, and is disposed in a manner in which the rotation shaft thereof is parallel to those of the photoconductors 20Y, 20M and 20C. Thereby, by the function of the fθ lens, they form two optical spots mutually separated in the subscanning direction on the photoconductor, respectively.

These light spots carry out a multi-beam scan (main scan) of the photoconductor (scanning surface) so as to draw simultaneously two scan lines according to a uniform rotation of the polygon mirror 15B. A running speed of each optical spot is made uniform by the function of the fθ lens. The photoconductor has a shape of a cylinder, and in advance of the optical scan, uniform electrification thereof is carried out, and a uniform rotation of a circumferential surface in a direction same as those of the other photoconductors is performed. A subscanning is thus performed by the above-mentioned uniform rotation of the photoconductor, and, thereby, a black latent image for a black component image is formed on the photoconductor as an electrostatic latent image.

Then, yellow latent image, magenta latent image, cyan latent image, and black latent image formed on the respective photoconductors are developed by development devices which are not shown, respectively, and thus become toner images of yellow, magenta, cyan and black. It is noted that a configuration is made such that the scan lines drawn by the beams of the respective color components be mutually parallel. Furthermore, a configuration is made such that the optical systems which form the light paths of the beams of the respective color components be optically equivalent mutually.

On a common sheet-like recording medium (for example, a transfer paper) which is not shown, alignment of the respective color component toner images is carried out mutually, they are piled up, and thus, form a full-color image on the sheet-like recording medium. After that, the full-color image thus formed on the sheet-like recording medium is fixed thereto by a fixing device which is not shown. The sheet-like recording medium onto which the full-color image is thus fixed is ejected from the image formation device.

Transfer to the sheet-like recording medium of each above-mentioned color component toner image can be performed by one of well-known various methods. For example, a method disclosed by Japanese laid-open patent application No. 2001-228416 may be applied. That is, an endless belt-like intermediate transfer belt is prepared in a manner such that the respective photoconductors be touched thereby. Then, in an inner circumferential surface of the intermediate transfer belt, transfer devices (transfer chargers, etc.) are prepared at portions corresponding to the respective photoconductors. Then, fixed-velocity rotation of the intermediate transfer belt is carried out. Thereby, the color component toner images are overlapped mutually one by one by the action of the respective transfer devices, and thus, a full-color image is obtained on the transfer belt, which is then transferred from on the transfer belt to the sheet-like recording medium.

Alternatively, instead of the above-mentioned transfer belt, an endless belt-like conveyance belt may be prepared, thereby, the photoconductors 20Y through 20K may be touched. Then, a transfer device, such as a transfer charger, is prepared in a portion corresponding to each photoconductor, and the sheet-like recording medium is supported on the conveyance belt. Then, the sheet-like recording medium is moved by the conveyance belt, and has the respective color component toner images transferred thereto from the respective photoconductors in sequence one by one directly by the functions of the respective transfer devices. The transfer operation is performed in such a manner that the respective color component toner images are piled up precisely on the sheet-like recording medium so that a full-color image be formed finally on the sheet-like recording medium directly.

In the color image formation device of FIG. 1 described above, either a line sequential method in which simultaneous optical scan with two optical spots draws two adjacent scan lines or an interlaced scanning method in which the same draws two scan lines not adjacent may be applied in the multi-beam scanning operation. In the above-mentioned description, the optical scan of two scan lines is carried out simultaneously. However, other than this manner, the number of the light-emission sources in each light-source device may be increased, and thereby, more than two scan lines may be drawn simultaneously. Other than, this, it is also possible to apply a single beam scanning method in which optical scanning is performed by a single beam for each photoconductor.

In each multi-beam scan, the optical scanning paths on the photoconductor along which the two optical spots run simultaneously can be determined as having the substantially same way of scan line bending.

In the embodiment shown in FIG. 1, each fθ lens is formed of a resin material, and the lenses 16A1 and 16B1 forming the fθ lens for drawing the yellow latent image, and the lenses 16A2 and 16B2 forming the fθ lens for drawing the magenta latent image are formed by an integral molding manner, respectively. By forming the lenses 16A1 and 16A2 and the lenses 16B1 and 16B2 by the integral molding manner, cost saving can be achieved in comparison to a case where these four lenses are formed separately. The same manner may be applied to form the fθ lens for drawing the cyan latent image drawing, and the fθ lens for drawing the black latent image.

Along with providing these fθ lenses from the resin material, the optical characteristics of the fθ lenses may easily change according to change in temperature and humidity, and thereby, the way of scan line bending and uniform velocity performance also may easily change, as mentioned above. According to this embodiment of the present invention, correction of the scan line bending is performed by the following manner:

As shown in FIG. 1, a liquid crystal deflection device array 21Y is provided for this purpose. The liquid crystal deflection device array 21Y is provided with its longitudinal axis parallel to the main scanning direction on the optical path between the optical-path bending mirrors 18Y and 19Y. Further, a scan line bending detection device 22Y is provided. The scan line bending detection device 22Y is provided also with its longitudinal axis parallel to the main scanning direction.

As the liquid crystal deflection device array 21Y is slightly inclined in the subscanning direction, a part of the deflected beam incident onto the liquid crystal deflection device array 21Y from the light-path bending mirror 18Y is reflected by a glass substrate, provided on the surface of the liquid crystal deflection device array 21Y.

The scan line bending detection device 22Y is disposed in such a manner that a light-receiving part thereof be used as a detection surface on which an optical spot is formed by the above-mentioned part LY of the deflected beam reflected by the liquid crystal deflection device 21Y, and receives the reflected deflected beam part LY. The above-mentioned detection surface is a surface approximately optically equivalent to a part of the scanning surface on the photoconductor 20Y which is optically scanned by the beam originally same as the beam part LY.

The output of scan line bending detection device 22Y is input into a controller 23 made of a computer, etc. The controller 23, based on this input from the scan line bending detection device 22Y, generates a correction signal indicating the scan line bending state on the photoconductor 20Y detected, and corrects the thus-indicated scan line bending state by providing this signal to the liquid crystal deflection device array 21Y. The scan line bending state on the photoconductor 20Y is corrected by the liquid crystal deflection device array 21Y which appropriately controls the light path of the incident beam by the function of the liquid crystals according to the given correction signal.

Although not shown in FIG. 1 in order to avoid complication, a pair of the same liquid crystal deflection device array and scan line bending detection device as the above-mentioned liquid crystal deflection device array 21Y and the scan line bending detection device 22Y are also provided on the light path directed toward each of the photoconductors 20M, 20C, and 20K. The detection output of each scan line bending detection device of each pair is also input to the controller 23, which then controls the corresponding liquid crystal deflection device array based on the input, and the controller 23 corrects the scan line bending state on each photoconductor in the same manner.

The above-mentioned liquid crystal deflection device array will now be described. Below, the liquid crystal deflection device array is described assuming that it is driven by an electric signal, while, in general, a liquid crystal deflection device is driven either by an electric signal or by a magnetic signal.

In general, a liquid crystal deflection device which deflects a beam either by controlling a refractive index thereof or by controlling diffraction effect thereof with an electric signal.

First, a liquid crystal deflection device in a type such that the refractive index thereof is controlled will now be described. Such a type of liquid crystal deflection device is disclosed by Japanese laid-open patent application No. 63-240533. FIGS. 2A and 2B show one example thereof.

In FIG. 2B, a liquid crystal 1 is a nematic liquid crystal positive in dielectric anisotropy, and is sealed in a form of thin film between a pair of transparent orientation films 2A and 2B which has a predetermined gap maintained by means of spacers 3. The liquid crystal includes liquid crystal molecules 1A each of which is long along its molecule axis direction. The orientation film 2A has undergone orientation processing such that, thereby, the molecule axis of each liquid crystal molecule 1A becomes perpendicular to the surfaces of the orientation film 2A, while the orientation film 2B has undergone orientation processing such that, thereby, the molecule axis of each liquid crystal molecule 1A becomes parallel to the surfaces of the orientation film 2B.

A transparent resistance film 4 of ZnO etc. is formed outside of the orientation film 2A. The transparent resistance film 4, the orientation films 2A and 2B, and liquid crystal 1 are sandwiched by a pair of transparent glass substrates 5A and 5B, as shown in FIG. 2B. A transparent electrode film 6 of ITO, etc. is formed on one side of the glass substrate 5B on the side of the orientation film 2B through whole surface thereof.

On the other hand, electrodes 7A and 7B in a pattern shown in FIG. 2A are formed on a side of the glass substrate 5A on the side of the orientation film 2A, and these electrodes 7A and 7B are in contact with the resistance film 4, as shown in FIG. 2B. They are formed of the transparent electrodes of ITO, etc. as mentioned above, for transmitting an incident beam. However, in case the electrodes 7A and 7B are disposed in such positions as not blocking any relevant beam, they may be formed of a material such as metal films which are not transparent.

In the state of FIG. 2B, the electrode film 6 and the electrode 7B are grounded, and when a voltage V is applied between terminals A and B of the electrodes 7A and 7B shown in FIG. 2A, the potential of the resistance film 4 declines linearly from the electrodes 7A through the electrode 7B. For this reason, between the resistance film 4 and transparent electrode film 6, an electric field occurs along the right-and-left direction of the figure which declines linearly from the top through the bottom in FIG. 2B.

This electric field drives the liquid crystal 1 in such a manner that the liquid crystal molecules 1A are rotated so that each molecule axis may become parallel to the electric field. Since the rotation angle of the liquid crystal molecule 1A is linearly proportional to the strength of the electric field given, the molecule axis of each liquid crystal molecule 1A present near the electrode 7A tends to become parallel to the direction of electric field (the right-and-left direction in the figure) while the same near the electrode 7B has almost no influence by the electric field, and, as a result, the molecule axis of each liquid crystal molecule 1A is almost retained as being parallel to the electrode film 6.

The dielectric constant of each liquid crystal molecule 1A becomes larger in a direction parallel to its molecule axis, and smaller in a direction which intersects perpendicularly with its molecule axis. For this reason, the refractive index becomes larger in a direction which is nearer to the direction parallel to the molecule axis of each liquid crystal molecule in the liquid crystal. Accordingly, according to the variation in direction of molecule axis mentioned above with reference to FIG. 2B, the refractive index of the liquid crystal 1 becomes larger where the molecule axis is directed nearer to a direction parallel to the electric field while the same becomes smaller where the molecule axis is directed nearer to a direction perpendicular to the electric field. This decline of the refractive index becomes linear from the side of the electrode 7A through the electrode 7B, as shows in FIG. 2C.

Therefore, when incidence of a beam is made onto the liquid crystal deflection device having such a refractive-index distribution from the right-hand side of FIG. 2B, the beam turns toward the side on which the refractive index is higher (the side at the top in the figure) as it is transmitted by the liquid crystal deflection device.

Figure 2C:
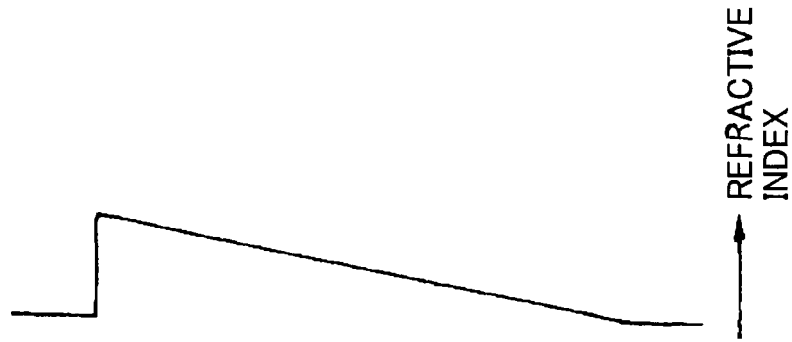
FIGS. 2A through 2C illustrate one example of a liquid crystal deflection device applicable to the present invention.
Figure 2B:
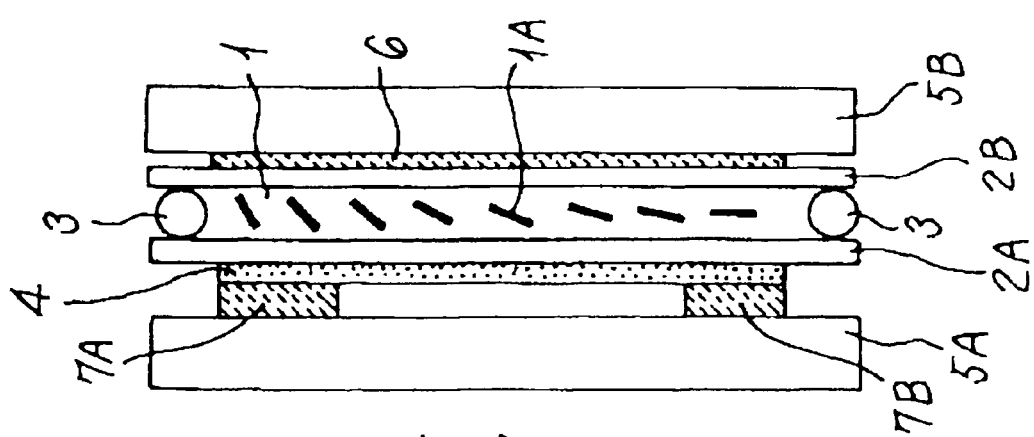
Figure 2A:
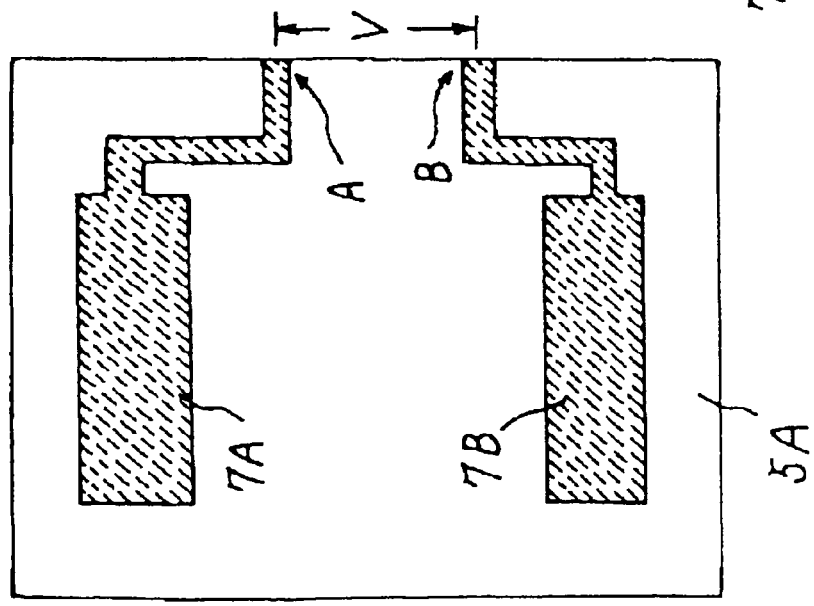

By altering the electrode to be grounded from the electrode 7B into the electrode 7A, and, also, inverting the direction of the voltage applied between the terminals A and B, the refractive-index distribution which declines from the electrode 7B side toward the electrode 7A side contrary to the case of FIGS. 2A through 2C occurs, and a transmitted beam can be deflected downward in the figure in this case.

Thus, beam deflection can be achieved dynamically by means of refractive index control in the liquid crystal deflection device. According to this configuration, the beam deflection amount or beam deflection angle is saturated by a value inherent to a particular liquid crystal deflection device. No further beam deflection can be obtained after the saturation occurs. A direct-current voltage may be used as an electric signal which drives the liquid crystal deflection device. However, in terms of the life of the liquid crystal deflection device, the electric signal to be applied is preferably such that a pulse-like or sinusoidally modulated signal and the average of the voltage become approximately 0 volts. Control of the deflection angle can be made by changing the voltage of the electric signal applied to the liquid crystal deflecting device. However, instead, it is also possible to achieve the same effect by controlling the duty ratio in pulse of the pulse-like modulated signal.

FIGS. 3A through 3C shows anther example of the liquid crystal deflection device employing the scheme of controlling the refractive index with an electric signal. In order to avoid complexity, the same reference numerals are applied as those in FIGS. 2A through 2C. This device is a variant of the device shown in FIGS. 2A through 2C. In the configuration shown in FIGS. 3A through 3C, on the side of the glass substrate 5A, three transparent resistance films 4A, 4B and 4C are provided as shown in FIG. 3A. Patterning of a transparent electrode is made as shown, and, thus, electrodes 7A1 and 7B1 are provided for the resistance film 4A, electrode 7A2 and 7B2 are provided for the resistance film 4B, and electrodes 7A3 and 7B3 are provided for the resistance film 4C. When a drive signal is applied between terminals A and B, a refractive-index distribution as shown in FIG. 3C occurs in this configuration. In this case, since the rate of change of the electric field with respect to the voltage V applied between the terminals A and B can be made larger, as compared with the device configuration shown in FIGS. 2A through 2C, a larger refractive-index inclination is acquired more, and thereby, a larger beam deflection angle (the amount of beam deflection) can be acquired.

Figure 4A:
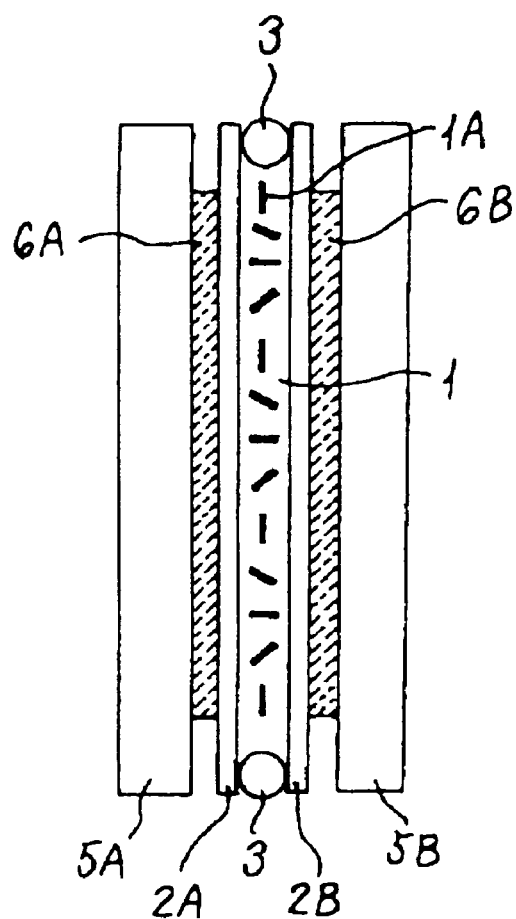
FIGS. 4A and 4B illustrate another example of a liquid crystal deflection device applicable to the present invention.
Figure 4B:
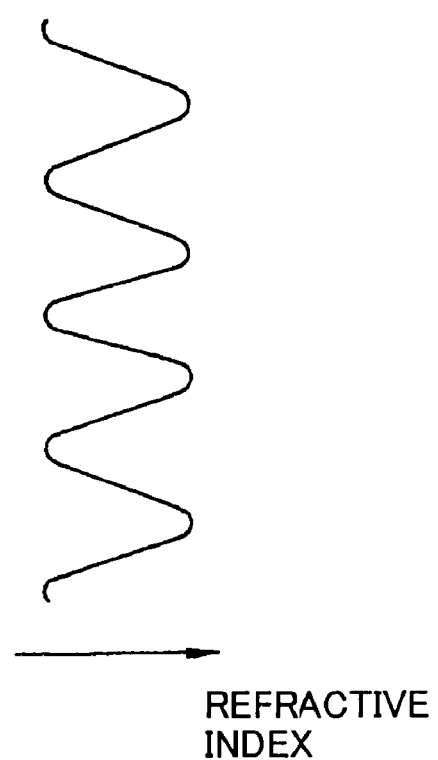

FIGS. 4A and 4B show another example of the liquid crystal deflection device. This liquid crystal deflection device provides diffraction controlled according to an electric signal. This type of liquid crystal deflection device is disclosed by Japanese laid-open patent application No. 8-313941. Also in this case, in order to avoid complexity, the same reference numerals are given as those in the case of FIGS. 2A through 2C.

In FIG. 4A, a nematic liquid crystal negative in dielectric anisotropy such that the dielectric constant along the direction of the molecule axis of liquid crystal molecule 1A is smaller than the dielectric constant of the direction which intersects perpendicularly with the molecule axis is employed as the liquid crystal 1. Between a pair of transparent orientation films 2A and 2B maintained by spacers 3 in a predetermined gap, the liquid crystal 1 in a form of thin layer is sealed.

Orientation films 2A and 2B are sandwiched by a glass substrate 5A which has a transparent electrode 6A, and a glass substrate 5B which has a transparent electrode 6B. The transparent electrodes 6A and 6B are formed in a shape of thin films made of ITO or the like, and are uniformly provided on the surfaces of the glass substrates 5A and 5B, respectively, with predetermined shapes (for example, rectangles).

The orientation films 2A and 2B have undergone orientation processing such that, in the liquid crystal 1, the direction of the molecule axis of each liquid crystal molecule 1A of the liquid crystal 1 may turn into a direction which intersects perpendicularly with the drawing. In such a configuration, when a direct current or the voltage of a low frequency on the order of 300 Hz or less is applied between the transparent electrode 6A and 6B, a diffraction lattice pattern which has a vertical lattice arrangement direction (which intersects perpendicularly with the above-mentioned orientation direction) in the figure is formed in the liquid crystal 1 (see paragraph [0054] of the above-mentioned Japanese laid-open patent application No. 8-313941). FIG. 4B shows a refractive-index distribution in the diffraction lattice pattern formed in this way.

When a beam is incident onto the liquid crystal deflection device having the above-mentioned configuration, the transmitted light causes diffraction light thanks to the above-mentioned diffraction lattice pattern (in the vertical direction of FIG. 4A). When the voltage value of the voltage in the low frequency is changed, the lattice pitch in the diffraction lattice pattern changes, and the diffraction angle changes (see paragraph [0057] of the above-mentioned Japanese laid-open patent application No. 8-313941).

Accordingly, as to ±1st light of the above-mentioned diffraction for example, the beam can be deflected in a predetermined direction (the vertical direction of FIG. 4A, in this example) by appropriately adjusting the deflection angle of the 1st light.

Moreover, when the voltage applied between the transparent electrodes 6A and 6B in the above-mentioned liquid crystal deflection device shown in FIG. 4A is made into a high frequency voltage, the diffraction lattice pattern in the direction which intersects perpendicularly to the orientation direction of the liquid crystal 1 occurs, and the diffracted light in the direction which intersects perpendicularly to FIG. 4A can be obtained. In this case, the diffraction angle can be controlled by controlling the envelope voltage of the high frequency voltage applied to the liquid crystal (see paragraph [0060] of the above-mentioned Japanese laid-open patent application No. 8-313941).

In the above, description has been made on the liquid crystal deflection device in the type which deflects an incident beam by an electric signal briefly.

According to the embodiment of the present invention, a liquid crystal deflection device having such a well-known configuration (not only in the above-mentioned type of being driven by an electric signal but also in a type of being driven by a magnetic signal which is also known) is utilized for correcting scanning characteristics occurring due to beam deflection onto a scanning surface by means of an optical scanning device, and also, for correcting the above-mentioned scan line bending which includes modes of scan line inclination and scan line positional deviation.

The liquid crystal deflection device array (an array of the above-mentioned liquid crystal deflection devices) may be provided either on the light source side of the optical deflection scanning device or in the scanning surface side of the optical deflection scanning device. The former plan can miniaturize the liquid crystal deflection device as compared with the latter plane, and, thus, is advantageous in terms of reduction in costs. However, in order to correct the scan line bendinging satisfactorily, it is necessary to drive the liquid crystal deflection device array at a sufficiently high deflection rate with respect to the scanning frequency in the optical deflection scanning device. Generally, the liquid crystal deflection device inherently has the property such that the response speed becomes lower as the required beam deflection angle is increased (decreasing in proportion to the approximately 2nd power of the deflection angle). Accordingly, high-speed correction operation is difficult to be achieved. The case where providing the liquid crystal deflection device on the light source side of the optical deflection scanning device has this issue.

In contrast thereto, in case the liquid crystal deflection device array is provided on the scanning surface side of the optical deflection scanning device, the required rate of changing the correction amount in the beam deflection angle provided by the liquid crystal deflection device array should not be increased so much. In other words, a certain value in the beam deflection angle once set may be maintained for a relatively long interval. For example, in case a required amount by which the beam deflection angle is to be changed is within five minutes, the response rate of less than approximately 0.1 seconds can be achieved, and, thus, a sufficient response rate can be provided. Accordingly, it is preferable that the liquid crystal deflection device array be provided on a deflected beam as in the configuration shown in FIG. 1.

According to the first embodiment of the present invention described above, since the scan line bending of the optical spot performing the optical scanning for every photoconductor is detected, even when a change occurs in the scan line bending resulting from a change in the characteristics of the fθ lens due to aging, environmental change or so arises, proper scan line bending correction can be achieved at any time.

The scan line bending state may be detected before the color image formation process is performed each time, or may be detected at predetermined intervals, i.e., once a day, every three days, or the like, or, may be performed on an input operation by a users. In case the color image formation process is repeated successively, change in the scan line bending state resulting from temperature rise inside the machine occurring due to the continuation image formation process can be coped with by carrying out the detection of the scan line bending state once, or several time per every image formation process.

Figure 5A:
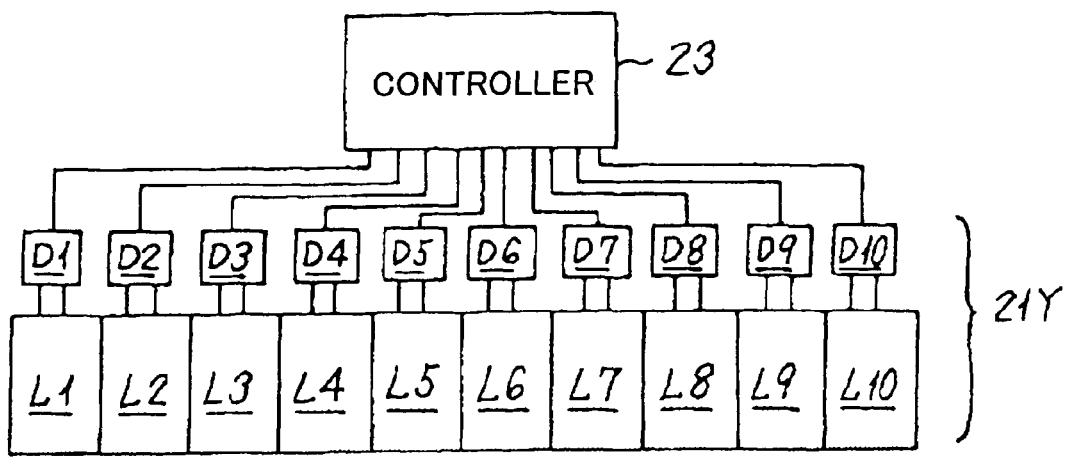
FIGS. 5A through 5D illustrate a scheme of scan line bending correction applicable to the present invention.

With reference to FIGS. 5A through 5D, description of the liquid crystal deflection device array 21Y according to the first embodiment of the present invention will now be made for a case of correction in the scan line bending on the photoconductor 20Y shown in FIG. 1. In FIG. 5A, the liquid crystal deflection device array 21Y is controlled by the controller 23. This liquid crystal deflection device array 21Y includes a plurality of liquid crystal deflection devices L1 through L10 arranged along the main scanning direction. Each device Li (i=1 through 10) of the liquid crystal deflection device array 21Y has a function of deflecting an incident beam along the subscanning direction (vertical direction in FIG. 5A). The plurality of devices of the liquid crystal deflection device array 21Y are continuously arranged without gaps therebetween. As described above, each liquid crystal deflection device of the liquid crystal deflection device array 21Y may be controlled either by an electric signal or by a magnetic signal, and thereby, deflects the incident beam at an arbitrary deflection angle. In this embodiment, the respective devices of the liquid crystal deflection device array 21Y have the same size, and are arranged at equal pitches therebetween.

Each liquid crystal deflection device of the liquid crystal deflection device array 21Y includes a driver circuit Di (i=1 through 10) for a relevant liquid crystal deflection device Li of the liquid crystal deflection device array 21Y, and each driver circuit Di is controlled by the controller 23. Each liquid crystal deflection device Li is the same as the liquid crystal deflection device shown in FIGS. 2A and 2B described above, for example, and is driven by an electric signal. In this case, the orientation films 2A, 2B which sandwich the liquid crystal and the transparent electrode 6 are common for the plurality of liquid crystal deflection devices L1 through L10 while the electrodes 7A, 7B and the transparent resistance film 4 which connects therebetween are provided for each liquid crystal deflection device Li of the plurality of liquid crystal deflection devices L1 through L10. Then, each liquid crystal deflection device Li of the liquid crystal deflection device array 21Y is individually driven by the relevant driver circuit Di via the electrodes 7A and 7B.

Figure 5B:
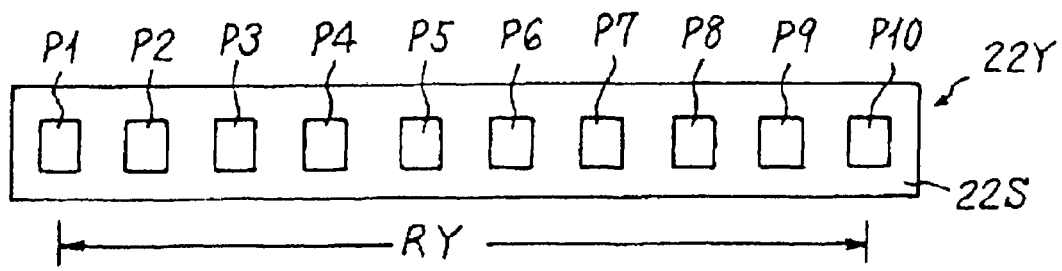

Optical sensors P1 through P10 are provided for the respective ones of the above-mentioned liquid crystal deflection devices L1 through L10 of the liquid crystal deflection device array corresponding, on the scan line bending detection device 22Y as shown in FIG. 5B. The respective light-receiving surfaces of these sensors P1 through P10 are arranged in the main scanning direction. These light-receiving surfaces correspond to the respective liquid crystal deflection devices L1 through L10 of the liquid crystal deflection device array 21Y. Then, when an optical spot is detected at the center of the light-receiving surface of each optical sensor Pi, the deflection beam which forms this optical spot can be regarded as passing through the center of the corresponding liquid crystal deflection device Li. In addition, a range RY shown in FIG.

5B corresponds to an effective drawing range (responsible scanning range) on the photoconductor 20Y.

Each optical sensor Pi of scan line bending detection device 22Y detects the position of the subscanning direction (the vertical direction in FIG. 5B) of the optical spot of the incident beam.

The optical sensors Pi are fixed on a fixing plate 22S made of a material having a thermal expansion coefficient not more than $1.0 \times 10^{-5}/°$ C. such as a glass (thermal expansion coefficient of $0.5 \times 10^{-5}/°$ C.), a ceramic material (alumina of thermal expansion coefficient of $0.7 \times 10^{-5}/°$ C., silicon-carbide of thermal expansion coefficient of $0.4 \times 10^{-5}/°$ C.), or the like. Thereby, detection accuracy can be prevented from being degraded due to an absolute shift or relative shifts of the light-receiving surfaces of the optical sensors Pi, caused by temperature change or the like, substantially.

Moreover, in order to avoid an influence of electric noise generated between the optical sensors Pi, a non-electric-conductivity material as mentioned above is suitable for the material of the fixing plate 22S. For example, if the fixing plate 22S were made by an aluminum alloy having the thermal expansion coefficient of $2.4 \times 10^{-5}/°$ C., the scan line bending detection accuracy might be degraded due to temperature change.

The scan line bending detection and scan line bending correction are performed by the following procedures in the configuration described above:

In FIG. 1, the optical deflection scanning device 15 is rotated before an actual color image forming process, and then, one light-emission source of the light source device 11Y is made to emit a light. At this time, the light emission of the light-emission source is performed intermittently and the optical spot of beam LY reflected by the liquid crystal deflection device 21Y for every light-emission is made incident onto each of the optical sensors P1 through P10 of the scan line bending detection device 22Y, one by one.

Figure 5C:
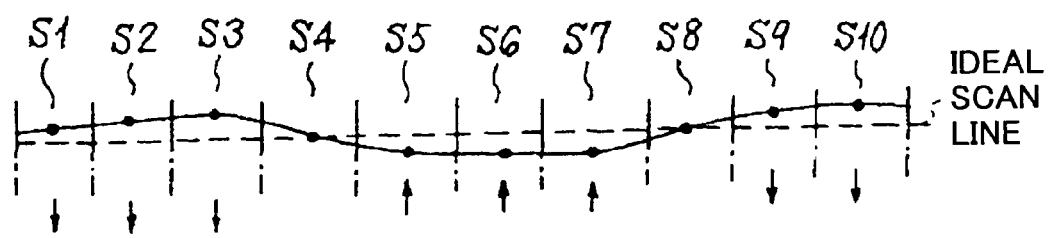

The scan line bending detection device 22Y outputs a signal indicating the position of the optical spot along the subscanning direction on each of the optical sensor Pi detects, to the controller 23. FIG. 5C shows the thus-detected positions of the optical spots along the subscanning direction by black dots. The broken line in the same figure denotes the ideal scan line which is linear along the main scanning direction.

The controller 23 approximates the thus-detected shape of the scan line by a polynomial by means of the well-known least-square method, or the like, based on thus-detected ten positions of the optical spots along the subscanning direction. This polynomial expresses a detected scan line bending state shown in FIG. 5C by a solid curve.

The controller 23 calculates the direction and the amount (deflection angle) by which each liquid crystal deflection device Li of the liquid crystal deflection device array 21Y should provide a beam deflection for the scan line bending correction along the subscanning direction, one by one. A range Si (i=1 through 10) in FIG. 5C denotes a scanning range where each liquid crystal deflection device Li of the liquid crystal deflection device array 21Y should deflect an incident beam, and a vertical arrow in each range Si denotes the direction of the required beam deflection to be provided for the purpose of correction.

The controller 23 determines a signal by which the above-mentioned direction and the amount of beam deflection should be provided by each liquid crystal deflection device Li of the liquid crystal deflection device array 21Y, and applies it to the relevant driver circuit Di. In this embodiment, the direction of beam deflection is controlled by controlling the direction of voltage applied to the terminal A and B (see FIG. 2A) of each liquid crystal deflection device, while the amount of beam deflection is controlled by controlling the duty ratio of the pulse signal of the voltage applied to the same terminals A and B, as mentioned above.

Thus, before starting of actual color image formation process, the direction and the amount of beam deflection provided by each liquid crystal deflection device Li of the liquid crystal deflection device array 21Y along the subscanning direction is adjusted. In FIG. 1, the same manner is applied also for each of the other photoconductors for the respective color components.

The direction and amount of beam deflection provided by each liquid crystal deflection device Li of the liquid crystal deflection device array 21Y which is thus set once is maintained until an alteration is needed. Thus, each liquid crystal deflection device Li of the liquid crystal deflection device array 21Y provides the same direction and amount of deflection to an incident beam each time the optical scanning is performed.

It is noted that, in case the detected deviation of the position of actual optical spot from the ideal one is so small that no correction is needed for each optical sensor Pi, the relevant liquid crystal deflection device Li of the liquid crystal deflection device array 21Y should provide no deflection on an incident beam, and, thus, the relevant driver circuit Di is made to output the driving signal of 0.

After that, when performing an optical scan (multi-beam scant on each photoconductor in this state, the optical scan can be achieved in a condition in which the scan line bending is well corrected. In fact, the optical scan to each photoconductor is of a multi-beam manner. However, since the scan line bending state is substantially same between the optical spots formed by the optical scans of the same photoconductor simultaneously as mentioned above, the scan line bending is well corrected on each optical spot for a respective color component.

Figure 5D:
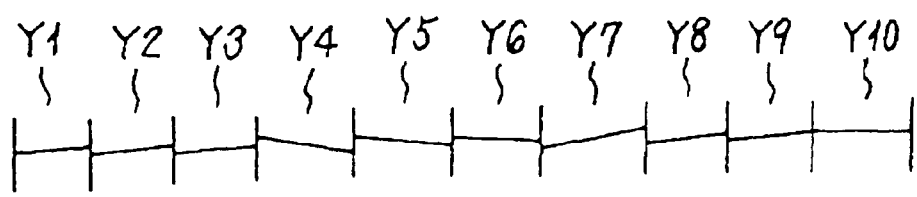

FIG. 5D shows the state of the thus-corrected scan line. In the figure, Yi (i=1 through 10) denotes a portion of scan line which each liquid crystal deflection device Li of the liquid crystal deflection device array 21Y corrects on the photoconductor 20Y. Although the scan line shown in the figure by a solid curve seems not very flat, this is merely because the scan line bending state is shown in FIG. 5C in a manner of exaggerated for the purpose of clear illustration. An actual case of scan line bending is at most on the order of 0.1 through 0.2 mm. Accordingly, even assuming that each liquid crystal deflection device Li of the liquid crystal deflection device array 21Y takes charge of the portion Yi of scan line is 30 mm, for example, a substantially flat scan line can be achieved.

When the number of the liquid crystal deflection device Li form the entire liquid crystal deflection device array 21Y is increased, scan line bending can be corrected more precisely or finely accordingly. Especially, by sufficiently reducing the width in the main scanning direction of each liquid crystal deflection device Li of the liquid crystal deflection device array 21Y, for example, on the order of 2 through 5 mm, the differences between respective adjacent liquid crystal deflection devices can be substantially regarded as a smooth one, and, thus, the scan line can be corrected into substantially continuous straight line more strictly.

By the above-described scan line bending correction operation, each of various modes of scan line bending such as inclination of scan line, positional deviation of scan line and so forth can be well corrected.

Moreover, it is also possible to intentionally provide difference in the pitch and density of the particular liquid crystal deflection device forming the entire liquid crystal deflection device array 21Y according to a given characteristics of scanning image-formation optical system (fθ lens, or the like). Specifically, especially in a portion in which the scanning position deviation is likely to occur due to temperature change or the like, the main scanning direction size of each liquid crystal deflection device Li of the liquid crystal deflection device array may be made smaller, and simultaneously the number of liquid crystal deflection device Li disposed there may be increased there. Thereby, without increasing the whole number of liquid crystal deflection device Li of the liquid crystal deflection device array much, and, thus, without increasing the whole number of optical sensors much, minimum necessary scan line bending correction can be well achieved.

With the color image formation device of FIG. 1, since, as described above, the scan line bending occurring due to optical scanning is well corrected for each photoconductor, the phenomenon of the above-mentioned color deviation in the subscanning direction resulting from disagreement of scan lines among the respective photoconductors can be reduced effectively. Thereby, satisfactory full-color images not substantially having color deviation in the subscanning direction can be obtained.

In the above-described embodiment of the present invention, the liquid crystal deflection device array has the series of liquid crystal subscanning-directional deflection devices, and a part of image-formation beam having passed through the scanning image-formation optical system (fθ lens) is detected by the scan line bendinging detection device. In particular, a part of image-formation beam having passed through the scanning image-formation optical system is extracted and is directed toward a detection surface which is equivalent to the scanning surface (photoconductor) by means of the liquid crystal deflection device array being inclined with respect to the subscanning direction, and the grass substrate of the liquid crystal deflection device array reflecting a part of the incident beam and directing it to the detection surface.

However, other than this method, as an alternative way, a special beam extracting device may be provided with a prism having a hemi-transparent film having the reflective factor on the order of 1 through 2%, for example, which may be disposed on the light path of the image-formation beam.

Figure 6A:
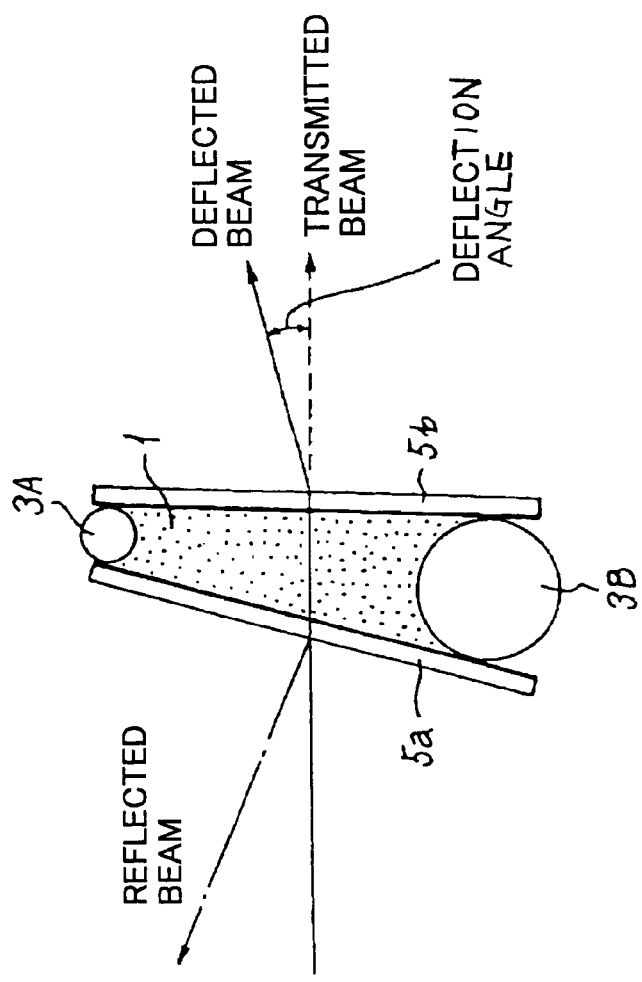
FIGS. 6A and 6B illustrate two examples of liquid crystal deflection device unit configurations applicable to the present invention.

Furthermore, as a further alternative way, even in case of using the liquid crystal deflection device array itself as a beam extracting device in the case of the above-mentioned embodiment, as shown in FIG. 6A the sizes of the spacers 3A and 3B sealing the liquid crystal may be differed from each other. Consequently, it is possible to give an angle between the glass substrate 5a (forming the transparent electrode, transparent resistance film and orientation film) and the glass substrate 5b (forming the transparent electrode and orientation film). Thereby, even in case the liquid crystal deflection device itself is not inclined, appropriate inclination of the glass substrate 5a by which a part of image-formation beams is extracted and directed toward the detection surface can be obtained.

The scan line bending is corrected in the embodiment described above using the series of liquid crystal subscanning-directional deflection devices. Thus, the problem of optical scanning concerning the subscanning direction is solved. However, there also is a problem of optical scanning concerning the main scanning direction, i.e., a problem on the uniform velocity. If distortions in the main scanning direction among the respective color component images differ mutually due to the insufficient performance of uniform velocity, a problem of a color deviation may occur in the main scanning direction.

Such an insufficiency in the uniform velocity performance can be detected by detecting a position of optical spot along the main scanning direction with each area sensor Pi (i=1 through n) shown in FIG. 5B, for example (As to specific may, a description will be made later). Thus, the area sensors Pi may be used both as the above-mentioned scan line bending detecting device and a uniform velocity performance detecting device. Then, by using the respective liquid crystal deflection devices Li (i=1 through n) of liquid crystal deflection device array 21Y shown in FIG. 5A in this case each having its deflection direction set in the main scanning direction, the relevant correction can be performed. Specifically, similar to the above-mentioned case of correcting the scan line bending, the incident beam is deflected, in this case, in the main scanning direction appropriately, so that the insufficiency in the uniform velocity performance can be corrected.

Figure 6B:
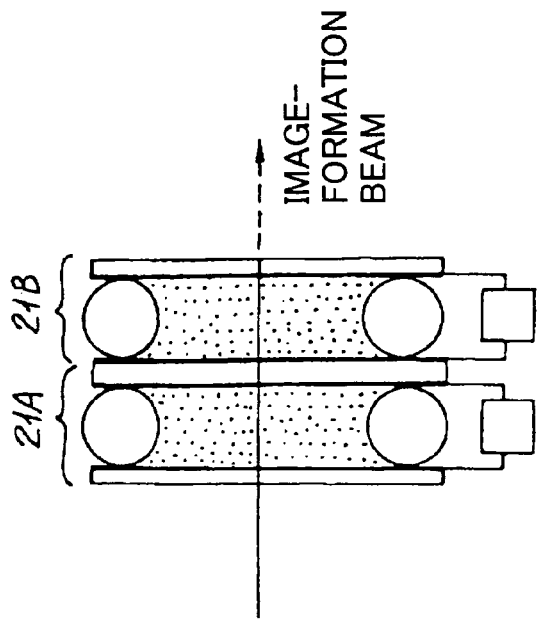

By providing both the series of liquid crystal subscanning-directional deflection devices and the series of liquid crystal main-scanning-directional deflection devices simultaneously, both the scan line bending and uniform velocity performance insufficiency can be corrected. In this case, as shown in FIG. 6B, it is preferable to provide an integrally combined structure of both the series of liquid crystal subscanning-directional deflection devices 21A and the series of liquid crystal main-scanning-directional deflection devices 21B, each being arranged in the main scanning direction which is perpendicular to the figure. These respective series of devices 21A and 21B are arranged along the beam transmission direction (horizontal direction in the figure)

Figure 7:
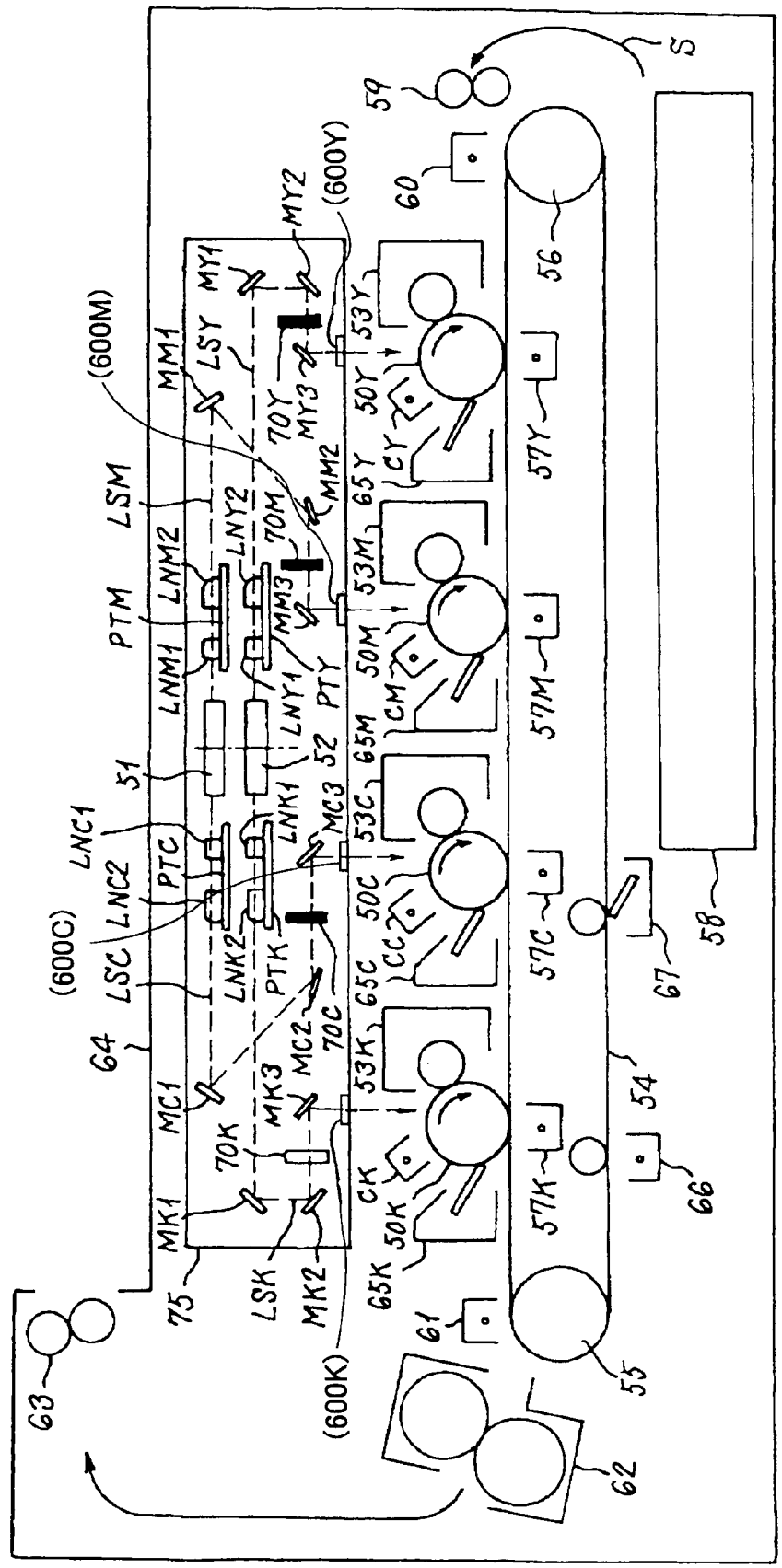
FIG. 7 shows a perspective view of an image formation device according to a second embodiment of the present invention.

FIG. 7 shows an image formation device in a second embodiment of the present invention. This device is also a color image formation device in a tandem type as the above-mentioned first embodiment shown in FIG. 1. In the configuration shown in FIG. 7, two polygon mirrors 51 and 52 are provided. These polygon mirrors 51 and 52 have the same configuration and are provided on a common rotation shaft so that they are rotated integrally. They act as optical deflection scanning devices. Although not shown, four light source devices are also provided. Beams coming from two thereof are incident on the polygon mirror 51 while two beams coming from the other two light source devices are incident on the polygon mirror 52. Arrangement of the respective light source devices and the optical arrangement on the optical path from each light source device to the polygon mirror 51/52 are the same as those in the configuration shown in FIG. 1.

Deflected beams LSY and LSK deflected by the polygon mirror 52 are beams for drawing a yellow component image and a black component image, respectively. After passing through lenses LNY1 and LNY2 which form an fθ lens as a scanning image-formation optical system, the deflected beam LSY is reflected by optical-path bending mirrors MY1, MY2, and MY3, in sequence, then, is directed to a photosensitive surface (acting as the scanning surface) of a photoconductor 50Y having an optical conductivity, and performs an optical scanning operation onto the above-mentioned photosensitive surface. The photoconductor 50Y has a cylinder shape, and uniform electrification is carried out thereon by means of an electrification device CY, is rotated in a direction of the arrow shown, the optical scanning is carried out thereon with an optical spot of the above-mentioned deflected beam LSY, and thus, a yellow component image is written thereon. Thereby, a yellow latent image is formed thereon.

After passing through lenses LNK1 and LNK2 which form an fθ lens as a scanning image-formation optical system, the deflected beam LSK is reflected by optical-path bending mirrors MK1, MK2, and MK3, in sequence, then, is directed to a photosensitive surface (acting as the scanning surface) of a photoconductor 50K having an optical conductivity, and performs an optical scanning operation onto the above-mentioned photosensitive surface. The photoconductor 50K has a cylinder shape, and uniform electrification is carried out thereon by means of an electrification device CK, is rotated in a direction of the arrow shown, the optical scanning is carried out thereon with an optical spot of the above-mentioned deflected beam LSK, and a black component image is written thereon. Thereby, a black latent image is formed thereon.

Deflected beams LSM and LSC deflected by the polygon mirror 51 are beams for drawing a magenta component image and a cyan component image, respectively. After passing through lenses LNM1 and LNM2 which form an fθ lens as a scanning image-formation optical system, the deflected beam LSM is reflected by optical-path bending mirrors MM1, MM2, and MM3, in sequence, then, is directed to a photosensitive surface (acting as the scanning surface) of a photoconductor 50M having an optical conductivity, and performs an optical scanning operation onto the above-mentioned photosensitive surface. The photoconductor 50M has a cylinder shape, and uniform electrification is carried out thereon by means of an electrification device CM, is rotated in a direction of the arrow shown, the optical scanning is carried out thereon with an optical spot of the above-mentioned deflected beam LSM, and the magenta component image is written thereon. Thereby, the magenta latent image is formed thereon.

After passing through lenses LNC1 and LNC2 which form an fθ lens as a scanning image-formation optical system, the deflected beam LSC is reflected by optical-path bending mirrors MC1, MC2, and MC3, in sequence, then, is directed to a photosensitive surface (acting as the scanning surface) of a photoconductor 50C having an optical conductivity, and performs an optical scanning operation onto the above-mentioned photosensitive surface. The photoconductor 50C has a cylinder shape, and uniform electrification is carried out thereon by means of an electrification device CC, is rotated in a direction of the arrow shown, the optical scanning is carried out thereon with an optical spot of the above-mentioned deflected beam LSC, and the cyan component image is written thereon. Thereby, the cyan latent image is formed thereon.

Either the single beam scanning method or the multi-beam scanning method (as in FIG. 14A, for example) may be applied to the optical scan of each photoconductor. Moreover, as the electrification device for each photoconductor, not only the device of a corona electric discharge type but also a device of a contact type, such as an electrification roller or an electrification brush may be applied.

The respective Latent images of yellow, magenta, cyan and black formed on the photoconductors 50Y, 50M, 50C, and 50K are developed by toners (yellow toner, magenta toner, cyan toner, black toner) of respective development devices 53Y, 53M, 53C, and 53K, respectively, and thus are visualized. Thus, the black toner image is formed on the photoconductor 50K, the yellow toner image is formed on the photoconductor 50Y, the magenta toner image is formed on the photoconductor 50M, and the cyan toner image is formed on the photoconductor 50C, respectively. Each of these color-component toner images is transferred onto a transfer paper S which is a sheet-like recording medium, as follows.

That is, an endless-type conveyance belt 54 is hung on pulleys 55 and 56, and the photoconductors 50Y, 50M, 50C, and 50K are touched at the lower part therefor as shown in FIG. 7. These photoconductors 50Y through 50K are faced with transfer devices 57Y, 57M, 57C, and 57K (may be of a contact type, such as transfer rollers, although ones of a corona electric discharge type are shown) in the inner surface of the conveyance belt 54 through the belt sheet.

The transfer paper S is provided from a cassette 58, is fed via rollers 59 onto the conveyance belt 54, and in response to electrification with an electrification device 60, an electrostatic adsorption effect occurs thereby, and it is held by a perimeter part of the conveyance belt 54. The conveyance belt 54 rotates counterclockwise, and conveys the transfer paper S along the circumferential surface of the belt. While the transfer paper S is thus conveyed, first, the transfer device 57Y transfers the yellow toner image onto the transfer paper S from the photoconductor 50Y, then similarly, the transfer devices 57M, 57C and 57K transfer the other color-component toner images from the respective photoconductors 50M and 50C and 50K to the same transfer paper in sequence in a piling-up manner. The transfer of each color-component toner image is performed in such a manner that mutual position registration or alignment is performed appropriately. Thus, a full-color image is formed on the transfer paper S.

The transfer paper S which has the full-color image formed thereon undergoes charge removal by a charge removal device 61, and separates from the conveyance belt 54 by its own hardness, and, then, the full-color image is fixed on this paper with a fixing device 62. Then, the paper is ejected onto a tray 64 which is a top plate of the image formation device, with an ejecting roller 63;

Each photoconductor after the toner image is transferred therefrom then undergoes cleaning of remaining toner, paper dust, and so forth by a corresponding cleaner 65Y, 65M, 65C, or 65K. Moreover, the conveyance belt 54 undergoes electricity removal by an electricity removal device 66, and is cleaned with a cleaner 67.

The above is an outline of the image formation process. The way of toner image transfer to the transfer paper of each color toner image in the embodiment shown in FIG. 7 may also be applied to the first embodiment shown in FIG. 1. Similarly, the way of transfer of each color-component toner image to the intermediate transfer belt, after that, into a transfer paper in the embodiment of FIG. 1 may be applied to the embodiment shown in FIG. 7.

In the second embodiment shown in FIG. 7, the scanning image-formation optical system of fθ lens is provided for each of the four deflected beams coming from the two polygon mirrors 51 and 52. Thus, total 4 sets of fθ lenses are provided, each including two lenses. These 4 sets of fθ lenses are optically equivalent mutually, and the optical path length toward the relevant photoconductor from each light source device is also set up equally. Moreover, each fθ lens is held respectively at a plate PTY, PTM, PTC, or PTK, and is fixed to an optical housing 75. Each plate touches the relevant lenses by the whole or partial surfaces thereof.

The lenses LNY1, LNM1, and LNC1 are made of a same resin material, and, also, the lenses LNY2, LNM2, and LNC2 are made of a same resin material. As these materials, a polycarbonate, or a synthetic resin which includes a polycarbonate as a main ingredient thereof superior in low water absorptivity, high transparency, and fabrication easiness is suitable. By applying such a resin material, formation of a non-spherical surface can be easily achieved, with low costs, and, thus, cost reduction of the entire full-color image formation device can be achieved.

On the other hand, the lenses LNK1 and LNK2 are used in this embodiment an optical system used as a scanning position standard or reference. Accordingly, they are made of a material with a small thermal expansion coefficient (for example, a glass (thermal expansion coefficient of $0.5 \times 10^{-5}/°C$.)) in order to avoid deformation thereof due to temperature change. In fact, if plastic lenses (having a thermal expansion coefficient of $7.0 \times 10^{-5}/°C$.) such as polycarbonate ones were used, since the image-formation position of optical spot would change remarkably due to temperature change, they could not be used as a standard or reference.

Further, in the embodiment shown in FIG. 7, on the light path of the deflected beams LSY, LSM, and LSC, liquid crystal deflection devices 70Y, 70M, and 70C are disposed as shown, while, on the light path of deflected beam LSK, a transparent parallel glass plate 70K is disposed.

Each of the liquid crystal deflection device arrays 70Y, 70M, and 70C may be same as that described above with reference to FIG. 1 (first embodiment), which is a main-scanning-directional deflective liquid crystal deflection device array and/or a subscanning-directional-deflective liquid crystal deflection device array, or an integral combination thereof as shown in FIG. 6B.

Moreover, although not shown in FIG. 7, the reflected light from a glass substrate of each of the liquid crystal deflection device arrays 70Y, 70M, and 70C on the incidence side is directed to a detection surface optically equivalent to the scanning surface (photoconductor surface to be scanned by image-formation beam), and a scan line bendinging detection device (not shown) can detect the scanning characteristics (the above-mentioned uniform velocity performance and/or the scan line bending) from each deflected beam LSY, LSM, or LSC. Detection of such scanning characteristics can be performed in a manner as in the case of the first embodiment shown in FIG. 1.

On the other hand, a transparent parallel glass plate 70K is inserted for the purpose of light path adjustment among the deflected beams LSY, LSM, LSC and LSK. As mentioned above, 4 sets of fθ lenses are optically equivalent mutually, and the light path length toward the photoconductor from each light source device is also set up equally. However, since the liquid crystal deflection device arrays 70Y, 70M, and 70C are inserted into the light paths of the deflected beam LSY, LSM, and LSC, respectively, and thus, the light path length of these beam becomes shorter than actual light path length optically. Therefore, the transparent parallel glass plate 70Y is inserted in order to equalize the light path length of deflected beam LSK with the optical light path length of any other deflected beams.

Therefore, the transparent parallel glass plate 70K has an optical thickness (i.e., a product of the physical thickness by the refractive index) set up so that it becomes equivalent to the optical thickness of any other liquid crystal deflection device array.

In this second embodiment, the optical system which forms the light path of deflected beam LSK is made of a glass material with the small thermal expansion coefficient. Accordingly, it is hardly affected by ambient temperature and humidity. Thus, the optical characteristic thereof is unchanged even due to environmental change, and therefore, the scanning characteristics (scan line bending and uniform velocity performance) of optical scanning performed by the deflected beam LSK is regarded as a standard.

Since the fθ lens which forms the light path is a product made of a resin, the scanning characteristics in the optical scanning performed by each of the deflected beam LSY, LSM, and LSC changes due to change in ambient temperature and humidity. This change in the scanning characteristics is detected by means of the above-mentioned detection device, and based on the detection result, the same is corrected by means of the liquid crystal deflection device array. This correction is performed in a manner such that the scanning characteristics of each of the deflected beams LSY, LSM, and LSC be coincide with the scanning characteristics of deflected beam LSK which is regarded as the standard scanning characteristics, as mentioned above. Actually, the liquid crystal deflection device arrays 70Y, 70M, and 70C are appropriately controlled by a controller which is not shown.

According to this way, it is not necessity of providing the liquid crystal deflection device on each of all the deflected beams, and, also, an expensive glass lens should be used only for the scanning image-formation optical system used as the standard while plastic lenses can be used for the other scanning image-formation optical systems. As a result, color image formation device can be reduced in the cost while it is possible to obtain a quality full-color image with an effectively reduced color deviation.

In addition, in the first embodiment of FIG. 1, although the optical scanning of each photoconductor is performed by the multi-beam scanning scheme, it is also possible to apply a single beam scanning scheme instead. Moreover, in the first and second embodiments of FIG. 1 and FIG. 7, the number of photoconductors may be reduced. In case where two of photoconductors are used, two-color image formation can be performed. In case a single photoconductor is used, image formation of monochrome type can be performed.

Moreover, although, in the embodiments of FIG. 1 and FIG. 7, the liquid crystal deflection device array is arranged between the light path bending mirrors in the light path of deflected beam, the position of liquid crystal deflection device may be determined instead, between the light path bending mirror and the scanning surface, between the scanning image-formation optical system and the first light path bending mirror, or between the optical deflection scanning device and the scanning image-formation optical system.

In case providing the main-scanning-directional deflective liquid crystal deflection device array and subscanning-directional deflective liquid crystal deflection array such as those 21A and 21B shown in FIG. 6B separately, the main-scanning-directional deflective liquid crystal deflection device array may be provided near the optical deflection scanning device rather than near the scanning image-formation optical-system, and the subscanning-directional deflective liquid crystal deflection device array may be provided near the scanning surface rather than near the scanning image-formation optical system.

The aspect of the present invention described in the description of the second embodiment of the present invention will now be described in more detail.

Figure 8A:
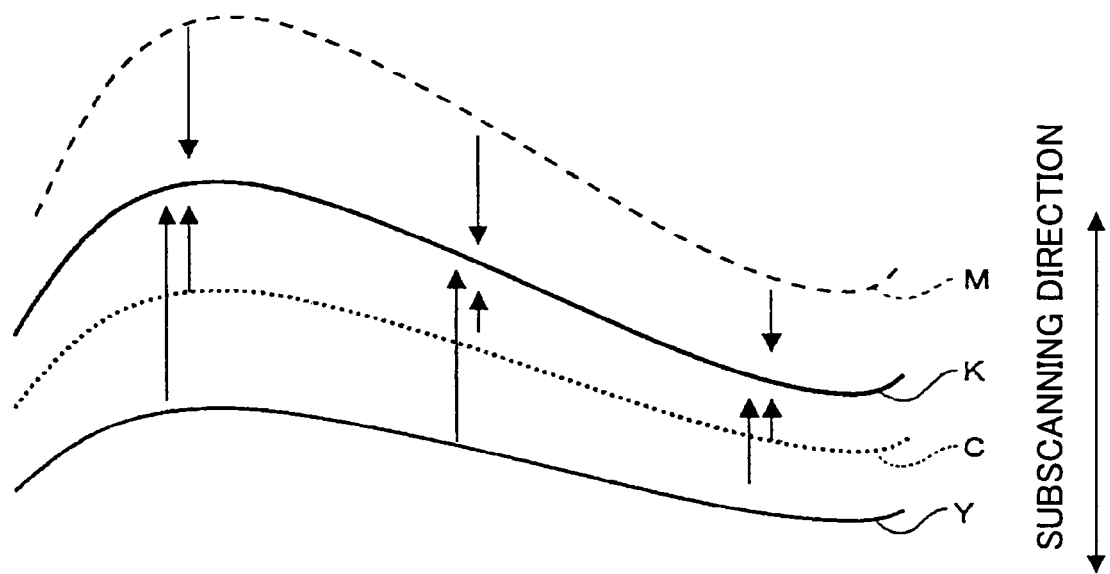
FIGS. 8A and 8B and 9A through 9C illustrate a scheme of scan line bending correction applicable to a full-color image formation apparatus such as that shown in FIG. 7.
Figure 8B:
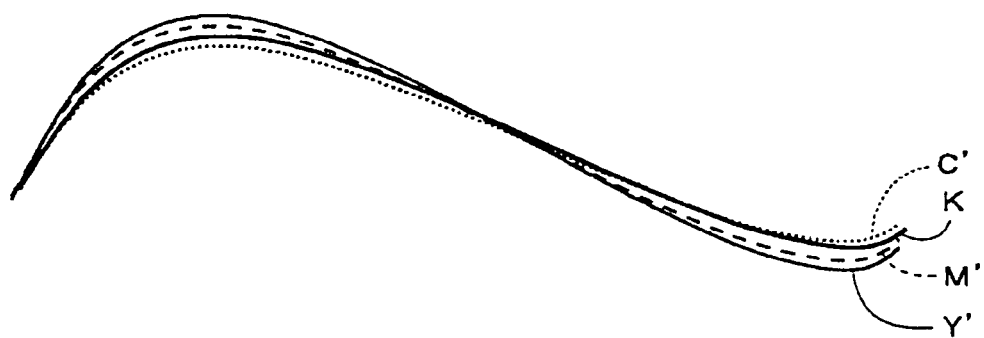

As the scan line bending detection device, the same described above with reference to FIGS. 5A through 5D may be applied. However, it is also possible to apply a scheme which will be described in the description of a third embodiment of the present invention shown in FIG. 10A, instead. FIGS. 8A and 8B illustrate one example of a mode of correcting scan lines according to the above-mentioned aspect of the present invention.

FIG. 8A shows each scan line (state in which it is visualized and transferred onto a common medium) detected by the scan line deviation detection device. 'K' denotes a scan line of a beam which writes a black component image; 'C' denotes a scan line of a beam which writes a cyan color component image; 'Y' denotes a scan line of a beam which writes in a yellow color component image; and 'M' denotes a scan line of a beam which writes a magenta color component image.

In FIG. 8A, each of the scan lines Y, M, C, and K has a scan line bending, and also, is shifted relatively in the subscanning direction. Then, the scan line bending on the scan line K is regarded as a standard scan line bending, and, the scan line correcting device array corrects the scan line bending of any other scan lines M, C, and Y in a manner such that each of the scan lines Y, M and C be coincide with or approximate the scan line K, as indicated as the scan lines Y', M', and C' shown in FIG. 8B. In other words, correction is made such that scan line bending of each of the scan lines Y, M and C approximate the standard scan line bending (of the scan line K), and, thus, the mutual positional shift in the subscanning direction be eliminated. In other words, the correction includes a correction of each scan line bending manner to approximate the scan line bending manner of the standard scan line bending, and each scan line is corrected to approximate in subscanning-directional position the standard scan line.

Although it may be difficult to achieve complete coincidence of each of the scan lines Y', M' and C' with the scan line K even by the above-mentioned correction operation, approximate coincidence thereof is possible as shown in FIG. 8B. In fact, as long as the mutual positional difference falls within 30 μm, it is possible to provide a full-color image having no conspicuous color deviation in a practical situation.

Figure 9A:
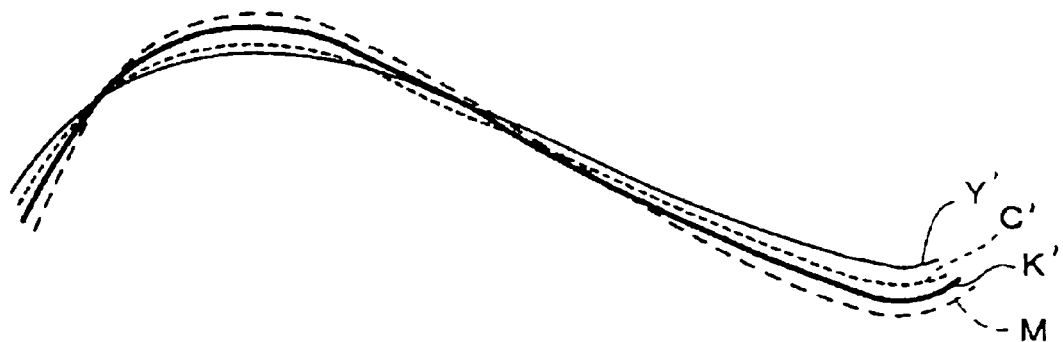
Figure 9B:
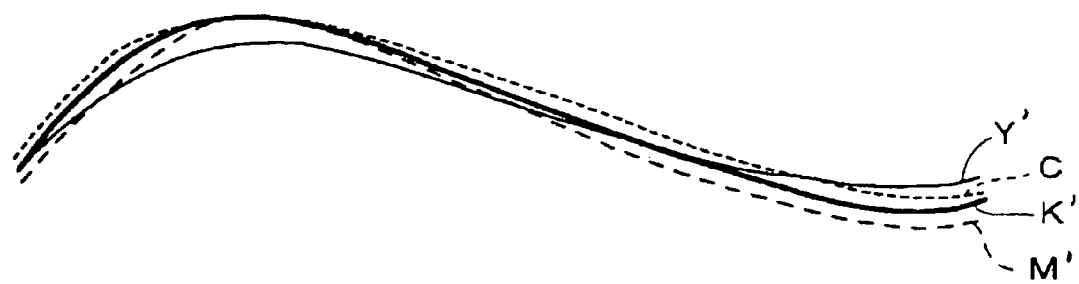
Figure 9C:
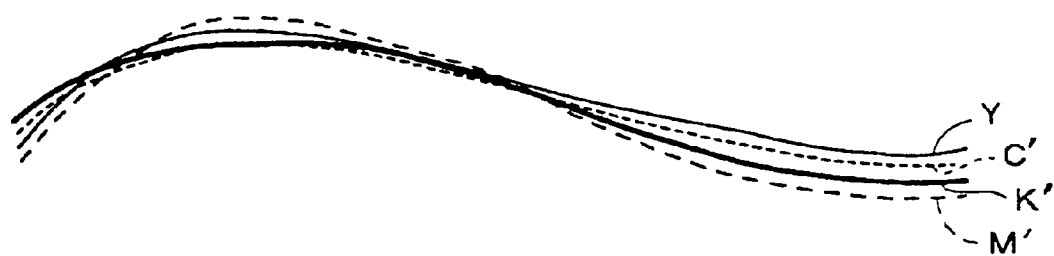

FIG. 8B illustrates an example in which the scan line bending of the scan line K is regarded as a standard scan line bending. Similarly, it is also possible that the scan line bending on any other scan line Y, M or C is regarded as a standard scan line bending, instead. FIG. 9A illustrates an example in which the scan line bending of the scan line M is regarded as a standard scan line bending, and the scan line bending of each of the other scan lines Y, C and K is corrected to approximate the scan line bending of the scan line M. FIG. 9B illustrates an example in which the scan line bending of the scan line C is regarded as a standard scan line bending, and the scan line bending of each of the other scan lines Y, M and K is corrected to approximate the scan line bending of the scan line C. FIG. 9C illustrates an example in which the scan line bending of the scan line Y is regarded as a standard scan line bending, and the scan line bending of each of the other scan lines M, C and K is corrected to approximate the scan line bending of the scan line Y.

In FIGS. 9A through 9C, the scan lines M, C and Y are the same as those shown in FIG. 8A. As shown, in this example, among the scan lines Y, M, C and K, the scan line Y has the minimum scan line bending, or is nearest to a straight line. Accordingly, in this case, by regarding the scan line bending of the scan line Y as the standard, and correcting the scan line bending of each of the other scan lines M, C and K to approximate the scan line bending of the scan line Y, as shown in FIG. 9C, the scan line bending on each scan-line comes to have the minimum difference from a straight line as a whole.

Figure 10A:
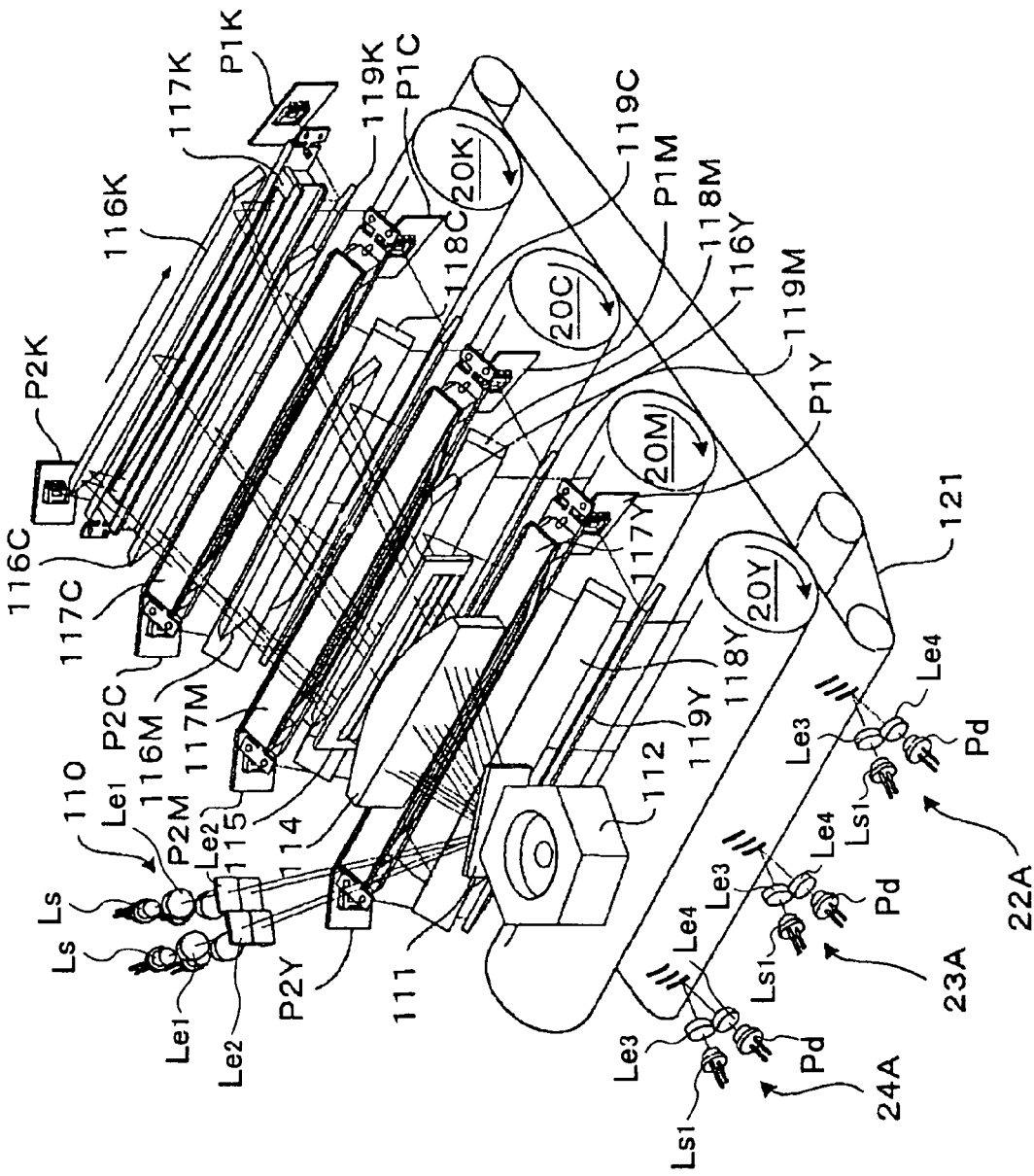
FIG. 10A shows a perspective view of an image formation device according to a third embodiment of the present invention.

FIG. 10A shows a perspective view of an image formation device in a third embodiment of the present invention. In this configuration, four sets of light source devices 110 are provided, each including a semiconductor laser Ls, a coupling lens Le1, and a cylindrical lens Le2. A beam emitted from each semiconductor laser Ls is transformed into a beam in a form (of a parallel beam, a slightly divergent beam or a slightly convergent beam) suitable for a subsequent optical system by means of the coupling lens Le1, is converged in the subscanning direction by the cylindrical lens Le2, and is imaged as a line image long in the main scanning direction near a deflection reflective surface of a polygon mirror 112 which is an optical deflection scanning device. The four semiconductor lasers Ls as the light sources emit beams for writing yellow, magenta, cyan, and black color component images, respectively.

The four beams are simultaneously deflected by a polygon mirror 112, and then, pass through a lens 114. The beam which writes a black component image forms an optical spot on a photoconductor 20K (in particular, a circumferential scanning surface thereof) having an optical conductivity with a shape of a drum, after being reflected by a mirror 116K, passing through a lens 117K, passing through a half mirror 119K. Thus, the optical spot carries out optical scanning of the photoconductor 20K in the direction of an arrow shown. Similarly, the beam which writes a yellow color component image forms an optical spot on a photoconductor 20Y (in particular, a circumferential scanning surface thereof) having an optical conductivity with a shape of a drum, after being reflected by a mirror 116Y, passing through a lens 117Y, being reflected by a mirror 118Y, passing through a half mirror 119Y. Thus, the optical spot carries out optical scanning of the photoconductor 20Y in the direction of the arrow shown.

Similarly, the beam which writes a magenta color component image forms an optical spot on a photoconductor 20M (in particular, a circumferential scanning surface thereof) having an optical conductivity with a shape of a drum, after being reflected by a mirror 116M, passing through a lens 117M, being reflected by a mirror 118M, passing through a half mirror 119M. Thus, the optical spot carries out optical scanning of the photoconductor 20M in the direction of the arrow shown. Similarly, the beam which writes a cyan color component image forms an optical spot on a photoconductor 20C (in particular, a circumferential scanning surface thereof) having an optical conductivity with a shape of a drum, after being reflected by a mirror 116C, passing through a lens 117C, being reflected by a mirror 118C, passing through a half mirror 119C. Thus, the optical spot carries out optical scanning of the photoconductor 20C in the direction of an arrow shown. Thus, electrostatic latent image of each color component is formed onto the relevant one of the photoconductors through the optical scanning operations.

These electrostatic latent images are visualized by toners of respective color components by means of respective development devices not illustrated, and then, the thus-created toner images are transferred onto an intermediate transfer belt 121. In the case of transfer, each color-component toner image is piled up mutually one by one and thus forms a full-color image. The thus-obtained full-color image on the intermediate transfer belt 121 is then transferred onto a sheet-like recording-medium or transfer paper, and it is fixed onto this medium/paper. The intermediate transfer belt 121 after the full-color picture has been transferred therefrom is cleaned with a cleaning device which is not illustrated.

In addition, a portion of each deflected beam separated or extracted by means of the half mirror is detected by a respective one of light-receiving devices P1Y, P2Y, P1M, P2M, P1C, P2C, P1K, and P2K, at the beginning end and ending end of a respective scanning range. Based on the detection at the scanning-range beginning end, a synchronization timing of the writing start by each beam is determined. Based on the detection time delay between the beginning end and ending end of the scanning range, the frequency of driving clock signal for each beam is adjusted, and thus, writing range defined by each beam is made equal.

In FIG. 10A, the reference numeral 111 denotes a windowpane of a noise isolation housing (not shown) houses the polygon mirror 112. The windowpane 111 enables each beam coming from the light source 110 passing therethrough toward the polygon mirror 112, and, also, enables the deflected beam passing therethrough toward the lens 114 therethrough.

In FIG. 10A, the reference numerals 22A, 23A, and 24A denote detection devices acting as the above-mentioned scan line deviation detecting devices. The detection devices 22A, 23A, and 24A condense beams coming from semiconductor lasers Ls1 with condensing lenses Le3, irradiate therewith predetermined positions of the intermediate transfer belt 121, and form images of beams reflected by the intermediate transfer belt 121 onto light-receiving devices Pd with lenses Le4. Thereby, images formed on the intermediate transfer belt 12*i* can be detected at the respective predetermined positions thereof. When performing the scan line deviation detection, three predetermined portions on one scan line are written onto the respective photoconductor by each beam, and they are visualized by the toner, and are transferred from the photoconductor onto the intermediate transfer belt 121. At this time, partial line toner images of the respective color components are formed in a manner such that they have predetermined intervals therebetween in the subscanning direction on the intermediate transfer belt 121.

These partial line images, as shown, are detected by the respective detection units of the scan line deviation detection device, and thus, the scan line bending (inclination of each scan line and the position deviation therebetween) is determined based on the detection result. Each scan lines Y, M, C, and K shown in FIG. 8A mentioned above are determined in this way, for example.

Figure 10B:
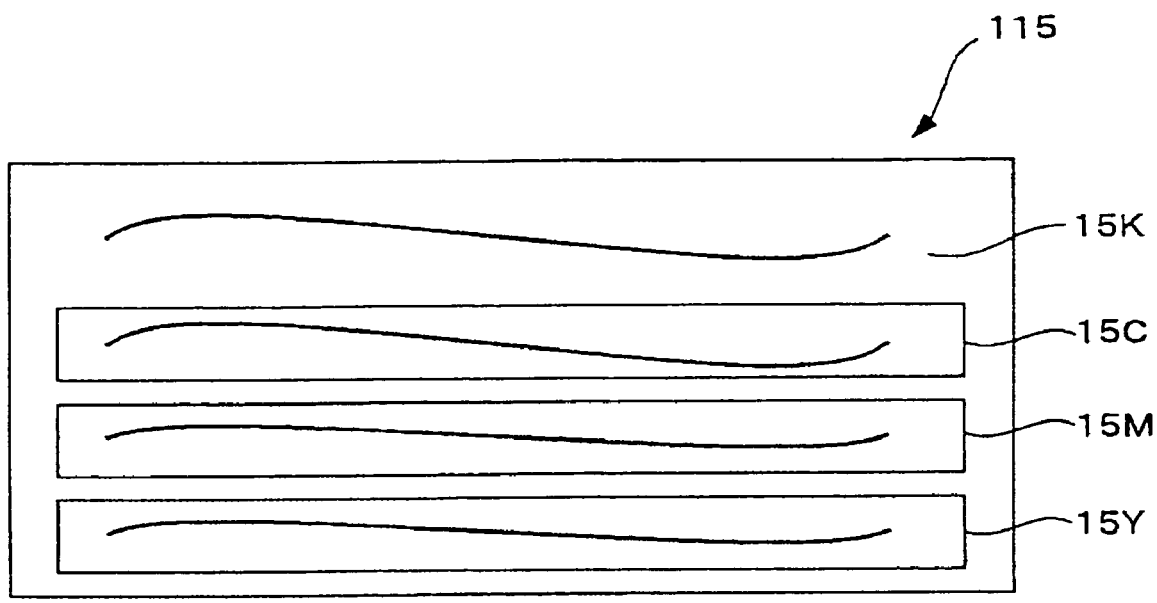
FIG. 10B illustrates a scan line correction device used in the configuration shown in FIG. 10A.

As shown in FIG. 10A, a scan line correcting device 115 is arranged just behind the lens 114. The scan line correcting device 115 has four portions 15K, 15C, 15M, and 15Y, as shown in FIG. 10B. The portion 15K is transparent, and each of the portions 15Y, 15M, and 15C includes a liquid crystal deflection device array which is one previously described with reference to FIG. 5A, for example. Almost all the elements of a liquid crystal device, such as a grounding electrode, a liquid crystal layer, a cover glass and so forth are common for these liquid crystal deflection device arrays 15Y, 15M, and 15C. That is, in this embodiment, the liquid crystal deflection device arrays are combined integrally.

These portions 15K, 15C, 15M and 15Y are disposed in the scan line correcting device 115 such a way that the respective beams of the color components of K, C, M and Y coming from the respective light source devices 110 via the polygon mirror 112 be incident on the respective portions. Therefore, the scan line correcting device 115 transmits the incident beam which writes a black component image, and corrects scan line bending of the incident beams which write cyan, magenta and yellow color component images appropriately as described above with reference to FIGS. 5A through 5D, based on the detection results on the present scan line bending of the respective scan lines K, C, M and Y.

The correction of the scan line bending is made in such a manner that the scan line bending of each scan line other than the scan line K is made coincide with or made nearer to the standard scan line bending of the scan line K as described above with reference to FIGS. 8A through 8C. A controller not shown performs calculation and setting of the correcting amounts performed by the scan line correcting device 115.

As shown in FIG. 10A, the liquid crystal deflection device arrays 15Y, 15M, and 15C of respective color components can be easily made integrated as the scan line correcting device 115 is located behind the common light path (lens 114).

Instead of the configuration shown in FIG. 10A, it is also possible to embody the above-mentioned aspect of the present invention through the configuration shown in FIG. 7. Also in this case, the liquid crystal deflection device arrays 70Y, 70M, and 70C each of which may be the same as the liquid crystal deflection device array 21Y shown in FIG. 5A correct the scan line bending of the scan lines for yellow, magenta and cyan color component images in a manner such that the scan line bending be coincide with or made nearer to the standard scan line bending of the scan line for a black component image. Thus, the problem of color deviation can be effectively solved.

Although not shown in FIG. 7, the scanning position of optical spot which each of the deflected beams LSY through LSK forms on a correspondence photoconductor is detected by a device which may be the same as the scanning position detecting device 22Y shown in FIG. 5B. For the purpose of directing a part of each deflected beam toward the above-mentioned detecting device, the liquid crystal deflection device arrays 70Y, 70M, 70C and transparent glass plate 70K are slightly inclined so that the part of the deflected beam be reflected toward the detecting device.

Figure 11:
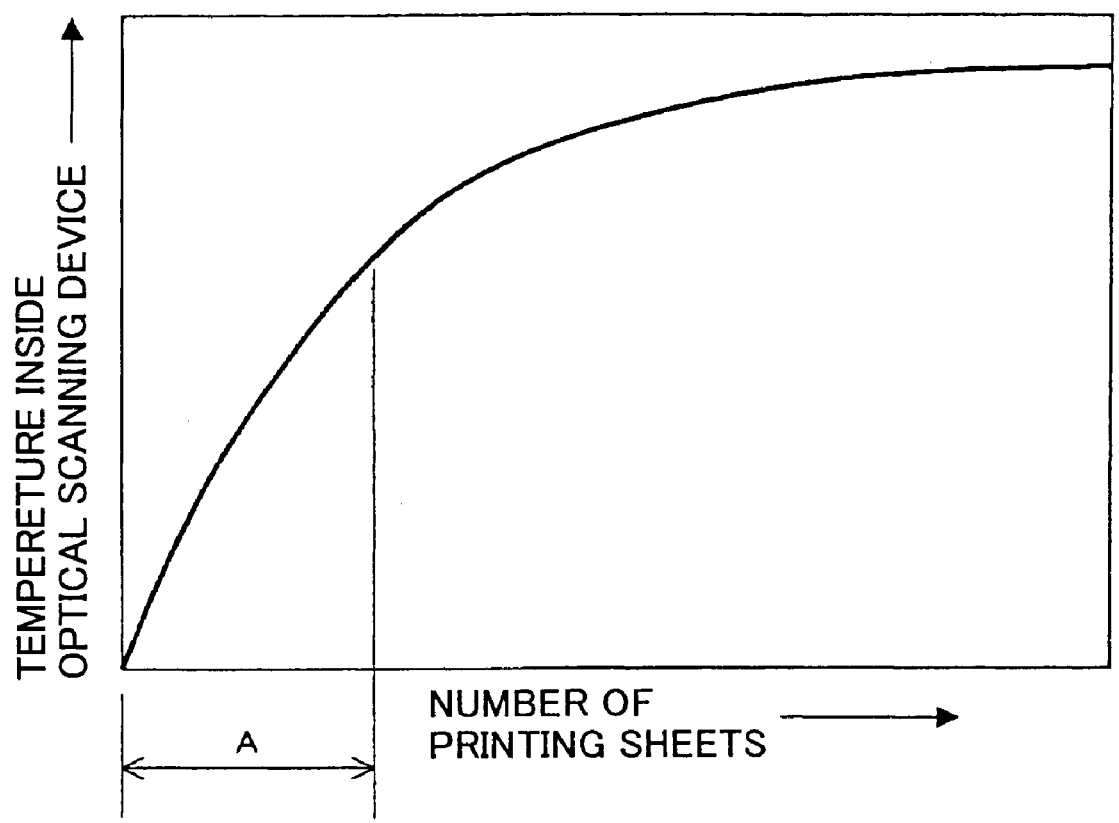
FIG. 11 illustrates an example of a temperature change in an image formation device during a continuous image formation process performed therein.

In each of the image formation devices in the above-mentioned embodiments described with reference to FIGS. 1, 7 and 10A, in case many times of image forming processes are performed continuously or successively so as to produce a many sheets of color image prints, the internal temperature rises sharply as shown in FIG. 11 due to the heat generated by a motor driving the polygon mirror, the heat generated by the fixing device and so forth included in the image formation device. Such a temperature change may change the optical characteristics of the optical devices (lenses, mirrors and so forth) made of resin in the scanning image-formation optical system, and thus, the above-mentioned color deviation may occur. For this reason, a color tone of a produced color image may changes between a case of first printing and a case of printing after several sheets of printing (for example, 'A' sheets shown in FIG. 11).

In order to solve this problem, it is preferable to change the correction amounts in the above-mentioned scan line correction devices (scan line bending correcting devices/uniform velocity performance correction devices) based on the current detection results obtained from the above-mentioned scan line deviation detection devices such as the device 22Y shown in FIG. 5B during the above-mentioned continuous/successive image forming processes. Specifically, after the detection of the scan line state such as that shown in FIG. 8A, actual adjustment of the scan line correction amounts provided by the scan line correction device based on the detection result (which is referred to as a scan line correction amount adjustment control process) should be performed between an end of image formation process on one sheet and a beginning of image formation process on another sheet. Accordingly, the above-mentioned correction amount adjustment control process be performed preferably within a time interval of $T_A$ obtained by the following formula especially in the cases of the configurations shown in FIGS. 7 and 10A:

$$T_A < 0.8 \times (D/V)$$

where:

D denotes a distance between adjacent sheets of transfer paper on the intermediate conveyance belt 54/121; and V denotes a speed of the sheet-shaped transfer paper on the intermediate conveyance belt.

Thereby, it becomes possible to proceed with the continuous image forming process substantially without interrupting the process.

The above-mentioned scan line state detection process should be performed preferably within a time interval Ts obtained by the following formula:

$$Ts < 10 \times (L/V)$$

where:

L denotes a length along the sheet conveyance direction of each sheet of transfer paper on the intermediate conveyance belt 54/121; and V denotes a speed of the sheet-shaped transfer paper on the intermediate conveyance belt.

Thereby, even when a rapid temperature change occurs, the scan line bending or the like can be corrected at least every ten sheets of image forming process. Accordingly, it becomes possible to effectively reduce color tone change by color deviation.

Figure 12A:
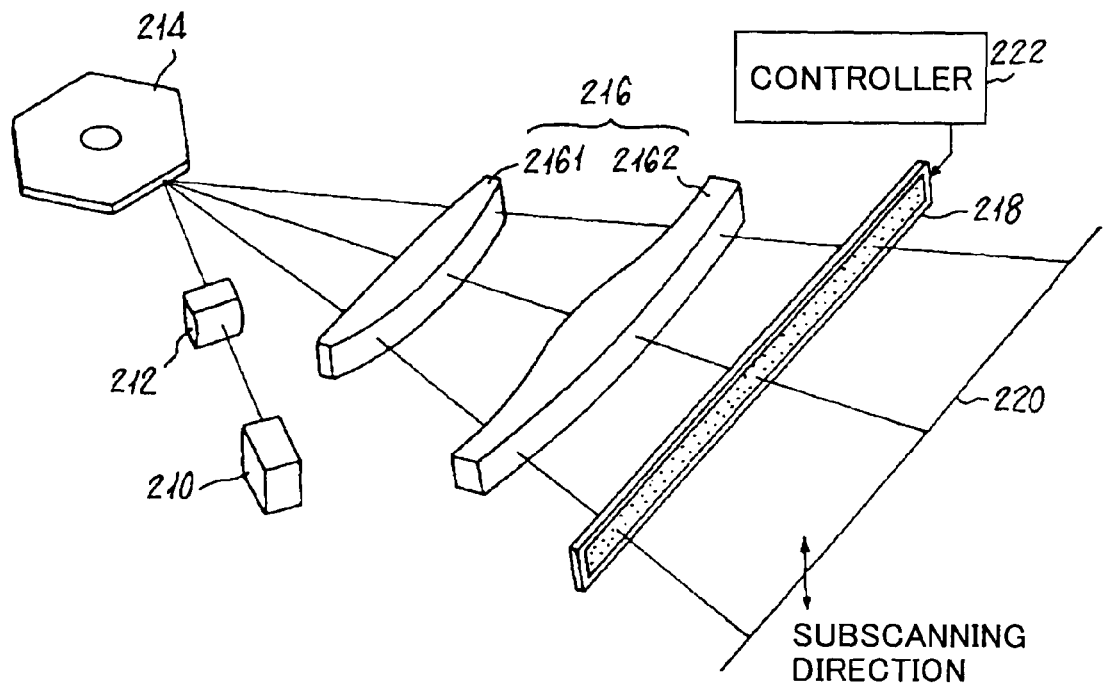
FIGS. 12A and 12B illustrate an optical scanning device according to a fourth embodiment of the present invention.

An optical scanning device in a fourth embodiment of the present invention will now be described with reference to FIGS. 12A and 12B. In this embodiment, as shown in FIG. 12A, a beam emitted from a light source device (wherein a light source and a coupling lens are included) 210 is a parallel beam (which may be slightly convergent or divergent beam), and is made to pass through an aperture stop (not shown) for obtaining a diameter of optical spot suitable for a scanning surface 220. After that, the beam is incident on a cylindrical lens 212 which acts as a line-image forming optical system (which has a positive power only in the subscanning direction). Then, the beam converges only in the subscanning direction thereby, and forms a line image long in the main scanning direction near the deflection reflective surface of a polygon mirror 214 of an optical deflection scanning device.

With a uniform rotation of the polygon mirror 214, the beam reflected by the deflection reflective surface thereof is thus deflected in an equal angular velocity, and passes through two lenses 2161 and 2162 which act as an fθ lens 216 as a scanning image-formation optical system. After that, the beam passes through a liquid crystal deflection device array 218, reaches the scanning surface 220, and thus focuses as an optical spot on the scanning surface 220 by the function of the fθ lens 216, and carries out optical scanning of the scanning surface 220.

The liquid crystal deflection device array 218 is long in the main scanning direction as shown, and performs position adjustment of the optical spot formed on the scanning surface 220. Further, the liquid crystal deflection device array 218 has a plurality of individually controllable liquid crystal deflection devices arranged along the main scanning direction, is disposed in the light path from the polygon mirror 214 toward the scanning surface 220. Thereby, for each liquid crystal deflection device, the amount of deflection given thereby to the incident beam is controlled in the main scanning direction and/or subscanning direction. Consequently, the position of the optical spot on the scanning surface is adjusted for the main scanning direction and/or the subscanning direction.

A controller 222 shown includes a microcomputer etc., and controls the liquid crystal deflection device array 218 so that the amount of deflection given by each liquid crystal deflection device of the liquid crystal deflection device array 218 to an incident beam is controlled. The controller 222 may be also realized as a partial function of a system controller which controls a whole image formation device which includes the optical scanning device shown in FIG. 12A.

Figure 12B:
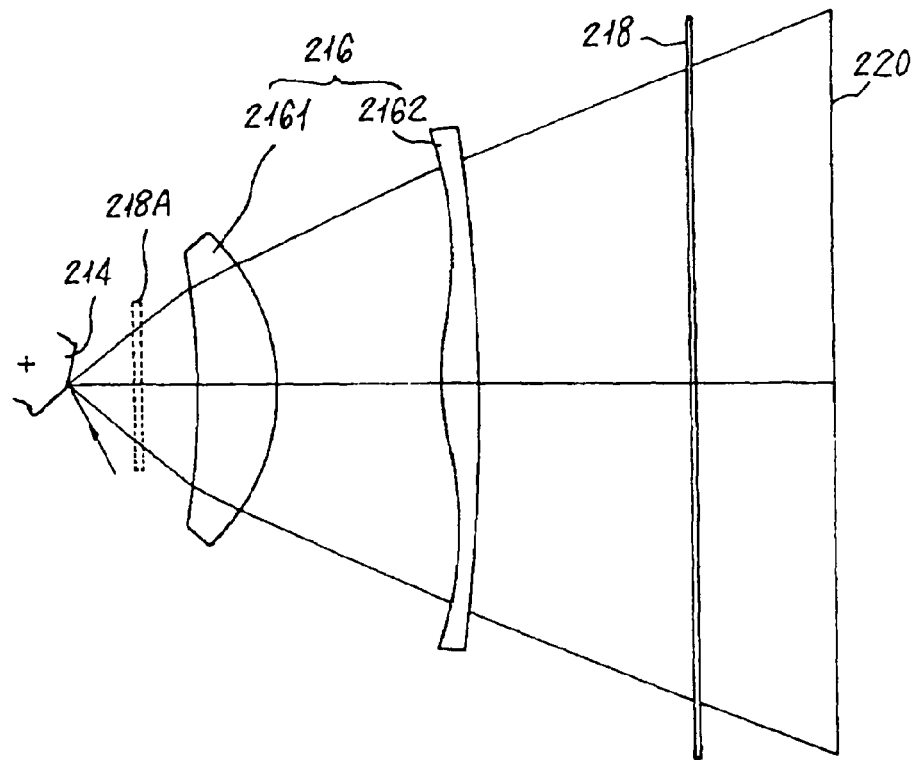

FIG. 12B shows an optical arrangement between the deflection reflective surface of the polygon mirror 214 and the scanning surface 220 shown in FIG. 12A viewed from the subscanning direction. Although the liquid crystal deflection device array 218 is disposed between the lens 2162 of the fθ lens 216 and the scanning surface 220 as shown in FIG. 12A, the position of the liquid crystal deflection device array is not limited thereto. For example, the liquid crystal deflection device array 218 may be instead disposed between the deflection reflective surface of the polygon mirror 214 and the lens 2161 in the fθ lens 216 as the liquid crystal deflection device array 218A shown in FIG. 12B. Thereby, the required length of the main scanning direction of the liquid crystal deflection device array may be shortened so that the costs thereof may be reduced as the liquid crystal deflection device array is approached toward the optical deviation scanning device.

However, in this case (218A), on the other hand, there may occur a problem as follows: The deflected beam incident onto the liquid crystal deflection device array 218A shown is deflected in the uniform angular velocity as mentioned above. Where 'D' denotes a distance between the beam deflection starting point on the deflection reflective surface on the polygon mirror 214 and the beam incident point on the liquid crystal deflection device array 218A for the same beam; and also, θ denotes the deflection angle of the same beam, the position on the liquid crystal deflection device array 218A at which the deflected beam (chief ray) is incident is expressed by D·tan θ. Then, the distance by which the deflected beam moves on the liquid crystal deflection device array 218A along the main scanning direction with respect to a minute deflection angle $\Delta\theta$ is expressed by $\Delta S = D \cdot \Delta\theta / \cos^2 \theta$. Accordingly, the larger the deflection angle θ becomes, the distance by which the deflected beams moves on the liquid crystal deflection device array 218A becomes longer.

Therefore, in case the size in the main scanning direction of each liquid crystal deflection device in the liquid crystal deflection device array 218A is uniform, and is arranged in the main scanning direction at a uniform pitch/interval, a range in the main scanning direction on the scanning surface 220 for which a responsible is taken (referred to as a responsible range) by each liquid crystal deflection device becomes longer as the relevant liquid crystal deflection device is located at a position on which the deflected beam of the larger deflection angle is incident. Accordingly, the optical spot adjustment accuracy becomes degraded as the deflection angle of the deflected beam is larger.

For the purpose of solving this problem, one idea is such that the main-directional size of each liquid crystal deflection device is made smaller as the relevant liquid crystal deflection device is located further from the center of the liquid crystal deflection device array 218A on which the deflected beam of the deflection angle of zero is incident, and, also, the arrangement pitch/interval of the liquid crystal deflection device is made shorter as the relevant liquid crystal deflection device is located further from the center of the liquid crystal deflection device array 218A. However, since the deflected beam is not sufficiently condensed in the main scanning direction and thus has a considerably large beam diameter (several millimeters) near the deflection reflective surface of the polygon mirror, the main-directional size of the liquid crystal deflection device may not be made sufficiently smaller.

By such a reason, it is preferable that the liquid crystal deflection device array be located near the scanning surface 220 rather than near the scanning image-formation optical system. In fact, in case the liquid crystal deflection device array 218 is located as shown in FIGS. 12A and 12B, i.e., it is located between the fθ lens 216 and the scanning surface 220, the incident deflected beam is already sufficiently condensed by the optical system, and, also, the deflection of the deflected beam is made at uniform velocity by the function of the fθ lens 216. Therefore, even in case where the liquid crystal device array 218 has a configuration such that each liquid crystal deflection device have an equal main-directional size, and be arranged at a uniform pitch/interval, sufficient optical spot positional adjustment is achievable. Also, the above-mentioned arrangement pitch/interval should not be made so smaller/finer. Such an effect is increased as the liquid crystal device array 218 is located nearer to the scanning surface 220.

Details of the above-mentioned liquid crystal device array 218 may be the same as that described above with reference to FIG. 5A, and be provided together with the scan line state detection device shown in FIG. 5B, in a configuration described above with reference to FIGS. 5A through 5D. Actually, before performing a substantial image forming process, the polygon mirror 214 is rotated, and the light sources 210 is made to emit a beam as a trial basis. This emission may be made intermittently so that the deflected beam or detection beam on each color component be incident on the respective area sensors P1 through P10 shown in FIG. 5B.

In the above-described configuration, the scanning position of optical spot is detected, the scan line bending which should be corrected is specified, and the amount of deflection to be given with the liquid crystal deflection device Li is set according thereto. According to this way in which the actual scanning position is detected at any time, even when the scan line bending mode changes due to a time elapse, or in case the fθ lens 216 is made of a resin and thus the scan line bending changes due to an environmental change, it is possible to perform proper scan line bending correction at any time based on the detection result.

In case no substantial change occurs in the scan line bending state even due to aging or environmental change, for example, in case the fθ lens 216 is made not of a resin but of a glass, the scan line bending state or scan line inclination is measured before the shipment of the product of image formation device, and the amount of deflection given by each liquid crystal deflection device Li is estimated and is stored in a memory of the controller, which amount is then used at any time of actual performance of image formation process in the machine.

Also in this embodiment, the liquid crystal deflection device array 218 may be used not only as the subscanning-directional deflective device but also as the main-scanning-directional deflective device (in which each liquid crystal deflection device Li has a performance of deflecting an incident beam in the main scanning direction) by which the uniform velocity performance such as fθ characteristics may be corrected well.

In this case, the position of the optical spot in the main scanning direction in the area sensor Pi of the scanning position detection device is detected. Then, the uniform velocity performance (a deviation from the ideal uniform scanning state) of the optical scanning as in the above-mentioned case of control for correcting the scan line bending by the controller. Correction of the uniform velocity performance can be performed by setting up the amount of deflection in the main scanning direction to be provided by the liquid crystal deflection device Li in order to correct the uniform velocity performance by adjusting the amount of deflection in the main scanning direction on the incident deflected beam.

Finer correction of the uniform velocity performance can be performed as the number of the liquid crystal deflection devices in the main-scanning-directional liquid crystal deflection device array is increased and also the correction responsible range of each liquid crystal deflection device Li is made small. By making the length in the main scanning direction of each main-scanning-directional liquid crystal deflection device Li in the main-scanning-directional liquid crystal deflection device array small enough (for example, approximately 2-5 millimeters), it is possible to achieve a state such that deflection amount difference between each adjacent main-scanning-directional liquid crystal deflection devices be regarded as a substantially continuous smooth variation, and, thus, the optical scanning can be performed substantially at a uniform velocity.

According to this way, the scanning position of optical spot is detected, the uniform velocity performance which should be corrected is specified based thereon, and the amount of deflection to be provided by the liquid crystal deflection device Li is set accordingly. Thereby, in case the uniform velocity performance changes due to aging, or the fθ lens 216 is made of a resin so that the uniform velocity performance changes due to environmental change, it is possible to perform a proper optical scanning correction at any time.

In case no substantial change occurs in the uniform velocity performance even due to aging or environmental change, for example, in case the fθ lens 216 is made not of a resin but of a glass, the uniform velocity performance is measured before shipment of the product, and the amount of deflection to be given by each liquid crystal deflection device Li is stored in a memory of the controller, which amount is then used at any time of actual performance of image formation process in the machine.

Also in this embodiment, the liquid crystal deflection device array 218 may be used not only as the subscanning-directional deflective device but also as the main-scanning-directional deflective device (in which each liquid crystal deflection device Li has a performance of deflecting an incident beam both in the main scanning direction and subscanning direction) by which the scan line bending or scan line inclination as well as the uniform velocity performance such as fθ characteristics may be corrected well simultaneously. For this purpose, the configuration of the liquid crystal deflection device array having a configuration such as that described above with reference to FIG. 6B may be applied. Further, instead of integrally combining the main-scanning-directional deflection device and sub-scanning-directional deflection device as shown in FIG. 6B, it is also possible to configure such that both the deflection devices are disposed separately.

Various available ways of detection of the scanning position by the scanning position detection device in the fourth embodiment will now be described with reference to FIGS. 13A and 13B. In each case, a configuration is made such that the light-receiving surface of each area sensor Li of the detection device be regarded optically equivalent to the scanning surface 220 with respect to the deflected beam or image-formation beam given.

Figure 13A:
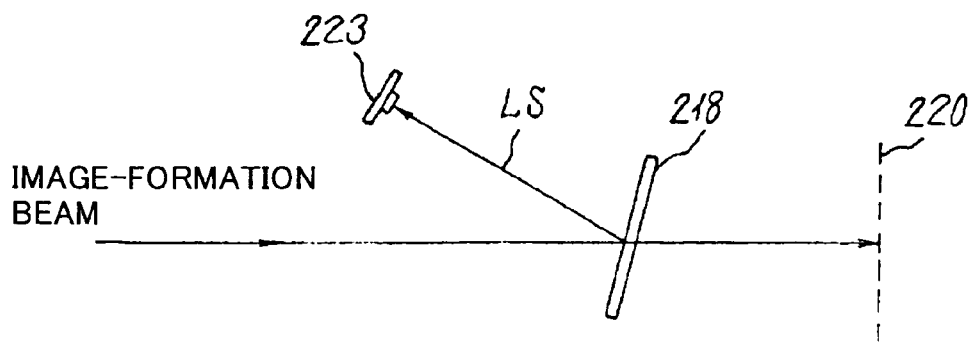
FIGS. 13A through 13D illustrate various schemes of scanning position detection applicable to the present invention.

In FIG. 13A, the direction which intersects perpendicularly with the figure corresponds to the main scanning direction, and the vertical direction corresponds to the subscanning direction. The scanning position detection in the optical scanning device shown in FIG. 12A may be performed by the configuration as shown in FIG. 13A, and the liquid crystal deflection device array 218 is disposed in a manner inclined with respect to the subscanning direction on the optical path of the image-formation beam deflected in the main scanning direction. In this configuration, the image-formation beam forms an optical spot on the light-receiving surface of the scanning position detection device 223 after being partially reflected by the incidence surface of the liquid crystal deflection device array 218 in FIG. 13A, and, thus, the scanning position is detected by the detection device 223.

Figure 13B:
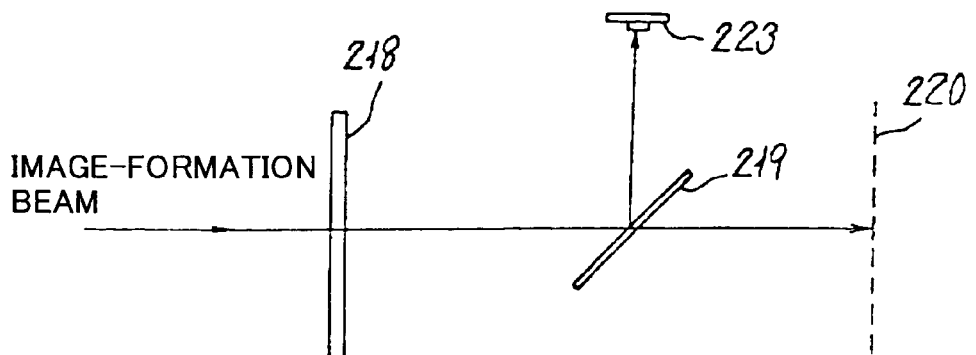

Also in the configuration shown in FIG. 13B, the direction which intersects perpendicularly with the figure corresponds to the main scanning direction, while the vertical direction corresponds to the subscanning direction. In this configuration, the image-formation beam passing through the liquid crystal deflection device array is incident on a half mirror 219 inclined with respect to the subscanning direction. Then, the beam is reflected thereby, forms a beam spot on the light-receiving surface of the scanning position detection device 223. Thus, the scanning position is detected thereby.

The half mirror or reflective surface member 219 may be made of a transparent glass, is disposed always at the same position shown, or may be disposed to one side so that the image-formation beam is incident thereon only when the beam is deflected to the one side. Alternatively, the member 219 may be inserted on the course of the image-formation beam only in a case the scanning position detection is actually performed.

Figure 13C:
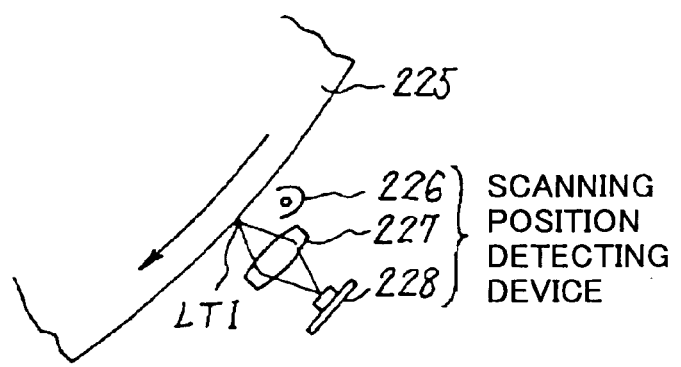

FIG. 13C illustrates another way of the scanning position detection. In this case, a photoconductor 225 providing the scanning surface 220 is utilized. Since the scanning position corresponds to the optical spot position in a scan line drawn for a trial basis on the photoconductor 25, visualizing of a thus-obtained electrostatic latent image is performed, and, from the thus obtained line-shaped toner image LTI, it is possible to obtain a scan line for detection in the form of the toner image LTI. This toner image LTI is then made to be irradiated by a lamp 226, and the thus-generated reflected beam is incident on an image sensor 228 via an image-formation optical system 227. Thereby, the scan line bending state can be detected.

Figure 13D:
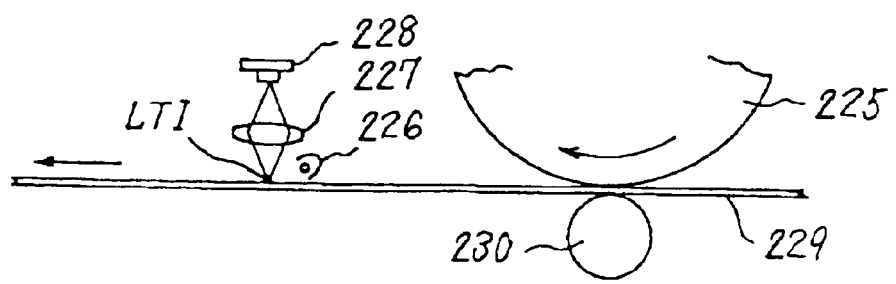

In a configuration shown in FIG. 13D illustrating a further other way of scanning position detection, a toner image transferred onto an intermediate transfer belt 229 from the photoconductor 225 is utilized. The linear toner image LTI formed on the photoconductor 25 like in the case of FIG. 13C is transferred onto the intermediate transfer belt 229 by a transfer device 230, and the thus-transferred toner image LTI is irradiated by a lamp 226, and the thus-occurring reflected beam forms an image via an image-formation optical system 227 onto an image sensor 228. Thereby, the scanning line bending state is detected. In each of the cases of FIGS. 13C and 13D, the photoconductor 225 and the intermediate transfer belt 229 are cleaned by a cleaning device of the toner image LTI before an actual image formation process is performed.

For the purpose of detecting the uniform velocity performance, in order to perform the scanning position detection with respect to the main scanning direction, a plurality of lines each having a certain length in the subscanning direction are written for a trial basis along the main scanning direction in mutually parallel, and are visualized. These lines should have appropriately equal intervals. Then, the thus-visualized lines are detected on the photoconductor or intermediately transfer belt, and, then, from the thus measured intervals of the detected lines, the uniform velocity performance can be determined, as in the same manner shown in FIGS. 13C and 13D.

Furthermore, as a further alternative way, even in case of using the liquid crystal deflection device array itself as a beam extracting device in the case of the above-mentioned embodiment, as shown in FIG. 6A the sizes of the spacers 3A and 3B sealing the liquid crystal are differed from each other. Consequently, it is possible to give an angle between the glass substrate 5*a* (forming the transparent electrode, transparent resistance film and orientation film) and the glass substrate 5*b* (forming the transparent electrode and orientation film). Thereby, even in case the liquid crystal deflection device itself is not inclined, appropriate inclination of glass substrate 5*a* by which a part of image-formation beams is extracted and directed toward the detection surface can be obtained as shown.

Figure 14A:
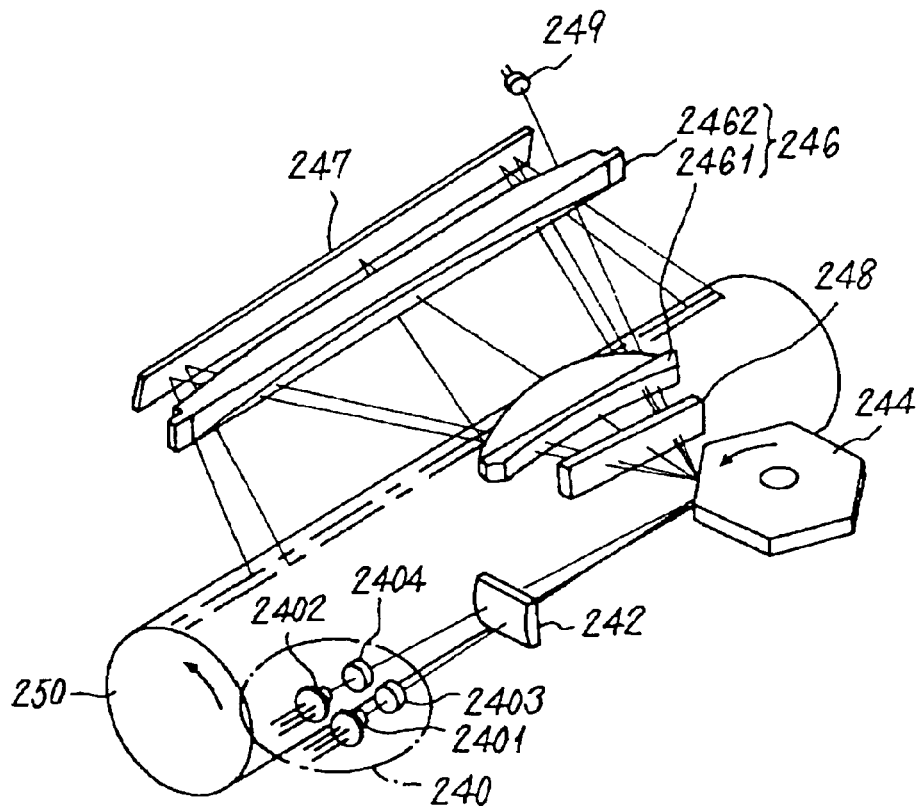
FIG. 14A illustrates an optical scanning device according to a fifth embodiment of the present invention.

FIG. 14A shows an optical scanning device in a fifth embodiment of the present invention. This optical scanning device is of a multi-beam type in which a plurality of beams are emitted from a light source device, and optical scanning of a scanning surface is carried out by a corresponding plurality of optical spots. The light source device 240 has light sources 2401 and 2402 of semiconductor lasers, and coupling lenses 2403 and 2404. The beams emitted from the light sources 2401 and 2402 pass through the coupling lenses 2403 and 2404, respectively, they are thus transformed into parallel beams (or slightly convergent or divergent beams), converge in the subscanning direction with cylindrical lens 242, and form line images near a deflection reflective surface of a polygon mirror 244, which line images are long along the main scanning direction and mutually separated in the subscanning direction.

As the polygon mirror 244 carries out uniform rotation, each beam is deflected thereby at a uniform angular velocity, passes through a liquid crystal deflection device array 248, and passes through an fθ lens 246 which is a combination of lenses 2461 and 2462. Then, optical spots mutually separated in the subscanning direction are formed on a photosensitive surface (scanning surface) of a photoconductor 250 (which carries out a uniform rotation in the direction of an arrow shown) having a photoconductivity, after the beams courses are bent by a light-path bending mirror 247. Thus, optical scanning of the photoconductor 250 is carried out so as to write two scan lines simultaneously. One side of scanning range of the deflected beam is intercepted by an optical sensor 249 on the way toward the effective scanning range, and thereby, synchronization of optical scanning start of each optical spot is determined based on the output of the optical sensor 249.

Figure 14B:
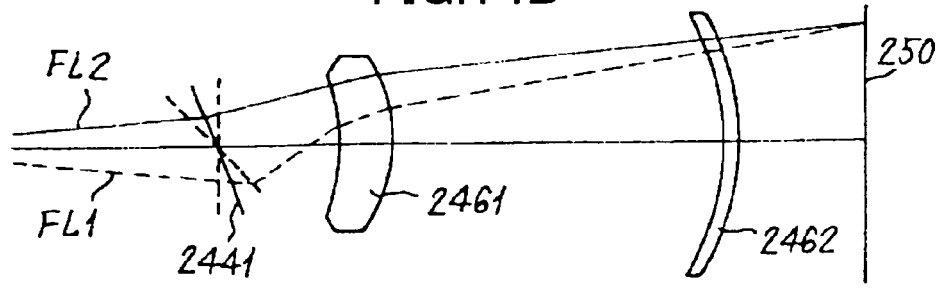
FIGS. 14B and 14C illustrate an effect obtained due to a difference in relation between a plurality of beams in a multi-beam type machine.
Figure 14C:
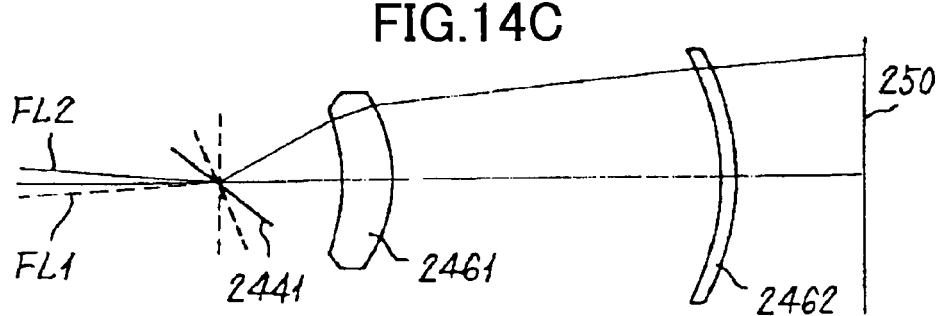

As shown in FIG. 14C, a configuration is made such that the respective beams FL1 and FL2 from the light sources 2401 and 2402 cross one another viewed from the subscanning direction (direction which intersects perpendicularly with the figure) at the deflection reflective surface 2441 of the polygon mirror. Thereby, since the beam which forms an image at a same position (in the main scanning direction) on the scanning surface 250 passes through a same portion of the lenses 2461 and 2462, the same uniform velocity performance is obtained on each of the beams FL1 and FL2. Moreover, a configuration is made such that each of the beams FL1 and FL2 passes through the lenses 2461 and 2462 on the same side with respect to the optical axis in the subscanning direction. Thereby, the scan line bending state of each scan line on the scanning surface 250 becomes substantially same as the other one. Therefore, after the liquid crystal deflection device array 248 is used for adjusting the amounts of deflection in the main scanning and/or subscanning directions, the scan line bending, scan line inclination or the uniform velocity performance of scan line can be corrected simultaneously on the two beams. Thus, the multi-beam scanning by the beams FL1 and FL2 can be performed satisfactorily.

As shown in FIG. 14B, if the beams FL1 and FL2 from the light sources 2401 and 2402 did not cross in the main scanning direction on the deflection reflective surface 2441 of the polygon mirror 244, since the beam which would form an image at the same position on the scanning surface 250 did not pass through the same portion of the lenses 2461 and 2462, neither the uniform velocity performance nor the scan line bending could become coincident between the beams FL1 and FL2. Thereby, neither the uniform velocity performance nor the scan line bending on the respective two beams could not be satisfactorily corrected by the single liquid crystal deflection device sequence device 248.

Since the liquid crystal deflection device array 248 is arranged between the polygon mirror 244 and the lens 2461, as described above, the arrangement pitches of the respective liquid crystal deflection devices therein should not be very smaller even in a range in which the deflection angle is larger, as the distance from the deflection reflective surface 2441 of the polygon mirror 244 is made longer.

Figure 15:
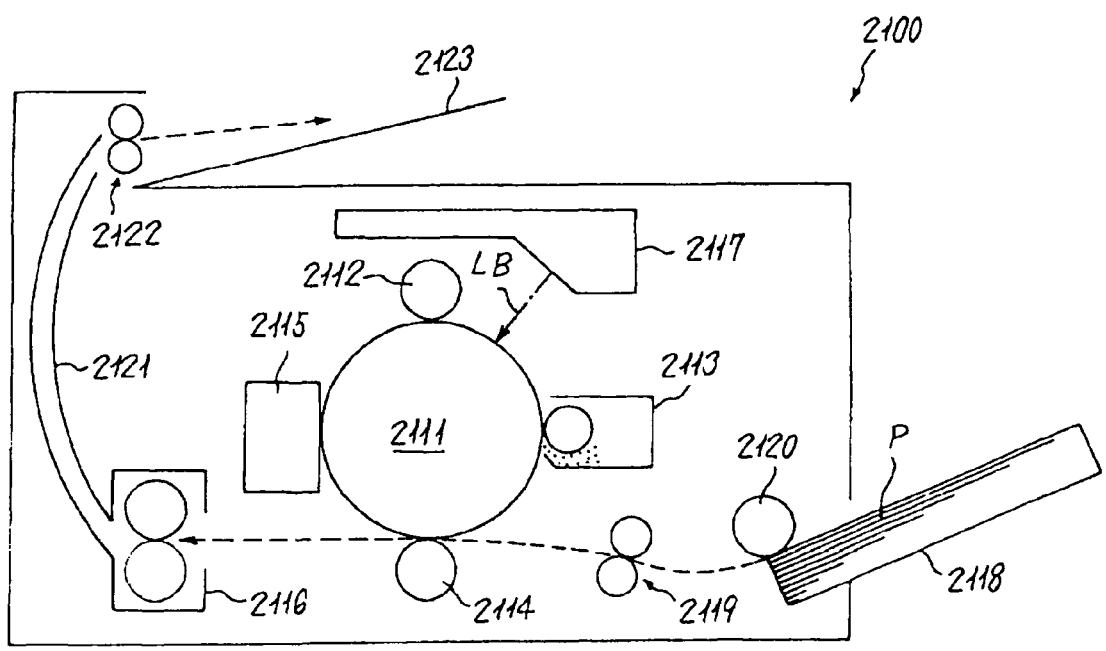
FIG. 15 illustrates an image formation device to which the present invention may be applied.

FIG. 15 illustrates an image formation device in which any of the above-mentioned optical scanning devices in the fourth and fifth embodiments of the present invention may be applied. This image formation device which is a monochrome-type laser printer, for example, has a function of transfer of a toner image onto a sheet-like recording medium, which toner image is obtained through visualization with a toner from electrostatic latent image. The electrostatic latent image is formed on a photoconductor as a result of the above-mentioned optical scanning thereof is performed by the optical scanning device as shown in FIG. 12A or 14A.

This laser printer 2100 has the photoconductor 2111 having a photoconductivity formed in a shape of a cylinder. Around the photoconductor 2111, an electrification roller 2112 as an electrification device, a development device 2113, a transfer roller 2114, and a cleaning device 2115 are arranged. The electrification roller 2112 may be replaced by a corona charger or an electrification brush. The transfer roller 2114 may be replaced by a corona-electric-discharge-type one.

The optical scanning device 2117 which performs an optical scanning by a laser beam LB is provided, and an exposure by optical writing or scanning is performed at a position between the electrification roller 2112 and development device 2113. Furthermore, a fixing device 4116, a cassette 2118, a registration roller pair 2119, a paper feeding roller 2120, a paper conveyance passage 2121, and a tray 2123 are provided.

When an image formation process is performed, a uniform rotation of the photoconductor 2111 is carried out clockwise, and a uniform electrification of the surface (scanning surface) thereof is carried out with the electrification roller 2112. After that, the optical scanning device 2117 writes an electrostatic latent image onto the photoconductor 2111 with the laser beam LB coming therefrom. The latent image is formed on the scanning surface in response to exposure by the optical writing with the laser beam LB. The thus-formed electrostatic latent image is a so-called negative latent image where an image part is exposed. Reversal development of this electrostatic latent image is carried out by the development device 2113, and thus, a toner image is formed on the photoconductor 2111.

A transfer paper P fed one by one by the paper feeding roller 2120 from the cassette 2118 is caught by the registration roller pair 2119. The registration roller pair 2119 feeds the paper P onto the photoconductor 2111 at a transfer position in timing well controlled according to the rotation of the photoconductor 2111. The thus-fed transfer paper P is placed on the toner image at the transfer part, and an action of the transfer roller 114 carries out electrostatic transfer of the toner image onto the paper P. The transfer paper P which thus has the toner image transferred is fixed by the fixing device 2116, which is then made to pass through the conveyance passage 2121, driven by the delivery roller pair 2122, and then, is ejected onto the tray 2123. The surface of the photoconductor 2111 after the toner image is transferred therefrom is cleaned by the cleaning device 2115, and thus, remaining toner, paper dust, etc. are removed.

The (latent) image writing by optical scanning is performed by the optical scanning device 2117 which may have the configuration described with reference to FIG. 12A or 14A which includes the liquid crystal deflection device array, and thereby, adjustment of the position of the optical spot on the scanning surface (photoconductor 111) in the main scanning direction and/or the subscanning direction is performed. Thus, the above-mentioned scan line bending, inclination of scan line, and the uniform velocity performance are well controlled or corrected, thereby, satisfactory latent image writing being achieved. Accordingly, a satisfactory monochrome image is created thereby, without distortion.

In each of the above-mentioned fourth and fifth embodiments, the scanning position detection process may be performed periodically, for example, once a mouth, and, based on the result thereof, the amount of deflection of each liquid crystal deflection device is determined. Then, the thus-determined deflection amounts may be stored in a memory of the system controller of the machine, and, is actually set in each liquid crystal deflection device at a time a power supply is made to the machine. Alternatively, it is also possible that, in advance of each regular image formation process, the scanning position detection device detects the scanning position of optical spot, and the amount of deflection in each liquid crystal deflection device of the liquid crystal deflection device array is set based on the detection result.

In case the uniform velocity performance degradation, scan line bending and/or the scan line inclination may occur due to environmental change, for example, the temperature inside the machine may rise gradually while many sheets of image formation is performed continuously. In such a case, it is preferable to perform scanning position detection and set up or update the amount of deflection in each liquid crystal deflection device of the liquid crystal deflection device array accordingly, at appropriate intervals, for example, once per five times of image formation process.

In such a case, in the embodiment shown in FIG. 15, it is preferable that the above-mentioned scanning position detection with the scanning position detecting device 223 shown in FIG. 13A, 13B, 13C or 13D be performed within an interval between successive processing of transfer papers P, i.e., after a transfer paper P has been processed and before a subsequent transfer paper P is processed.

It is assumed, for example, that:

the above-mentioned paper processing interval: h;

the time required for the scanning position detection: h1; and the time required for updating the setting in the each liquid crystal deflection device: h2.

In this case, when h≧h1+h2, detection of the scanning position and updating the deflection amount based on the detection result are performed within a same paper processing interval. However, when h<h1+h2, and also, h>h1, h>h2, updating the deflection amount should be performed at a subsequent paper processing interval after a paper processing internal in which detection of scanning position is performed.

In case h2>h, it is not possible to perform updating the deflection amount within a regular paper processing interval. In such a case, for example, once per ten times of image formation process, the paper processing interval is slightly elongated so that h2<h, and therein, the updating of the deflection amount should be performed.

As one example, a case is assumed where a speed of an image formation process can be switched among three modes, i.e., a quality mode, a high-speed mode, and a fastest mode. Further, h1=0.05 secs. (including the scanning position detection with the scanning position detecting device 223, and calculating the amount of deflection to be newly set in each device of the liquid crystal deflection device array 218); h2=0.05 secs. (including setting the thus-determined deflection amount in each device of the liquid crystal deflection device array); and h=0.25 secs (in the quality mode); 0.055 secs (in the high-speed mode); 0.03 secs (in the fastest mode).

FIG. 16 shows a flow chart of operation in this case. In a step S1, an initial setup is performed in which a standard amount of deflection is set in each device of the liquid crystal deflection device array. The amounts of deflection set at this time are those set up at the end of a normal operation state of the machine in the past.

In a step S2, it is determined whether or not a current image formation process is of a continuous or successive image formation process or not. When it is determined that it is a continuation process, it is determined whether the number of times of process N is not less than 20 (this means that the total number of sheets of printed images to be produced is at this time not less than 20), or not. Even in case image formation is performed continuously, as long as the number of times of producing sheet of image is less than 20, the temperature in the machine does not rise much, and thus, does not need updating the amount of deflection in each device of the liquid crystal deflection device array. Therefore, the usual image formation process is performed in this case, and the value of the deflection amount in each liquid crystal deflection device of the liquid crystal deflection device array to be set is the same as in the initial setting in the step S1.

In a step S5, it is determined whether the mode of image formation process is 'quality'. In the quality mode, as the paper processing interval h is as long as 0.25 seconds, the scanning position detection and updating of the amount of deflection in each liquid crystal deflection device are performed within the same paper processing time interval for every predetermined number of times of image formation process (producing a sheet of image, for example, every four sheets) in a step S6.

When it is not the quality mode, then in a step S7, it is determine whether it is the high-speed mode, and when it is the high-speed mode, a step S9 is performed. Then, the scanning position detection operation and operation of determination of the deflection amount to be set are both performed within a paper processing interval every predetermined number of times of image formation process. Then, in a step S10, actual updating the amount of deflection based on the determination in the step S9 is performed for the amount of deflection within the subsequent paper processing interval.

When it is not the high-speed mode, this means that it is the fastest mode in a step S8. In this case, in a step S11, the scanning position detection and deflection amount setting value determination is performed within a paper processing interval every predetermined number of times of image formation process. Then, in a step S12, the subsequent paper processing interval is elongated by a predetermined time Δt (for example, approximately 0.1 secs.). Then, within this elongated interval, the amount of deflection thus determined is set.

The above-mentioned setting or updating of the amount of deflection in each device of the liquid crystal deflection device array is actually performed as long as the amount determined based on the scanning position detection is such that actual updating be needed. That is, as long as the scanning position deviation thus detected is sufficiently small, or transition of change in the scan line bending amount, scan line inclination amount and/or the uniform velocity performance degradation amount is sufficiently small, for example, no correction should be performed by the liquid crystal deflection device array.

Utilization of the above-mentioned liquid crystal deflection device array for the purpose of scanning position correction such as scan line bending correction, scan line inclination correction, uniform velocity performance correction may cause a plurality of diffracted beams therefrom, some of which other than a regular scanning beam may adversely affect a regular optical scanning as ghost light. A scheme of solving such a problem according to the present invention will now be described.

Figure 17A:
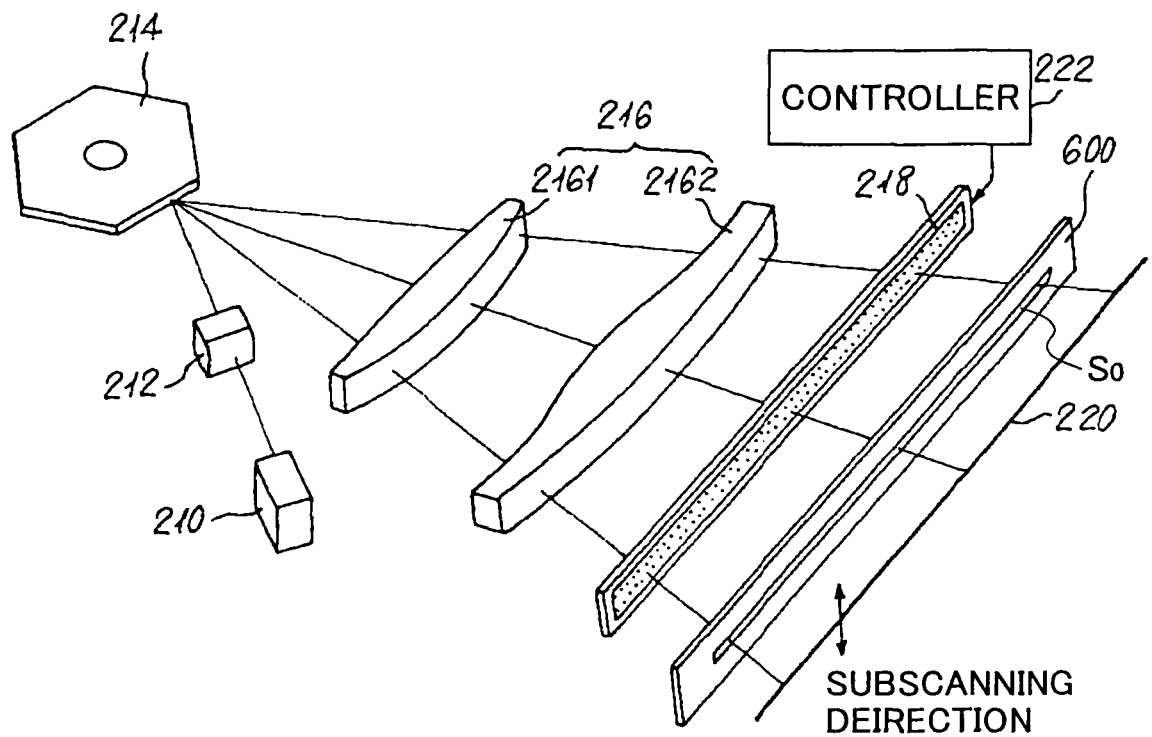
FIGS. 17A and 17B illustrate a variant embodiment of the embodiment shown in FIGS. 12A and 12B employing a ghost light removal device according to the present invention.
Figure 17B:
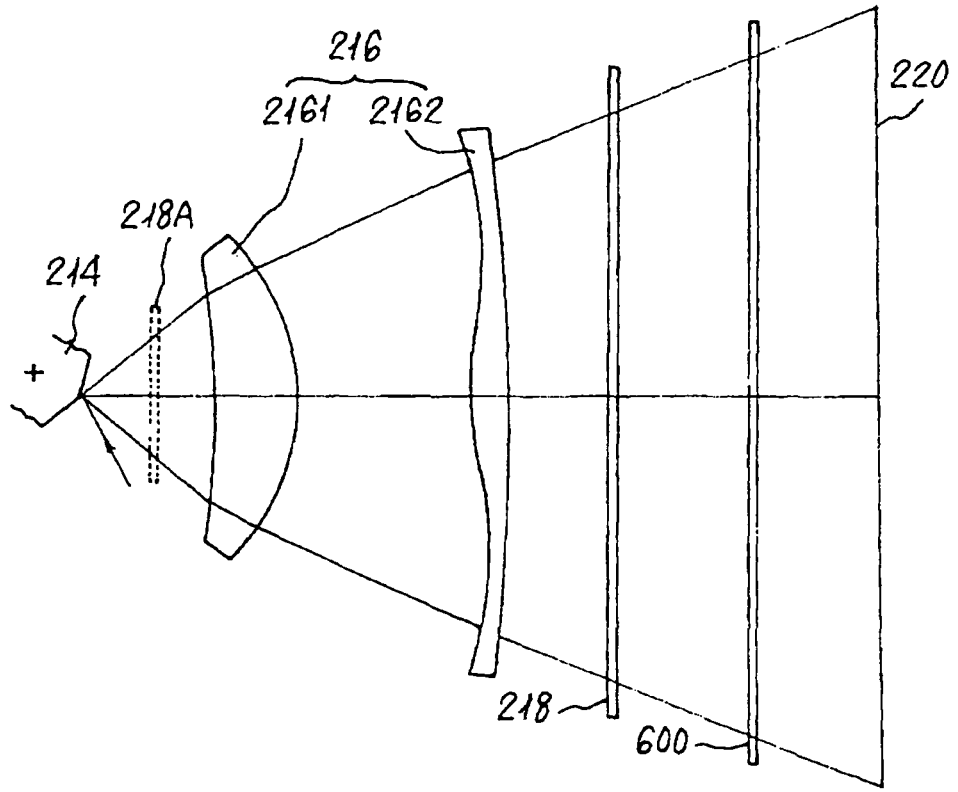

FIGS. 17A and 17B illustrate a configuration of a variant embodiment of the above-mentioned fourth embodiment to which the above-mentioned scheme of solving the problem occurring due to generation of diffracted beams as ghost light is applied, i.e., a ghost removal device 600.

For the purpose of simplification of description, each liquid crystal deflection device used in the liquid crystal deflection device array 218 is the subscanning liquid crystal deflection device, which adjusts the amount of deflection of the incident beam in the subscanning direction so as to correct scan line bending or so. In FIG. 17A, the liquid crystal deflection device array 218 has a plurality of liquid crystal deflection devices each of which has a function of beam deflection in the subscanning direction such as that described above with reference to FIGS. 3A through 3C along the main scanning direction, and generates diffracted beams.

Figure 18A:
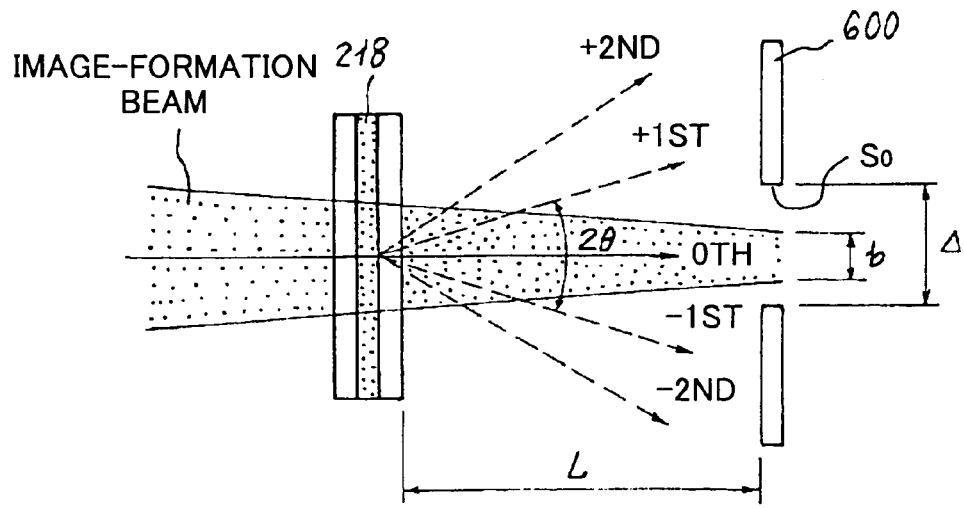
FIGS. 18A through 18C illustrate requirements concerning an arrangement of a ghost light removal device according to the present invention.

FIG. 18A shows a 0th light, a ±1st light, a ±2nd light of diffraction generated when the image-formation beam (deflected beam) is incident on the above-mentioned liquid crystal deflection device array 218. The 0th light is a beam used as a regular optical scanning beam in this case, and the ±1st light and ±2nd light thus act as ghost light with respect to the scanning surface 220. The above-mentioned ghost light removal device 600 removes the ghost light. The ghost light removal device 600 has a slit opening So long in the main scanning direction (direction which intersects perpendicularly with the figure), and has a light blocking function except the portion of slit opening So.

By this ghost light removal device 600, the ±1st light and ±2nd light acting as ghost light are blocked while only the 0th light which is the regular optical scanning beam is made to pass therethrough toward the scanning surface 220 (in the right direction in the figure) through the slit opening So.

Figure 18B:
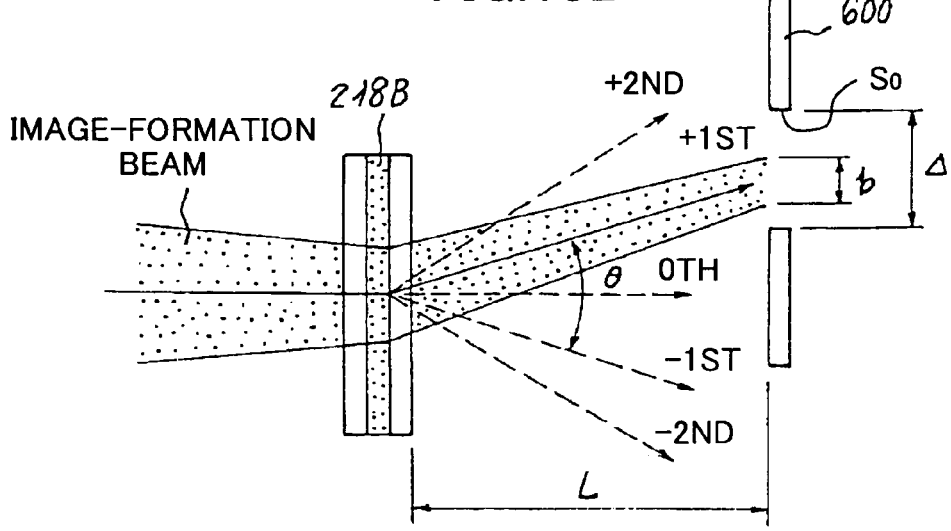

FIG. 18B shows a state in a case where the liquid crystal deflection device array 218 has another configuration 218B such that each liquid crystal deflection device thereof applies a diffraction phenomenon illustrated in FIGS. 4A and 4B and is disposed along the main scanning direction. In this case, since no diffraction is performed on and thus no beam deflection is carried out on the 0th light by the liquid crystal deflection device, rather the +1st light which has the deflection angle controllable by the liquid crystal deflection device is used as the regular optical scanning beam. Accordingly, in this case, the other beams, i.e., the 0th light, −1st light, and ±2nd light are blocked by the ghost light removal device 600, while the +1st light is made to pass through the slit opening So toward the scanning surface 220.

Figure 18C:
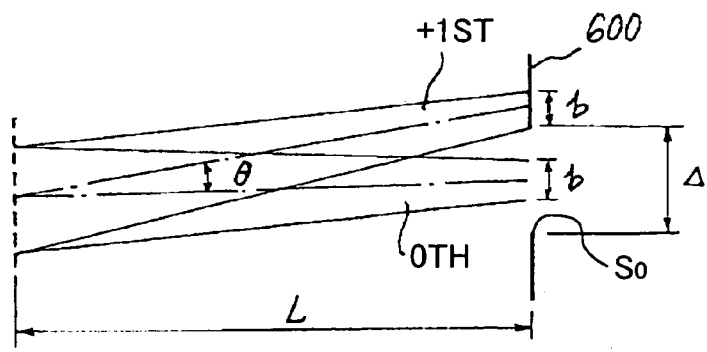

FIG. 18C illustrates the 0th light as the regular beam and the +1st light as the ghost light in the case of FIG. 18A. As shown, each of these beams has a beam width (a $1/e^2$ diameter in light intensity of the beam cross section) 'b' in the subscanning direction (the vertical direction in the figure) in the position around the slit opening So of the ghost light removal device 600. Further, the angle formed in the subscanning direction therebetween is referred to as θ; the distance between the liquid crystal deviation device and the ghost light removal device 600 is referred to as L, and the length in the subscanning direction of the slit opening So of the ghost light removal device 600 is referred to as Δ.

Then, the requirements needed for the ghost light removal device 600 to positively block the +1st light are expressed by the following formula:

$$L \cdot \tan \theta > (b+\Delta)/2$$

Accordingly, the distance L by which the ghost light removal device 600 to be distanced from the liquid crystal deflection device is expressed, by the following formula (1):

$$L > (1/2) (b+\Delta)/\tan \theta \qquad (1)$$

The same conditions may also be applied to the case of FIG. 18B.

The ghost light removal device 600 shown in FIG. 17A may have a configuration such that the slit opening So is formed in a long special separate light blocking plate, or a configuration such that a dust-proof glass window formed in a housing of an optical scanning device (see FIG. 7, members 600Y, 600M, 600C and 600K), or a light-path bending mirror (see FIG. 20, member 247), have a light blocking film having the slit opening So printed thereon.

Figure 19:
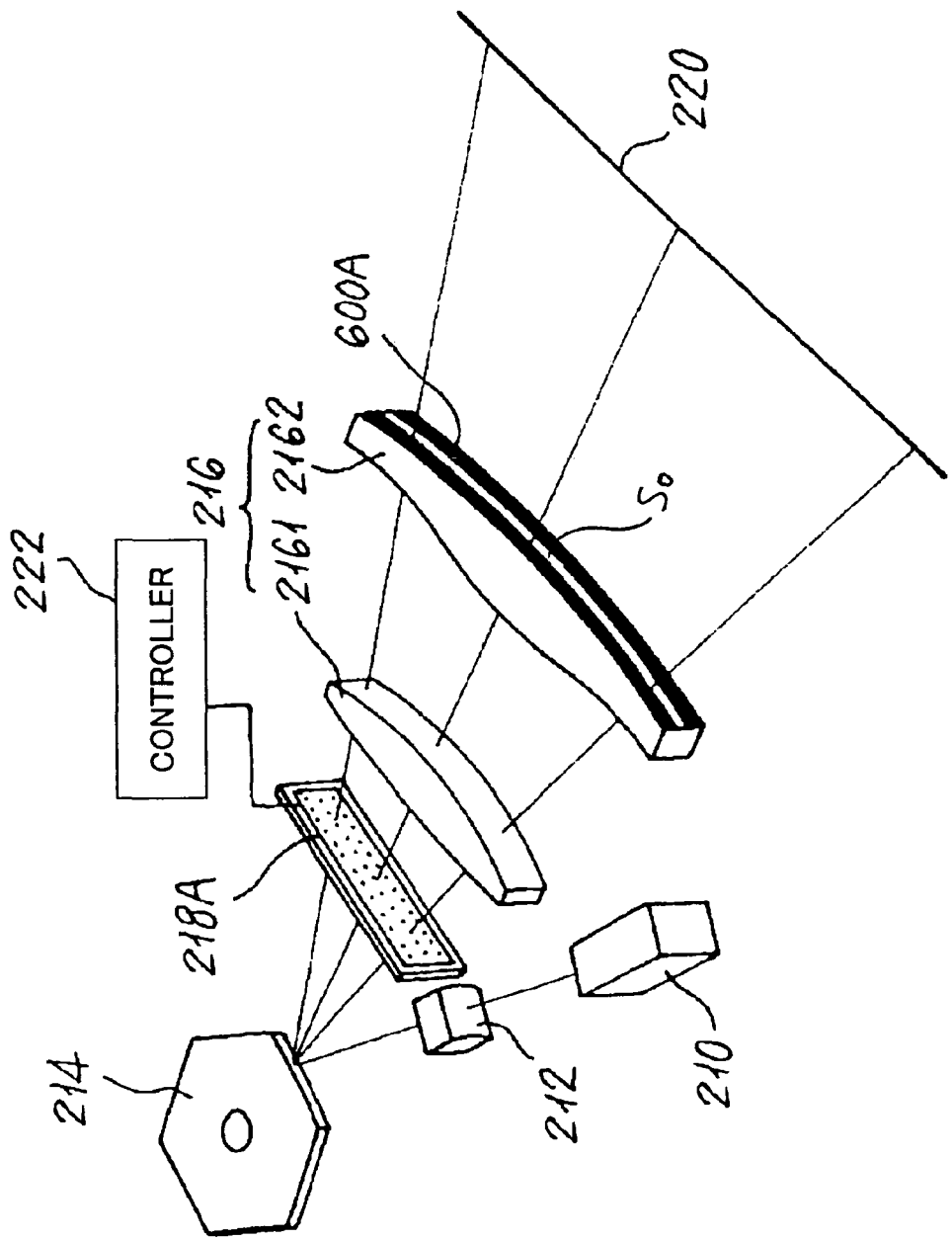
FIG. 19 illustrates a second variant embodiment of the embodiment shown in FIGS. 12A and 12B also employing a ghost light removal device according to the present invention.

FIG. 19 illustrates another configuration 600A of the ghost light removal device applied to the fourth embodiment shown in FIG. 12A. In this case, the liquid crystal deflection device array 218A similar to the deflection device 218 shown in FIG. 17A is inserted between the polygon mirror 214 and fθ lens 216, as shown. The ghost light removal device 600A is embodied by a light blocking film having the slit opening So formed on the side of the lens 2162 of the fθ lens 216 facing the scanning surface 220. It is noted that also in this case, the liquid crystal deflection device array 218A and ghost light removal device 600A satisfy the above-mentioned formula (1).

Figure 20:
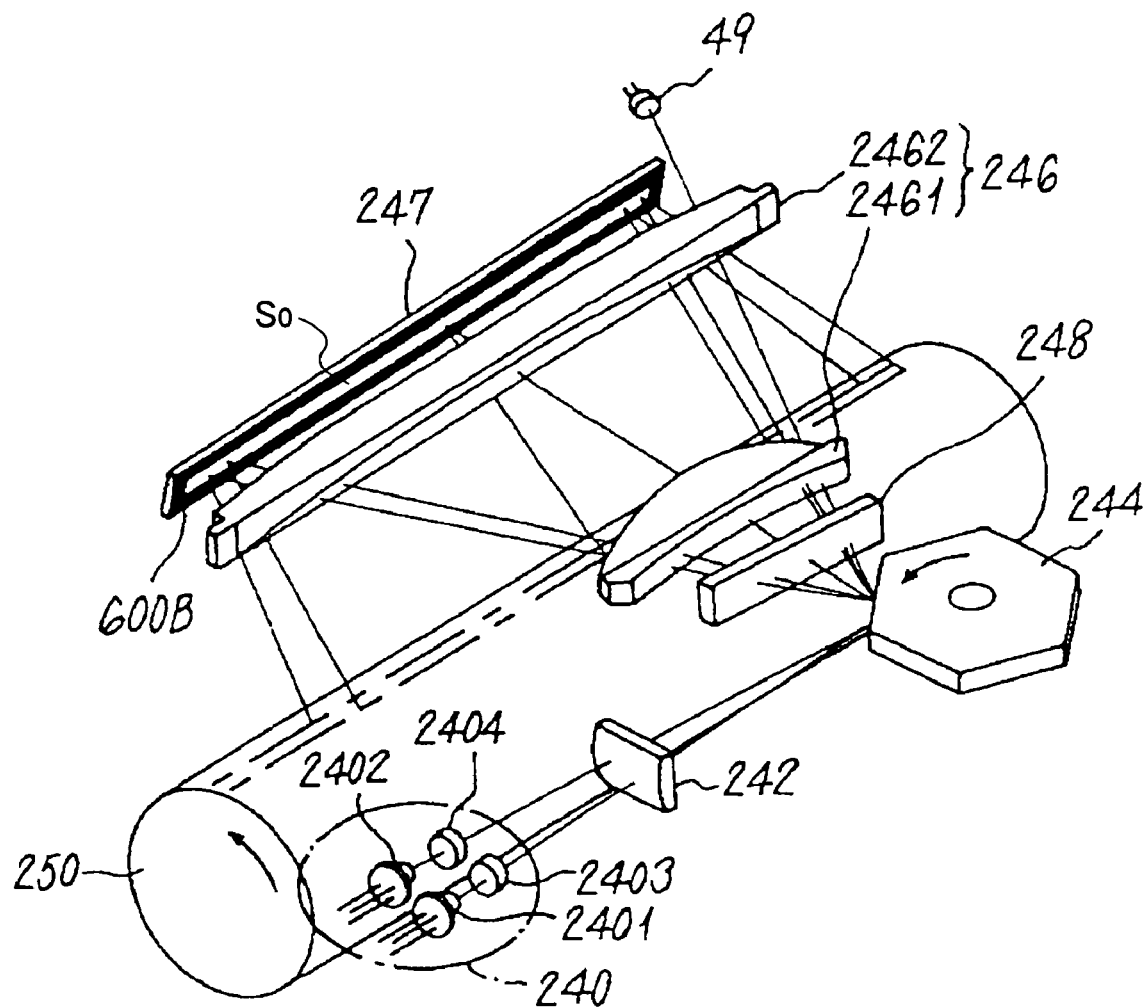
FIG. 20 illustrates a variant embodiment of the embodiment shown in FIG. 14A employing a ghost light removal device according to the present invention.

FIG. 20 illustrates a case where a scheme of the above-mentioned ghost light removal device is applied to the above-mentioned fifth embodiment described with reference to FIG. 14A. As can be seen from FIG. 20, in this case, the ghost light removal device 600B is embodied as a light-blocking film having the slit opening So (reflective surface) long along the main scanning direction provided on the reflective surface of the light-path bending mirror 247. It is noted that also in this case, the liquid crystal deflection device array 248 and ghost light removal device 600B satisfy the above-mentioned formula (1).

Further, also in the third embodiment described above with reference to FIG. 7, the above-mentioned scheme of ghost light removal device may be applied. Specifically, in this case, the ghost light removal devices 600Y, 600M, 600C and 600K are embodied by respective light-blocking films each having the slot opening So long along the main scanning direction provided on the respective ones of dust proof glass window provided on the bottom of an optical housing 75 which houses the optical scanning device as shown in FIG. 7. It is noted that also in this case, the liquid crystal deflection device arrays 70Y through 70K and respective ghost light removal device 600Y through 600K satisfy the above-mentioned formula (1) for each pair thereof.

Various additional notes concerning the above-mentioned embodiments of the present invention will now be described.

In each of the above-mentioned embodiments, the above-mentioned optical deflection scanning device should not necessarily be the polygon mirror. In fact, other than this, a rotational single mirror or a rotational double mirror such as a pyramidal mirror, a mortise-hole-type mirror, a galvano mirror, or the like may be used instead.

The above-mentioned scanning image-formation optical system may be of either a lens system such as an fθ lens or an image-formation mirror system such as an fθ mirror. A combination thereof is also possible to be applied.

As to the configuration of the above-mentioned liquid crystal deflection device array, with respect to the scan line bending correction, the following scheme may be applied.

That is, each liquid crystal subscanning-directional deflection device may have a different size. For example, assuming that the scan line bending is expressed by a function f(H) of the image height H, many subscanning-directorial deflection devices each having a small main-scanning-directional length are provided at a portion in which |df/dH| is large, i.e., the scan line bending is large, and thus, the scan line bending should be finely corrected. On the other hand, some subscanning-directorial deflection devices each having a large main-scanning-directional length are provided at a portion in which |df/dH| is small, i.e., the scan line bending is small. As to a portion in which no scan line bending is expected, no liquid crystal deflection device is needed.

Similarly, as to the uniform velocity correction, many main-scanning-directorial deflection devices each having a small main-scanning-directional length are provided at a portion in which fθ performance change rate is expected to be large, i.e., the uniform velocity performance degradation is large, and thus, the uniform velocity performance should be finely corrected. On the other hand, some main-scanning-directorial deflection devices each having a large main-scanning-directional length are provided at a portion in which uniform velocity performance change rate is expected as small. As to a portion in which no uniform velocity change occurs, no liquid crystal deflection device is needed.

However, other than the above-mentioned case where the state of scan line bending or state of the uniform velocity performance is expected well before the image formation device is actually used, it may be advantageous that the liquid crystal deflection device array be a general-purpose product. Accordingly, the main-scanning-directional size (arrangement pitch) of each liquid crystal deflection device of the liquid crystal deflection device array may be determined so that the scanning responsible range assigned to each deflection device becomes uniform, and also, the respective liquid crystal deflection devices are disposed continuously closely.

By applying the liquid crystal deflection device array according to the present invention, as the scan line bending, scan line inclination, scan line shift, uniform velocity performance degradation and so forth can be well corrected, which originally occur due to working errors or assemble errors in the manufacturing process of the optical scanning device. Accordingly, by applying this scheme, it becomes possible to ease the strictness in working accuracy, assemble accuracy, and so forth. Thereby, working costs, or assembly costs may be reduced in the optical scanning device. Specifically, the uniform velocity performance of the scanning image-formation optical system may not be increased much originally, and, thus, the other optical performance of the optical system may be instead increased, i.e., the curvature of field, wavefront aberration and so forth may be improved.

Further, by disposing the liquid crystal deflection device array between the scanning image-formation system and the scanning surface, it becomes possible to reduce the influence with respect to the wavefront aberration on the image-formation beam by the scanning image-formation optical system. Further, by inclining the liquid crystal deflection device array in the subscanning direction, possible ghost light occurring due to reflection by the both surfaces of the liquid crystal deflection device array which may otherwise reach the scanning surface may be avoided.

In case where, in each embodiment, the liquid crystal deflection device array may be disposed between the light source device and polygon mirror, correction of scanning characteristics should be controlled according to the image height at which the optical spot is incident currently.

As the sensor for detecting the current scanning position in the scanning position detecting device, a line sensor such as a CCD sensor having the longitudinal axis coincide with the subscanning direction or the like may be applied.

As one cause of occurrence of the scan line bending, focal line bending, shape bending or the like (bending in the subscanning direction, lens main-line bending, or the like) may be expected in case each optical device is made of plastic. However, as plastic optical devise are normally mass-produced by the same manufacturing process, the focal-line bending and/or shape bending in the same manner may likely to occur. Accordingly, in case of the above-mentioned tandem-type full-color image formation device or the like, the manner of scan line bending is likely to become similar among the respective color components. Therefore, it is expected that a control may be performed easier that the scan line bending of each color component is corrected to be coincide with the reference scan line bending as mentioned above.

It is advantageous that the scan line bending on the black component is selected as this reference scan line bending. This is because, as black has a high contrast in comparison to the other standard color components, change in beam spot diameter, change in position of the beam spot, or the like occurring due to vibration, temperature change or the like may be much likely to adversely affect an image quality of finally created full-color image. By selecting the black component as the color component providing the reference scan line bending, and producing the optical scanning system for the black component with a material especially superior in rigidity and/or less thermal expansion, it becomes possible to provide a high quality full-color image.

Further, it is advantageous that a configuration is made such that the respective color-component beams be made to pass through a common optical device of the scanning image-formation optical system. In fact, thereby, it becomes possible to effectively reduce a change in position deviation of scan line, scan line bending, scan line inclination and so forth occurring due to a change in the optical performance of lens and so forth due to a manufacture variation or temperature change. This is because, according to the above-mentioned configuration, as the respective color-component beams be made to pass through a common optical device of the scanning image-formation optical system, even in case scan line bending of each particular beam is large, the manner of the scan line bending are similar to each other. Accordingly, it becomes easier to achieve correction such that the scan line bending manners of the respective color components be coincident with each other, and, thus, color deviation can be effectively reduced. Furthermore, by thus utilizing an optical device in common, it becomes possible to miniaturize the entire optical scanning device.

Furthermore, in case change of the deflection amount of each liquid crystal deflection device of the liquid crystal deflection device array is performed even after a subsequent image formation process starts, a problem may occur. That is, a scan line may move unexpectedly, and, thus, an image quality of a finally obtained full-color image may be remarkably degraded. Accordingly, it is needed that adjustment or updating of the deflection amount of each liquid crystal deflection device be performed within an interval during which no actual image formation process is performed. In case where the deflection angle in the liquid crystal deflection device is within 5 minutes, and also, the diameter of beam incident thereon is not more than 5 mm, the above-mentioned requirements ($T_A$<0.8×(D/V)) may be satisfied.

As to the above-mentioned other requirements (Ts<10×(L/V)), the time Ts (from the beginning of scan line deviation detection until the end of detection completion) includes a time required for calculating the amount by which the scan line bending is to be corrected. Specifically, this calculation includes calculation of average of detected values for the purpose of noise removal, performing abnormal value processing, and so forth so as to improve the detection accuracy.

The above-mentioned slit opening So of the ghost light removal device may be embodied by: causing a light-blocking film to adhere to a transparent glass plate or the like; depositing or printing a light-blocking film to the same; or forming a slit-shaped opening into a light-blocking-property flat plate. Alternatively, the slit opening So may be formed of a pair of knife wedges. In this case of applying a pair of knife wedges, each knife wedge may be located at a different position along the optical axis. Further, the ghost light removal device may be provided outside of the optical scanning device. That is, it may be provided in the photosensitive body unit, for example.

In the case where the ghost light removal device is integrally combined with any of the optical system such as a lens or mirror, or a dust-proof glass window, various ways, such as adhesion, screwing, or printing, deposition, or the like may be applied as a method of fixing to parts together.

The above-mentioned photosensitive body or photoconductor used as the scanning surface in the image formation device according to the present invention may be replaced by a silver film, for example. In this case, a latent image formed thereon through optical scanning may be visualized by a well-known silver halide photographic process. Such an image formation device may be applied to an optical plate-making device, an optical drawing device for drawing a CT-scanned image or the like. Alternatively, as the photosensitive medium, a coloring medium which cause a color in response to application of thermal energy of the optical spot may be used. Further alternatively, a sheet-like zinc-oxide paper may be used as the photosensitive medium, a selenium photosensitive body, an organic optical semiconductor may also be applied: Also, not only a drum shape one but also belt-shaped one is applied as the photosensitive medium on which the optical scanning is performed.

As the transfer paper as the recording medium on which the toner image is transferred from the photosensitive body, an OHP sheet, or the like may also be used. In case the above-mentioned sheet-shaped photosensitive medium is used, the toner image is directly fixed thereon.

Further, the present invention is not limited to the above-described embodiments, and variations and modifications may be made without departing from the basic concept of the present invention.

The present application is based on Japanese priority applications Nos. 2002-015647, 2002-014255, 2002-036825, 2002-128011 and 2002-350285, filed on Jan. 24, 2002, Jan. 23, 2002, Feb. 14, 2002, Apr. 30, 2002 and Dec. 2, 2002, respectively, the entire contents of which are hereby incorporated by reference.

What is claimed is:

1. An optical scanning device configured to deflect a beam, to converge the deflected beam, and to direct the deflected beam toward a scanning surface, so that an optical scanning of the scanning surface is performed by an optical spot formed on the scanning surface by the deflected beam, said optical scanning device comprising:

a beam separating device configured to separate a part of the beam before the beam is incident on the scanning surface and to direct the part of the beam toward a detection surface that is optically equivalent to the scanning surface, wherein a scan line bending state on said detection surface, which is equivalent to a scan line bending occurring on the scanning surface, is detected;

a scanning position detection device configured to detect a position of a scanning line on said detection surface; and a beam deflection control device disposed on a light path of the beam before the beam is incident on the scanning surface and including a plurality of beam deflection control units continuously arranged in a main scanning direction, the beam deflection control device including a plurality of electrodes, each of the plurality of beam deflection control units including
a liquid crystal film,
at least two of the plurality of electrodes, the at least two of the plurality of electrodes corresponding to the liquid crystal film, and
a driver unit configured to control the liquid crystal film independent of a remainder of the plurality of electrodes, wherein said beam separating device comprises said beam deflection control device, a beam deflection amount provided to the beam by the beam deflection control device is controlled to control a scanning characteristic of the optical scanning, and said scanning position detection device includes a number of optical sensors, which number equals a number of the plurality of beam deflection control units, said optical sensors being disposed at positions corresponding to positions of respective beam deflection control units and detecting subscanning-directional positions of optical spots.

2. The optical scanning device as claimed in claim 1, wherein said beam deflection control device comprises a liquid crystal device, and a refractive index of the liquid crystal device is controlled electrically or magnetically, to change a direction of the beam.

3. The optical scanning device as claimed in claim 1, wherein each of the plurality of beam deflection control units is configured to provide a deflection amount in a subscanning direction to the beam, said beam deflection control device is disposed between a beam deflecting device and the scanning surface, and the deflection amount of each of the plurality of beam deflection control units is controlled for each scanning action to correct a scan line bending.

4. The optical scanning device as claimed in claim 1, wherein each of the plurality of beam deflection control units is configured to provide a deflection amount in the main scanning direction to the beam, said beam deflection control device is disposed between a beam deflecting device and the scanning surface, and a deflection amount of each of the plurality of beam deflection control units is controlled for each scanning action to correct a uniform velocity characteristic.

5. The optical scanning device as claimed in claim 1, wherein a beam reflected by said beam deflection control device is directed toward said detection surface.

6. The optical scanning device as claimed in claim 1, wherein a supporting member supporting the optical sensors is made of a material having a thermal expansion coefficient of not more than $1.0\times10^{-5}/°C$.

7. The optical scanning device as claimed in claim 1, further comprising:
a multi-beam-type optical scanning device in which a light source device is configured to emit a plurality of beams, wherein the scanning surface is scanned by the plurality of beams simultaneously.

8. The optical scanning device as claimed in claim 1, wherein a plurality of light sources are provided, and a scanning optical system defining a light path from each of the plurality of light sources toward a respective scanning surface is configured so that scan lines drawn by the optical spots, which are formed by respective beams coming from each of the plurality of light sources, are substantially parallel to each other.

9. The optical scanning device as claimed in claim 8, wherein a similar beam deflection control device is provided for each of the plurality of light sources.

10. The optical scanning device as claimed in claim 8, wherein a number of the plurality of light sources is 3 or 4, a respective beam emitted from each of the plurality of light sources is modulated by image information to form an image in a respective color component, and each respective image combines to form a color image.

11. An image formation device configured to perform an image formation by performing an optical scanning of photosensitive bodies, the image formation device comprising:
the optical scanning device claimed in claim 10, wherein three or four photoconductive photosensitive bodies that provide scanning surfaces for an optical scanning by beams from respective light sources are disposed mutually in parallel.

12. The optical scanning device as claimed in claim 1, wherein a plurality of light sources are provided, scanning optical systems defining light paths from the plurality of light sources toward respective scanning surfaces are mutually equivalent, one of the scanning optical systems is a reference, and a similar beam deflection control device is provided on a light path in each of a remainder of the scanning optical systems, each of the similar beam deflection control devices being configured to correct a scanning characteristic of the respective scanning optical system for a scanning characteristic of the reference.

13. The optical scanning device as claimed in claim 12, wherein a transparent member is provided on a light path of the reference to correct a difference in a light path length caused by the similar beam deflection control device provided on a light path in each of the remainder of the scanning optical systems.

14. The optical scanning device as claimed in claim 12, wherein each of the scanning optical systems comprises a lens system, and the lens system of the reference is made of a material having a thermal expansion coefficient of not more than $1.0\times10^{-5}/°C$.

15. The optical scanning device as claimed in claim 12, wherein a number of the plurality of light sources is 3 or 4, and a respective beam emitted from each of the plurality of light sources is modulated by image information to form an image in a respective color component, the respective images forming a color image in combination.

16. An image formation device configured to perform an image formation by performing an optical scanning of photosensitive bodies, the image formation device comprising:
the optical scanning device claimed in claim 15, wherein three or four photoconductive photosensitive bodies that provide scanning surfaces for an optical scanning by beams from respective light sources are disposed mutually in parallel.

17. An image formation device configured to perform an image formation by performing an optical scanning of a photosensitive medium, the image formation device comprising:
the optical scanning device claimed in claim 1.

18. The image formation device as claimed in claim 17, wherein said photosensitive medium comprises a photosensitive body having a photoconductivity.

19. An optical scanning device configured to deflect a beam, to converge the deflected beam, and to direct the deflected beam toward a scanning surface, so that an optical scanning of the scanning surface is performed by an optical spot formed on the scanning surface by the deflected beam, the optical scanning device comprising:
a beam deflection control device configured to adjust the optical spot formed on the scanning surface,
said beam deflection control device comprising:
a plurality of electrodes; and
a plurality of beam deflection control units, each of the plurality of beam deflection control units configured to be respectively and independently controlled,
each of the plurality of beam deflection control units including
a liquid crystal film,
at least two of the plurality of electrodes, the at least two of the plurality of electrodes corresponding to the liquid crystal film, and
a driver unit configured to control the liquid crystal film independent of a remainder of the plurality of electrodes, said beam deflection control device being inclined with respect to a subscanning direction, wherein each of the plurality of beam deflection control units is individually controllable for a deflection amount provided to an incident beam, the plurality of beam deflection control units is continuously arranged along a main scanning direction, and the deflection amount of each of the plurality of beam deflection control units is controlled according to the optical scanning.

20. The optical scanning device as claimed in claim 19, wherein each of the plurality of beam deflection control units comprises a liquid crystal device, and a refractive index of the liquid crystal device is controlled electrically or magnetically, to change a direction of the incident beam.

21. The optical scanning device as claimed in claim 19, wherein each of the plurality of beam deflection control units is configured to provide the deflection amount in a subscanning direction to the incident beam.

22. The optical scanning device as claimed in claim 19, wherein each of the plurality of beam deflection control units is configured to provide the deflection amount in the main scanning direction to the incident beam.

23. The optical scanning device claimed in claim 22, wherein said beam deflection control device is configured so that a length in the main scanning direction of each of the plurality of beam deflection control units is between 2 and 5 millimeters.

24. The optical scanning device claimed in claim 21, wherein said beam deflection control device is configured so that a length in the main scanning direction of each of the plurality of beam deflection control units is between 2 and 5 millimeters.

25. The optical scanning device as claimed in claim 19, wherein said beam deflection control device is disposed between an optical scanning device configured to perform the optical scanning and the scanning surface.

26. The optical scanning device as claimed in claim 19, further comprising:
a multi-beam-type optical scanning device in which a light source device is configured to emit a plurality of beams, wherein the scanning surface is scanned by the plurality of beams simultaneously.

27. The optical scanning device as claimed in claim 19, wherein a plurality of light sources are provided, and a scanning optical system defining a light path from each of the plurality of light sources toward a respective scanning surface is configured so that scan lines drawn by optical spots formed by respective beams coming from each of the plurality of light sources are substantially parallel to each other.

28. The optical scanning device as claimed in claim 27, wherein a similar beam deflection control device is provided for each of the plurality of light sources.

29. The optical scanning device as claimed in claim 27, wherein a number of the plurality of light sources is 3 or 4, a respective beam emitted from each of the plurality of light sources is modulated by image information to form an image in a respective color component, and each respective image combines to form a color image.

30. An image formation device configured to perform an image formation by performing an optical scanning on a photosensitive medium, the image formation device comprising:
the optical scanning device claimed in claim 19.

31. The image formation device as claimed in claim 30, wherein said photosensitive medium comprises a photoconductive photosensitive body on which an electrostatic latent image is formed as a result of the optical scanning performed by said optical scanning device, and a toner image formed on said photoconductive photosensitive body as a result of a visualization of the electrostatic latent image is transferred onto a sheet-shaped recording medium.

32. The image formation device as claimed in claim 31, further comprising:
a total of 3 or 4 photoconductive photosensitive bodies, wherein respective color-component images are formed on the photoconductive photosensitive bodies as a result of an optical scanning with beams previously modulated by image information to form the respective color-component images, the respective color-component images forming a color image, and the photoconductive photosensitive bodies are mutually disposed in parallel.

33. The image formation device as claimed in claim 30, further comprising:
a scanning position detecting device configured to detect a scanning position of the optical spot; and
a controller configured to determine the deflection amount of a respective one of the plurality of beam deflection control units based on a detection result of the scanning position detecting device.

34. The image formation device as claimed in claim 33, wherein the controller is configured to determine the deflection amount of the respective one of the plurality of beam deflection control units based on the detection result of the scanning position detecting device when a power supply to the image formation device is started.

35. The image formation device as claimed in claim 33, wherein the scanning position detecting device is configured to detect the scanning position of the optical spot, prior to starting the image formation process.

36. The image formation device as claimed in claim 33, further comprising:

a photoconductive photosensitive body used as the photosensitive medium, wherein the scanning position detecting device is configured to detect the scanning position of the optical spot when successive image formation processes are performed in the image formation device, the controller is configured to determine whether a change of the deflection amount of the respective one of the plurality of beam deflection control units is needed, based on the detection result of the scanning position detecting device, the controller determines whether the change of the deflection amount of the respective one of the plurality of beam deflection control units is needed within a recording-medium conveyance time interval between successive conveyances of sheet-shaped recording media, and each of the sheet-shaped recording media has a toner image transferred from the photoconductive photosensitive body.

37. The image formation device as claimed in claim 36, wherein the controller is configured to change the deflection amount of the respective one of the plurality of beam deflection control units either within a same recording-medium conveyance time interval as a detection of the scanning position of the optical spot by the scanning position detecting device or a next recording-medium conveyance time interval, when the controller determines that the change of the deflection amount of the respective one of the plurality of beam deflection control units is needed.

38. An optical scanning device configured to deflect a beam, to converge the deflected beam, and to direct the deflected beam toward a scanning surface, so that an optical scanning of the scanning surface is performed by an optical spot formed on the scanning surface by the deflected beam, the optical scanning device comprising:
    a liquid crystal beam deflection control device configured to adjust the optical spot, the liquid crystal beam deflection control device including a plurality of deflection elements continuously arranged in a main scanning direction and configured to be respectively and independently controlled, the liquid crystal beam deflection control device including a plurality of electrodes,
    each of the plurality of deflection elements including
        a liquid crystal film,
        at least two of the plurality of electrodes, the at least two of the plurality of electrodes corresponding to the liquid crystal film, and
        a driver unit configured to control the liquid crystal film independent of a remainder of the plurality of electrodes; and
    a ghost light removal device configured to block a diffracted beam that acts as a ghost light from reaching the scanning surface from said liquid crystal beam deflection control device, wherein said ghost light removal device includes a slit opening that reflects an optical scanning beam, the slit opening being long along the main scanning direction, only a regular optical scanning beam being passed through the slit opening, and $$L > (1/2)(b+\Delta)/\tan\theta$$

where 'b' is a width in a subscanning direction of each beam deflected by the liquid crystal beam deflection control device, 'Δ' is a width in the subscanning direction of the slit opening of the ghost light removal device, 'L' is a distance between the liquid crystal beam deflection control device and the slit opening of the ghost light removal device, and 'θ' is an angle formed in the subscanning direction between the regular optical scanning beam, which is obtained from the liquid crystal beam deflection control device, and a ghost light nearest to said regular optical scanning beam with respect to chief rays thereof.

39. The optical scanning device as claimed in claim 38, wherein said liquid crystal beam deflection control device is disposed between an optical deflection scanning device configured to perform the optical scanning and the scanning surface.

40. The optical scanning device as claimed in claim 38, wherein said ghost light removal device is integrally combined with an optical device disposed between an optical deflection scanning device and the scanning surface.

41. An image formation device configured to perform an image formation by performing an optical scanning on a photosensitive medium, the image formation device comprising:
    the optical scanning device claimed in claim 38.

42. An optical scanning device configured to deflect a beam, to converge the deflected beam, and to direct the deflected beam toward a scanning surface, so that an optical scanning of the scanning surface is performed by an optical spot formed on the scanning surface by the deflected beam, said optical scanning device comprising:
    a beam separating device that separates a part of the beam before the beam is incident on the scanning surface; and
    a beam deflection control device disposed on a light path of the beam before the beam is incident on the scanning surface and including a plurality of beam deflection control units continuously arranged in a main scanning direction, the beam deflection control device including a plurality of electrodes, a beam deflection amount provided to the beam by the beam deflection control device is controlled to control a scanning characteristic of the optical scanning,
    each of the plurality of beam deflection control units including
        a liquid crystal film,
        at least two of the plurality of electrodes, the at least two of the plurality of electrodes corresponding to the liquid crystal film, and
        a driver unit configured to control the liquid crystal film independent of a remainder of the plurality of electrodes, wherein said beam separating device comprises said beam deflection control device, and scanning optical systems defining light paths from a plurality of light sources toward respective scanning surfaces are mutually equivalent, one of the scanning optical systems is a reference, and a similar beam deflection control device is provided on a light path in each of a remainder of the scanning optical systems, each of the similar beam deflection control devices configured to correct a scanning characteristic of the respective scanning optical system for a scanning characteristic of the reference, a transparent member being provided on a light path of the reference to correct a difference in a light path length caused by the similar beam deflection control device provided on the light path in each of the remainder of the scanning optical systems.

43. The optical scanning device as claimed in claim 42, wherein said beam deflection control device comprises a liquid crystal device, and a refractive index of the liquid crystal device is controlled electrically or magnetically, to change a direction of the beam.

44. The optical scanning device as claimed in claim 42, wherein each of the plurality of beam deflection control units is configured to provide the beam deflection amount in a subscanning direction to the beam, said beam deflection control device being disposed between a beam deflecting device and the scanning surface, a deflection amount of each of the plurality of beam deflection control units being controlled for each scanning action to correct a scan line bending.

45. The optical scanning device as claimed in claim 42, wherein each of the plurality of beam deflection control units is configured to provide the beam deflection amount in the main scanning direction to the beam, said beam deflection control device being disposed between a beam deflecting device and the scanning surface, the beam deflection amount of each of the plurality of beam deflection control units being controlled for each scanning action to correct a uniform velocity characteristic.

46. The optical scanning device as claimed in claim 42, wherein said beam separating device directs the part of the beam toward a detection surface that is optically equivalent to the scanning surface, a scan line bending state on said detection surface, which is equivalent to a scan line bending occurring on the scanning surface, being detected.

47. The optical scanning device as claimed in claim 46, wherein a beam reflected by said beam deflection control device is directed toward said detection surface.

48. The optical scanning device as claimed in claim 46, further comprising:
a scanning position detection device configured to detect a position of a scanning line on said detection surface, wherein said scanning position detection device includes a number of optical sensors, which number equals a number of the plurality of beam deflection control units included in said beam deflection control device, said optical sensors being disposed at positions corresponding to positions of respective ones of the plurality of beam deflection control units and detecting subscanning-directional positions of optical spots.

49. The optical scanning device as claimed in claim 48, wherein a supporting member supporting the optical sensors is made of a material having a thermal expansion coefficient of not more than $1.0 \times 10^{-5}/°$ C.

50. The optical scanning device as claimed in claim 42, further comprising:
a multi-beam-type optical scanning device in which a light source device is configured to emit a plurality of beams, wherein the scanning surface is scanned by the plurality of beams simultaneously.

51. The optical scanning device as claimed in claim 42, wherein a scanning optical system defining a light path from each of the plurality of light sources toward a respective scanning surface is configured so that scan lines drawn by optical spots formed by respective beams coming from each of the plurality of light sources are substantially parallel to each other.

52. The optical scanning device as claimed in claim 51, wherein a similar beam deflection control device is provided for each of the plurality of light sources.

53. The optical scanning device as claimed in claim 51, wherein a number of the plurality of light sources is 3 or 4, a respective beam emitted from each of the plurality of light sources being modulated by image information to form an image in a respective color component, each respective image combining to form a color image.

54. An image formation device configured to perform an image formation by performing an optical scanning of photosensitive bodies, comprising:
the optical scanning device claimed in claim 53, wherein three or four photoconductive photosensitive bodies that provide scanning surfaces for an optical scanning by beams from respective light sources are disposed mutually in parallel.

55. The optical scanning device as claimed in claim 42, wherein each of the scanning optical systems comprises a lens system, and the lens system of the reference is made of a material having a thermal expansion coefficient of not more than $1.0 \times 10^{-5}/°$ C.

56. The optical scanning device as claimed in claim 42, wherein a number of the plurality of light sources is 3 or 4, a respective beam emitted from each of the plurality of light sources being modulated by image information to form an image in a respective color component, the respective images forming a color image in combination.

57. An image formation device configured to perform an image formation by performing an optical scanning of photosensitive bodies, comprising:
the optical scanning device claimed in claim 56, wherein three or four photoconductive photosensitive bodies that provide scanning surfaces for an optical scanning by beams from respective light sources are disposed mutually in parallel.

58. An image formation device configured to perform an image formation by performing an optical scanning of a photosensitive medium, comprising:
the optical scanning device claimed in claim 42.

59. The image formation device as claimed in claim 58, wherein said photosensitive medium comprises a photosensitive body having a photoconductivity.

* * * * *